US011212553B2

United States Patent
Ko et al.

(10) Patent No.: US 11,212,553 B2
(45) Date of Patent: Dec. 28, 2021

(54) BIDIRECTIONAL INTRA PREDICTION METHOD AND APPARATUS

(71) Applicants: Electronics and Telecommunications Research Institute, Daejeon (KR); HANBAT NATIONAL UNIVERSITY INDUSTRY-ACADEMIC COOPERATION FOUNDATION, Daejeon (KR)

(72) Inventors: Hyunsuk Ko, Daejeon (KR); Jung-Won Kang, Daejeon (KR); Sung-Chang Lim, Daejeon (KR); Jin-Ho Lee, Daejeon (KR); Ha-Hyun Lee, Seoul (KR); Dong-San Jun, Daejeon (KR); Hae-Chul Choi, Daejeon (KR); Hui-Yong Kim, Daejeon (KR); A-Ram Baek, Daejeon (KR)

(73) Assignees: Electronics and Telecommunications Research Institute, Daejeon (KR); HANBAT NATIONAL UNIVERSITY INDUSTRY-ACADEMIC COOPERATION FOUNDATION, Daejeon (KR)

(*) Notice: Subject to any disclaimer, the term of this patent is extended or adjusted under 35 U.S.C. 154(b) by 0 days.

(21) Appl. No.: 16/768,035

(22) PCT Filed: Nov. 28, 2018

(86) PCT No.: PCT/KR2018/014847
§ 371 (c)(1),
(2) Date: May 28, 2020

(87) PCT Pub. No.: WO2019/107927
PCT Pub. Date: Jun. 6, 2019

(65) Prior Publication Data
US 2020/0366931 A1 Nov. 19, 2020

(30) Foreign Application Priority Data

Nov. 28, 2017 (KR) .................. 10-2017-0160466
Jul. 2, 2018 (KR) .................. 10-2018-0076503
(Continued)

(51) Int. Cl.
*H04N 7/18* (2006.01)
*H04N 19/593* (2014.01)
(Continued)

(52) U.S. Cl.
CPC ........ *H04N 19/593* (2014.11); *H04N 19/159* (2014.11); *H04N 19/176* (2014.11); *H04N 19/182* (2014.11); *H04N 19/184* (2014.11)

(58) Field of Classification Search
CPC .. H04N 19/593; H04N 19/176; H04N 19/184; H04N 19/159; H04N 19/182
(Continued)

(56) References Cited

U.S. PATENT DOCUMENTS 8,363,722 B2   1/2013  Gharavi-Alkhansari et al.
9,154,796 B2  10/2015  Seregin et al.
(Continued)

FOREIGN PATENT DOCUMENTS

EP    3396951 A1  10/2018
EP    3313076 B1   4/2019
(Continued)

OTHER PUBLICATIONS

Shapiro et al, Embedded image coding using zerotrees wavelet coefficients (Year: 1993).*
(Continued)

*Primary Examiner* — Shan E Elahi
(74) *Attorney, Agent, or Firm* — William Park & Associates Ltd.

(57) ABSTRACT

Disclosed herein are a video decoding method and apparatus and a video encoding method and apparatus. Encoding and
(Continued)

decoding of a target block are performed using intra-prediction. The intra-prediction is intra-prediction that uses bidirectional intra-prediction and a remaining mode. In bidirectional intra-prediction, a prediction value for a target pixel in the target block is determined based on reference pixels in two directions of bidirectional intra-prediction. In intra-prediction using a remaining mode, the remaining mode indicates remaining intra-prediction modes other than MPMs present in an MPM list.

5 Claims, 35 Drawing Sheets

(30) Foreign Application Priority Data

Jul. 12, 2018 (KR) ........................ 10-2018-0080865
Nov. 28, 2018 (KR) ........................ 10-2018-0149433

(51) Int. Cl.
*H04N 19/176* (2014.01)
*H04N 19/184* (2014.01)
*H04N 19/159* (2014.01)
*H04N 19/182* (2014.01)

(58) Field of Classification Search
USPC ...................................................... 375/240.12
See application file for complete search history.

(56) References Cited

U.S. PATENT DOCUMENTS

| | | | |
|---|---|---|---|
| 9,544,584 B2 | 1/2017 | Lim et al. | |
| 9,794,556 B2 | 10/2017 | Lim et al. | |
| 10,148,953 B2 | 12/2018 | Budagavi | |
| 2008/0031330 A1* | 2/2008 | Hong | H04N 19/86 375/240.12 |
| 2012/0314766 A1* | 12/2012 | Chien | H04N 19/11 375/240.12 |
| 2013/0083851 A1* | 4/2013 | Alshin | H04N 19/182 375/240.14 |
| 2014/0003522 A1* | 1/2014 | Park | H04N 19/109 375/240.16 |
| 2014/0205015 A1* | 7/2014 | Rusert | H04N 19/44 375/240.16 |
| 2015/0229957 A1* | 8/2015 | Zhao | H04N 19/597 375/240.12 |
| 2015/0271514 A1* | 9/2015 | Yoshikawa | H04N 19/50 375/240.12 |
| 2015/0365682 A1* | 12/2015 | Amon | H04N 19/182 375/240.02 |
| 2016/0345030 A1* | 11/2016 | Karczewicz | H04N 19/124 |
| 2017/0257632 A1 | 9/2017 | Lee et al. | |
| 2017/0272745 A1* | 9/2017 | Liu | H04N 19/157 |
| 2017/0332099 A1* | 11/2017 | Lee | H04N 19/122 |
| 2018/0199040 A1 | 7/2018 | Lee et al. | |
| 2018/0234679 A1 | 8/2018 | Heo et al. | |
| 2018/0278936 A1* | 9/2018 | Hendry | H04N 19/103 |
| 2018/0343448 A1* | 11/2018 | Possos | H04N 19/117 |
| 2018/0352222 A1* | 12/2018 | Liu | H04N 19/105 |

FOREIGN PATENT DOCUMENTS

| | | | | |
|---|---|---|---|---|
| KR | 101444667 | B1 | 9/2014 | |
| KR | 101600059 | B1 | 3/2016 | |
| KR | 101618484 | B1 | 5/2016 | |
| KR | 1020160057364 | A | 5/2016 | |
| KR | 1020170084114 | A | 7/2017 | |
| WO | 2017018664 | A1 | 2/2017 | |
| WO | 2017142335 | A1 | 8/2017 | |
| WO | WO-2017196957 | A1 * | 11/2017 | ........... H04N 9/8045 |

OTHER PUBLICATIONS

Aparna et al, Efficient architecture for planar and DC modes of intra prediction in HEVC (Year: 2020).*
Mei Guo et al. Direction based Angular Intra Prediction, Joint Collaborative Team on Video Coding (JCT-VC) of ITU-T SG16 WP3 and ISO/IEC JTC1/SC29/WG11, Document: JCTVC-F122, 6th Meeting: Torino, Italy, Jul. 15, 2011, pp. 1-7, MediaTek Inc.
Vadim Seregin et al., Block shape dependent intra mode coding, Joint Video Exploration Team (JVEI) of ITU-T SG 16 WP 3 and ISO/IEC JTC 1/SC 29/WG 11, Document: JVET-G0159, 7th Meeting: Torino, IT, Jul. 16, 2017, pp. 1-3, Qualcomm Incorporated.

* cited by examiner

DIAGONAL SCANNING

| SYMBOL | TRUNCATED BINARY CODE | REMAINING MODE |
|---|---|---|
| 0 | 00000 | FIRST PROBABLE REMAINING MODE |
| 1 | 00001 | SECOND PROBABLE REMAINING MODE |
| 2 | 00010 | THIRD PROBABLE REMAINING MODE |
| 3 | 000110 | FIRST PURE REMAINING MODE |
| 4 | 000111 | SECOND PURE REMAINING MODE |
| 5 | 001000 | THIRD PURE REMAINING MODE |
| 6 | 001001 | FOURTH PURE REMAINING MODE |
| ... | | |
| 59 | 111101 | 56-TH PURE REMAINING MODE |
| 60 | 111110 | 57-TH PURE REMAINING MODE |
| 61 | 111111 | 58-TH PURE REMAINING MODE |

FIG. 33

BIDIRECTIONAL INTRA PREDICTION METHOD AND APPARATUS

TECHNICAL FIELD

The following embodiments relate generally to a video decoding method and apparatus and a video encoding method and apparatus, and more particularly, to a video decoding method and apparatus and a video encoding method and apparatus that use bidirectional intra-prediction.

BACKGROUND ART

With the continuous development of the information and communication industries, broadcasting services supporting High-Definition (HD) resolution have been popularized all over the world. Through this popularization, a large number of users have become accustomed to high-resolution and high-definition images and/or videos.

To satisfy users' demand for high definition, many institutions have accelerated the development of next-generation imaging devices. Users' interest in UHD TVs, having resolution that is more than four times as high as that of Full HD (FHD) TVs, as well as High-Definition TVs (HDTV) and FHD TVs, has increased. As interest therein has increased, image encoding/decoding technology for images having higher resolution and higher definition is continually required.

An image encoding/decoding apparatus and method may use inter-prediction technology, intra-prediction technology, entropy-coding technology, etc. so as to perform encoding/decoding on a high-resolution and high-definition image. Inter-prediction technology may be technology for predicting the value of a pixel included in a target picture using temporally previous pictures and/or temporally subsequent pictures. Intra-prediction technology may be technology for predicting the value of a pixel included in a target picture using information about pixels in the target picture. Entropy-coding technology may be technology for assigning short code words to frequently occurring symbols and assigning long code words to rarely occurring symbols.

In intra-prediction, various detailed technologies have been developed, and the accuracy and efficiency of prediction may be improved due to the application of such detailed technologies.

DISCLOSURE

Technical Problem

An embodiment is intended to provide an encoding apparatus and method and a decoding apparatus and method that use bidirectional intra-prediction.

An embodiment is intended to provide an encoding apparatus and method and a decoding apparatus and method that use remaining modes.

Technical Solution

In accordance with an aspect, there is provided a decoding method, including determining an intra-prediction mode to be applied to decoding of a target block; and performing intra-prediction for the target block that uses the determined intra-prediction mode, wherein the intra-prediction mode is a bidirectional intra-prediction mode, and wherein the intra-prediction is a bidirectional intra-prediction.

The bidirectional intra-prediction mode may be determined based on an availability of a pixel in a neighbor block located in a specified direction from the target block.

The bidirectional intra-prediction mode may be determined based on a prediction mode of a neighbor block of the target block.

Two directions of the bidirectional intra-prediction may be two opposite linear directions.

A virtual neighbor pixel may be generated in a specified direction from the target block, and the bidirectional intra-prediction may be performed for the target block using the virtual neighbor pixel.

The specified direction may be one or more of a right direction and a bottom direction.

A prediction value for a target pixel in the target block may be derived using pixels in neighbor blocks located in two directions of the bidirectional intra-prediction.

A prediction value for a target pixel in the target block may be derived using weights depending on distances between respective pixels in neighbor blocks located in two directions of the bidirectional intra-prediction and the target pixel.

A prediction value for a target pixel in the target block may be derived using weights for two directions of the bidirectional intra-prediction.

Whether the bidirectional intra-prediction mode for the target block is to be used may be determined using a unidirectional/bidirectional classification indicator and an intra-prediction mode indicator.

Two directions of the bidirectional intra-prediction may be determined based on two directions indicated by two intra-prediction mode indicators.

A single intra-prediction mode indicator may indicate one of a direction of unidirectional intra-prediction and directions of the bidirectional intra-prediction.

One of unidirectional intra-prediction and the bidirectional intra-prediction may be selected depending on availability of a reference pixel in a direction corresponding to a direction indicated by an intra-prediction mode indicator.

Which one of unidirectional intra-prediction and the bidirectional intra-prediction is to be used for entirety of the target block may be determined.

Which one of unidirectional intra-prediction and the bidirectional intra-prediction is to be used for each of pixels in the target block may be determined.

For a first direction and a second direction of the bidirectional intra-prediction, when a reference pixel in the first direction or a reference pixel in the second direction is unavailable, a value of the unavailable reference pixel may be generated using padding.

A prediction value for a target pixel in the target block may be determined using at least one of reference pixels located in two prediction directions of the bidirectional intra-prediction mode.

A weight may be applied to each of the reference pixels.

A remaining mode indicator may indicate a remaining mode to be used for the intra-prediction of the target block, among remaining modes.

The remaining modes may be remaining intra-prediction modes other than Most Probable Modes (MPM) present in an MPM list.

The intra-prediction mode may be determined based on multiple different lists.

In accordance with another aspect, there is provided an encoding method, including determining an intra-prediction mode to be applied to decoding of a target block; and performing intra-prediction for the target block that uses the determined intra-prediction mode, wherein the intra-prediction mode is a bidirectional intra-prediction mode, and wherein the intra-prediction is a bidirectional intra-prediction.

In accordance with a further aspect, there is provided a computer-readable storage medium storing a bitstream for image decoding, the bitstream including information about an encoded target block, wherein an intra-prediction mode to be applied to decoding of the target block is determined, and wherein intra-prediction for the target block that uses the information about the encoded target block and the determined intra-prediction mode is performed.

Advantageous Effects

There are provided an encoding apparatus and method and a decoding apparatus and method that use bidirectional intra-prediction.

There are provided an encoding apparatus and method and a decoding apparatus and method that use remaining modes.

DESCRIPTION OF DRAWINGS

FIG. 33 illustrates the binarization of a remaining mode indicator according to an example;

BEST MODE

Figure 1:
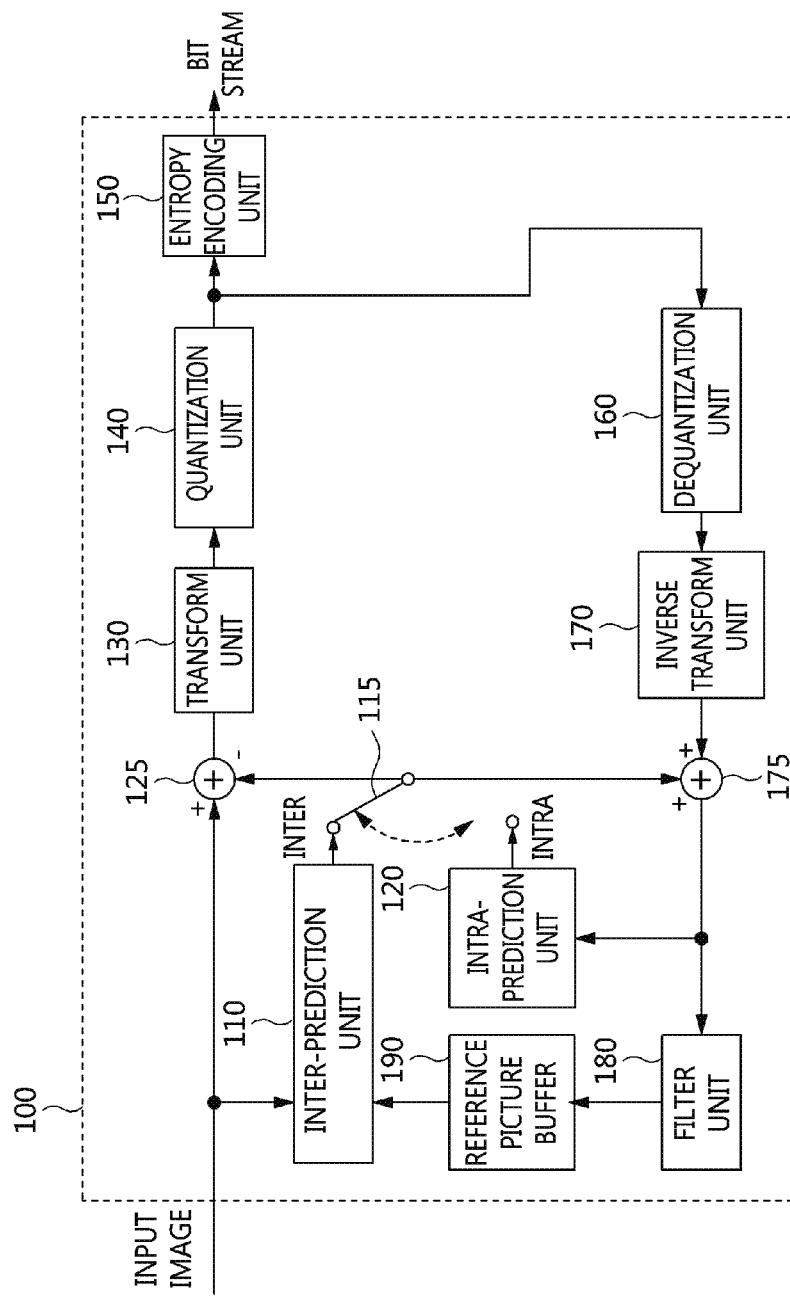
FIG. 1 is a block diagram illustrating the configuration of an embodiment of an encoding apparatus to which the present disclosure is applied.

The present invention may be variously changed, and may have various embodiments, and specific embodiments will be described in detail below with reference to the attached drawings. However, it should be understood that those embodiments are not intended to limit the present invention to specific disclosure forms, and that they include all changes, equivalents or modifications included in the spirit and scope of the present invention.

Detailed descriptions of the following exemplary embodiments will be made with reference to the attached drawings illustrating specific embodiments. These embodiments are described so that those having ordinary knowledge in the technical field to which the present disclosure pertains can easily practice the embodiments. It should be noted that the various embodiments are different from each other, but do not need to be mutually exclusive of each other. For example, specific shapes, structures, and characteristics described here may be implemented as other embodiments without departing from the spirit and scope of the embodiments in relation to an embodiment. Further, it should be understood that the locations or arrangement of individual components in each disclosed embodiment can be changed without departing from the spirit and scope of the embodiments. Therefore, the accompanying detailed description is not intended to restrict the scope of the disclosure, and the scope of the exemplary embodiments is limited only by the accompanying claims, along with equivalents thereof, as long as they are appropriately described.

In the drawings, similar reference numerals are used to designate the same or similar functions in various aspects. The shapes, sizes, etc. of components in the drawings may be exaggerated to make the description clear.

Terms such as "first" and "second" may be used to describe various components, but the components are not restricted by the terms. The terms are used only to distinguish one component from another component. For example, a first component may be named a second component without departing from the scope of the present specification. Likewise, a second component may be named a first component. The terms "and/or" may include combinations of a plurality of related described items or any of a plurality of related described items.

It will be understood that when a component is referred to as being "connected" or "coupled" to another component, the two components may be directly connected or coupled to each other, or intervening components may be present between the two components. It will be understood that when a component is referred to as being "directly connected or coupled", no intervening components are present between the two components.

Also, components described in the embodiments are independently shown in order to indicate different characteristic functions, but this does not mean that each of the components is formed of a separate piece of hardware or software. That is, the components are arranged and included separately for convenience of description. For example, at least two of the components may be integrated into a single component. Conversely, one component may be divided into multiple components. An embodiment into which the components are integrated or an embodiment in which some components are separated is included in the scope of the present specification as long as it does not depart from the essence of the present specification.

Further, it should be noted that, in the exemplary embodiments, an expression describing that a component "comprises" a specific component means that additional components may be included within the scope of the practice or the technical spirit of exemplary embodiments, but does not preclude the presence of components other than the specific component.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Embodiments will be described in detail below with reference to the accompanying drawings so that those having ordinary knowledge in the technical field to which the embodiments pertain can easily practice the embodiments. In the following description of the embodiments, detailed descriptions of known functions or configurations which are deemed to make the gist of the present specification obscure will be omitted. Further, the same reference numerals are used to designate the same components throughout the drawings, and repeated descriptions of the same components will be omitted.

Hereinafter, "image" may mean a single picture constituting a video, or may mean the video itself. For example, "encoding and/or decoding of an image" may mean "encoding and/or decoding of a video", and may also mean "encoding and/or decoding of any one of images constituting the video".

Hereinafter, the terms "video" and "motion picture" may be used to have the same meaning, and may be used interchangeably with each other.

Hereinafter, a target image may be an encoding target image, which is the target to be encoded, and/or a decoding target image, which is the target to be decoded. Further, the target image may be an input image that is input to an encoding apparatus or an input image that is input to a decoding apparatus.

Hereinafter, the terms "image", "picture", "frame", and "screen" may be used to have the same meaning and may be used interchangeably with each other.

Hereinafter, a target block may be an encoding target block, i.e. the target to be encoded and/or a decoding target block, i.e. the target to be decoded. Further, the target block may be a current block, i.e. the target to be currently encoded and/or decoded. Here, the terms "target block" and "current block" may be used to have the same meaning, and may be used interchangeably with each other.

Hereinafter, the terms "block" and "unit" may be used to have the same meaning, and may be used interchangeably with each other. Alternatively, "block" may denote a specific unit.

Hereinafter, the terms "region" and "segment" may be used interchangeably with each other.

Hereinafter, a specific signal may be a signal indicating a specific block. For example, the original signal may be a signal indicating a target block. A prediction signal may be a signal indicating a prediction block. A residual signal may be a signal indicating a residual block.

In the following embodiments, specific information, data, a flag, an element, and an attribute may have their respective values. A value of "0" corresponding to each of the information, data, flag, element, and attribute may indicate a logical false or a first predefined value. In other words, the value of "0", false, logical false, and a first predefined value may be used interchangeably with each other. A value of "1" corresponding to each of the information, data, flag, element, and attribute may indicate a logical true or a second predefined value. In other words, the value of "1", true, logical true, and a second predefined value may be used interchangeably with each other.

When a variable such as i or j is used to indicate a row, a column, or an index, the value of i may be an integer of 0 or more or an integer of 1 or more. In other words, in the embodiments, each of a row, a column, and an index may be counted from 0 or may be counted from 1.

Below, the terms to be used in embodiments will be described.

Encoder: An encoder denotes a device for performing encoding.

Decoder: A decoder denotes a device for performing decoding.

Unit: A unit may denote the unit of image encoding and decoding. The terms "unit" and "block" may be used to have the same meaning, and may be used interchangeably with each other.

"Unit" may be an M×N array of samples. M and N may be positive integers, respectively. The term "unit" may generally mean a two-dimensional (2D) array of samples.

In the encoding and decoding of an image, "unit" may be an area generated by the partitioning of one image. In other words, "unit" may be a region specified in one image. A single image may be partitioned into multiple units. Alternatively, one image may be partitioned into sub-parts, and the unit may denote each partitioned sub-part when encoding or decoding is performed on the partitioned sub-part.

In the encoding and decoding of an image, predefined processing may be performed on each unit depending on the type of the unit.

Depending on functions, the unit types may be classified into a macro unit, a Coding Unit (CU), a Prediction Unit (PU), a residual unit, a Transform Unit (TU), etc. Alternatively, depending on functions, the unit may denote a block, a macroblock, a coding tree unit, a coding tree block, a coding unit, a coding block, a prediction unit, a prediction block, a residual unit, a residual block, a transform unit, a transform block, etc.

The term "unit" may mean information including a luminance (luma) component block, a chrominance (chroma) component block corresponding thereto, and syntax elements for respective blocks so that the unit is designated to be distinguished from a block.

The size and shape of a unit may be variously implemented. Further, a unit may have any of various sizes and shapes. In particular, the shapes of the unit may include not only a square, but also a geometric figure that can be represented in two dimensions (2D), such as a rectangle, a trapezoid, a triangle, and a pentagon.

Further, unit information may include one or more of the type of a unit, the size of a unit, the depth of a unit, the order of encoding of a unit and the order of decoding of a unit, etc. For example, the type of a unit may indicate one of a CU, a PU, a residual unit and a TU.

One unit may be partitioned into sub-units, each having a smaller size than that of the relevant unit.

Depth: A depth may denote the degree to which the unit is partitioned. Further, the unit depth may indicate the level at which the corresponding unit is present when units are represented in a tree structure.

Unit partition information may include a depth indicating the depth of a unit. A depth may indicate the number of times the unit is partitioned and/or the degree to which the unit is partitioned.

In a tree structure, it may be considered that the depth of a root node is the smallest, and the depth of a leaf node is the largest.

A single unit may be hierarchically partitioned into multiple sub-units while having depth information based on a tree structure. In other words, the unit and sub-units, generated by partitioning the unit, may correspond to a node and child nodes of the node, respectively. Each of the partitioned sub-units may have a unit depth. Since the depth indicates the number of times the unit is partitioned and/or the degree to which the unit is partitioned, the partition information of the sub-units may include information about the sizes of the sub-units.

In a tree structure, the top node may correspond to the initial node before partitioning. The top node may be referred to as a "root node". Further, the root node may have a minimum depth value. Here, the top node may have a depth of level '0'.

A node having a depth of level '1' may denote a unit generated when the initial unit is partitioned once. A node having a depth of level '2' may denote a unit generated when the initial unit is partitioned twice.

A leaf node having a depth of level 'n' may denote a unit generated when the initial unit has been partitioned n times.

The leaf node may be a bottom node, which cannot be partitioned any further. The depth of the leaf node may be the maximum level. For example, a predefined value for the maximum level may be 3.

A QT depth may denote a depth for a quad-partitioning. A BT depth may denote a depth for a binary-partitioning. A TT depth may denote a depth for a ternary-partitioning.

Sample: A sample may be a base unit constituting a block. A sample may be represented by values from 0 to $2^{bd}-1$ depending on the bit depth (Bd).

A sample may be a pixel or a pixel value.

Hereinafter, the terms "pixel" and "sample" may be used to have the same meaning, and may be used interchangeably with each other.

A Coding Tree Unit (CTU): A CTU may be composed of a single luma component (Y) coding tree block and two chroma component (Cb, Cr) coding tree blocks related to the luma component coding tree block. Further, a CTU may mean information including the above blocks and a syntax element for each of the blocks.

Each coding tree unit (CTU) may be partitioned using one or more partitioning methods, such as a quad tree (QT), a binary tree (BT), and a ternary tree (TT) so as to configure sub-units, such as a coding unit, a prediction unit, and a transform unit.

"CTU" may be used as a term designating a pixel block, which is a processing unit in an image-decoding and encoding process, as in the case of partitioning of an input image.

Coding Tree Block (CTB): "CTB" may be used as a term designating any one of a Y coding tree block, a Cb coding tree block, and a Cr coding tree block.

Neighbor block: A neighbor block (or neighboring block) may mean a block adjacent to a target block. A neighbor block may mean a reconstructed neighbor block.

Hereinafter, the terms "neighbor block" and "adjacent block" may be used to have the same meaning and may be used interchangeably with each other.

Spatial neighbor block; A spatial neighbor block may a block spatially adjacent to a target block. A neighbor block may include a spatial neighbor block.

The target block and the spatial neighbor block may be included in a target picture.

The spatial neighbor block may mean a block, the boundary of which is in contact with the target block, or a block located within a predetermined distance from the target block.

The spatial neighbor block may mean a block adjacent to the vertex of the target block. Here, the block adjacent to the vertex of the target block may mean a block vertically adjacent to a neighbor block which is horizontally adjacent to the target block or a block horizontally adjacent to a neighbor block which is vertically adjacent to the target block.

Temporal neighbor block: A temporal neighbor block may be a block temporally adjacent to a target block. A neighbor block may include a temporal neighbor block.

The temporal neighbor block may include a co-located block (col block).

The col block may be a block in a previously reconstructed co-located picture (col picture). The location of the col block in the col-picture may correspond to the location of the target block in a target picture. Alternatively, the location of the col block in the col-picture may be equal to the location of the target block in the target picture. The col picture may be a picture included in a reference picture list.

The temporal neighbor block may be a block temporally adjacent to a spatial neighbor block of a target block.

Prediction unit: A prediction unit may be a base unit for prediction, such as inter prediction, intra prediction, inter compensation, intra compensation, and motion compensation.

A single prediction unit may be divided into multiple partitions having smaller sizes or sub-prediction units. The multiple partitions may also be base units in the performance of prediction or compensation. The partitions generated by dividing the prediction unit may also be prediction units.

Prediction unit partition: A prediction unit partition may be the shape into which a prediction unit is divided.

Reconstructed neighboring unit: A reconstructed neighboring unit may be a unit which has already been decoded and reconstructed around a target unit.

A reconstructed neighboring unit may be a unit that is spatially adjacent to the target unit or that is temporally adjacent to the target unit.

A reconstructed spatially neighboring unit may be a unit which is included in a target picture and which has already been reconstructed through encoding and/or decoding.

A reconstructed temporally neighboring unit may be a unit which is included in a reference image and which has already been reconstructed through encoding and/or decoding. The location of the reconstructed temporally neighboring unit in the reference image may be identical to that of the target unit in the target picture, or may correspond to the location of the target unit in the target picture.

Parameter set: A parameter set may be header information in the structure of a bitstream. For example, a parameter set may include a video parameter set, a sequence parameter set, a picture parameter set, an adaptation parameter set, etc.

Further, the parameter set may include slice header information and tile header information.

Rate-distortion optimization: An encoding apparatus may use rate-distortion optimization so as to provide high coding efficiency by utilizing combinations of the size of a coding unit (CU), a prediction mode, the size of a prediction unit (PU), motion information, and the size of a transform unit (TU).

A rate-distortion optimization scheme may calculate rate-distortion costs of respective combinations so as to select an optimal combination from among the combinations. The rate-distortion costs may be calculated using the following Equation 1. Generally, a combination enabling the rate-distortion cost to be minimized may be selected as the optimal combination in the rate-distortion optimization scheme.

$$D+\lambda*R \qquad \text{[Equation 1]}$$

D may denote distortion. D may be the mean of squares of differences (i.e. mean square error) between original transform coefficients and reconstructed transform coefficients in a transform unit.

R may denote the rate, which may denote a bit rate using related-context information.

$\lambda$ denotes a Lagrangian multiplier. R may include not only coding parameter information, such as a prediction mode, motion information, and a coded block flag, but also bits generated due to the encoding of transform coefficients.

An encoding apparatus may perform procedures, such as inter prediction and/or intra prediction, transform, quantization, entropy encoding, inverse quantization (dequantization), and inverse transform so as to calculate precise D and R. These procedures may greatly increase the complexity of the encoding apparatus.

Bitstream: A bitstream may denote a stream of bits including encoded image information.

Parameter set: A parameter set may be header information in the structure of a bitstream.

The parameter set may include at least one of a video parameter set, a sequence parameter set, a picture parameter set, and an adaptation parameter set. Further, the parameter set may include information about a slice header and information about a tile header.

Parsing: Parsing may be the decision on the value of a syntax element, made by performing entropy decoding on a bitstream. Alternatively, the term "parsing" may mean such entropy decoding itself.

Symbol: A symbol may be at least one of the syntax element, the coding parameter, and the transform coefficient of an encoding target unit and/or a decoding target unit. Further, a symbol may be the target of entropy encoding or the result of entropy decoding.

Reference picture: A reference picture may be an image referred to by a unit so as to perform inter prediction or motion compensation. Alternatively, a reference picture may be an image including a reference unit referred to by a target unit so as to perform inter prediction or motion compensation.

Hereinafter, the terms "reference picture" and "reference image" may be used to have the same meaning, and may be used interchangeably with each other.

Reference picture list: A reference picture list may be a list including one or more reference images used for inter prediction or motion compensation.

The types of a reference picture list may include List Combined (LC), List 0 (L0), List 1 (L1), List 2 (L2), List 3 (L3), etc.

For inter prediction, one or more reference picture lists may be used.

Inter-prediction indicator: An inter-prediction indicator may indicate the inter-prediction direction for a target unit. Inter prediction may be one of unidirectional prediction and bidirectional prediction. Alternatively, the inter-prediction indicator may denote the number of reference images used to generate a prediction unit of a target unit. Alternatively, the inter-prediction indicator may denote the number of prediction blocks used for inter prediction or motion compensation of a target unit.

Reference picture index: A reference picture index may be an index indicating a specific reference image in a reference picture list.

Motion vector (MV): A motion vector may be a 2D vector used for inter prediction or motion compensation. A motion vector may mean an offset between a target image and a reference image.

For example, a MV may be represented in a form such as ($mv_x$, $mv_y$). $mv_x$ may indicate a horizontal component, and $mv_y$ may indicate a vertical component.

Search range: A search range may be a 2D area in which a search for a MV is performed during inter prediction. For example, the size of the search range may be MxN. M and N may be respective positive integers.

Motion vector candidate: A motion vector candidate may be a block that is a prediction candidate or the motion vector of the block that is a prediction candidate when a motion vector is predicted.

A motion vector candidate may be included in a motion vector candidate list.

Motion vector candidate list: A motion vector candidate list may be a list configured using one or more motion vector candidates.

Motion vector candidate index: A motion vector candidate index may be an indicator for indicating a motion vector candidate in the motion vector candidate list. Alternatively, a motion vector candidate index may be the index of a motion vector predictor.

Motion information: Motion information may be information including at least one of a reference picture list, a reference image, a motion vector candidate, a motion vector candidate index, a merge candidate, and a merge index, as well as a motion vector, a reference picture index, and an inter-prediction indicator.

Merge candidate list: A merge candidate list may be a list configured using merge candidates.

Merge candidate: A merge candidate may be a spatial merge candidate, a temporal merge candidate, a combined merge candidate, a combined bi-prediction merge candidate, a zero-merge candidate, etc. A merge candidate may include motion information such as prediction type information, a reference picture index for each list, and a motion vector.

Merge index: A merge index may be an indicator for indicating a merge candidate in a merge candidate list.

A merge index may indicate a reconstructed unit used to derive a merge candidate between a reconstructed unit spatially adjacent to a target unit and a reconstructed unit temporally adjacent to the target unit.

A merge index may indicate at least one of pieces of motion information of a merge candidate.

Transform unit: A transform unit may be the base unit of residual signal encoding and/or residual signal decoding, such as transform, inverse transform, quantization, dequantization, transform coefficient encoding, and transform coefficient decoding. A single transform unit may be partitioned into multiple transform units having smaller sizes.

Scaling: Scaling may denote a procedure for multiplying a factor by a transform coefficient level.

As a result of scaling of the transform coefficient level, a transform coefficient may be generated. Scaling may also be referred to as "dequantization".

Quantization Parameter (QP): A quantization parameter may be a value used to generate a transform coefficient level for a transform coefficient in quantization. Alternatively, a quantization parameter may also be a value used to generate a transform coefficient by scaling the transform coefficient level in dequantization. Alternatively, a quantization parameter may be a value mapped to a quantization step size.

Delta quantization parameter: A delta quantization parameter is a differential value between a predicted quantization parameter and the quantization parameter of a target unit.

Scan: Scan may denote a method for aligning the order of coefficients in a unit, a block or a matrix. For example, a method for aligning a 2D array in the form of a one-dimensional (1D) array may be referred to as a "scan". Alternatively, a method for aligning a 1D array in the form of a 2D array may also be referred to as a "scan" or an "inverse scan".

Transform coefficient: A transform coefficient may be a coefficient value generated as an encoding apparatus performs a transform. Alternatively, the transform coefficient may be a coefficient value generated as a decoding apparatus performs at least one of entropy decoding and dequantization.

A quantized level or a quantized transform coefficient level generated by applying quantization to a transform coefficient or a residual signal may also be included in the meaning of the term "transform coefficient".

Quantized level: A quantized level may be a value generated as the encoding apparatus performs quantization on a transform coefficient or a residual signal. Alternatively, the quantized level may be a value that is the target of dequantization as the decoding apparatus performs dequantization.

A quantized transform coefficient level, which is the result of transform and quantization, may also be included in the meaning of a quantized level.

Non-zero transform coefficient: A non-zero transform coefficient may be a transform coefficient having a value other than 0 or a transform coefficient level having a value other than 0. Alternatively, a non-zero transform coefficient may be a transform coefficient, the magnitude of the value of which is not 0, or a transform coefficient level, the magnitude of the value of which is not 0.

Quantization matrix: A quantization matrix may be a matrix used in a quantization procedure or a dequantization procedure so as to improve the subjective image quality or objective image quality of an image. A quantization matrix may also be referred to as a "scaling list".

Quantization matrix coefficient: A quantization matrix coefficient may be each element in a quantization matrix. A quantization matrix coefficient may also be referred to as a "matrix coefficient".

Default matrix: A default matrix may be a quantization matrix predefined by the encoding apparatus and the decoding apparatus.

Non-default matrix: A non-default matrix may be a quantization matrix that is not predefined by the encoding apparatus and the decoding apparatus. The non-default matrix may be signaled by the encoding apparatus to the decoding apparatus.

Most Probable Mode (MPM): An MPM may denote an intra-prediction mode having a high probability of being used for intra prediction for a target block.

An encoding apparatus and a decoding apparatus may determine one or more MPMs based on coding parameters related to the target block and the attributes of entities related to the target block.

The encoding apparatus and the decoding apparatus may determine one or more MPMs based on the intra-prediction mode of a reference block. The reference block may include multiple reference blocks. The multiple reference blocks may include spatial neighbor blocks adjacent to the left of the target block and spatial neighbor blocks adjacent to the top of the target block. In other words, depending on which intra-prediction modes have been used for the reference blocks, one or more different MPMs may be determined.

The one or more MPMs may be determined in the same manner both in the encoding apparatus and in the decoding apparatus. That is, the encoding apparatus and the decoding apparatus may share the same MPM list including one or more MPMs.

MPM list: An MPM list may be a list including one or more MPMs. The number of the one or more MPMs in the MPM list may be defined in advance.

MPM indicator: An MPM indicator may indicate an MPM to be used for intra prediction for a target block among one or more MPMs in the MPM list. For example, the MPM indicator may be an index for the MPM list.

Since the MPM list is determined in the same manner both in the encoding apparatus and in the decoding apparatus, there may be no need to transmit the MPM list itself from the encoding apparatus to the decoding apparatus.

The MPM indicator may be signaled from the encoding apparatus to the decoding apparatus. As the MPM indicator is signaled, the decoding apparatus may determine the MPM to be used for intra prediction for the target block among the MPMs in the MPM list.

MPM use indicator: An MPM use indicator may indicate whether an MPM usage mode is to be used for prediction for a target block. The MPM usage mode may be a mode in which the MPM to be used for intra prediction for the target block is determined using the MPM list.

The MPM usage indicator may be signaled from the encoding apparatus to the decoding apparatus.

Signaling: "signaling" may denote that information is transferred from an encoding apparatus to a decoding apparatus. Alternatively, "signaling" may mean information is included in in a bitstream or a recoding medium. Information signaled by an encoding apparatus may be used by a decoding apparatus.

FIG. 1 is a block diagram illustrating the configuration of an embodiment of an encoding apparatus to which the present disclosure is applied.

An encoding apparatus 100 may be an encoder, a video encoding apparatus or an image encoding apparatus. A video may include one or more images (pictures). The encoding apparatus 100 may sequentially encode one or more images of the video.

Referring to FIG. 1, the encoding apparatus 100 includes an inter-prediction unit 110, an intra-prediction unit 120, a switch 115, a subtractor 125, a transform unit 130, a quantization unit 140, an entropy encoding unit 150, a dequantization (inverse quantization) unit 160, an inverse transform unit 170, an adder 175, a filter unit 180, and a reference picture buffer 190.

The encoding apparatus 100 may perform encoding on a target image using an intra mode and/or an inter mode.

Further, the encoding apparatus 100 may generate a bitstream, including information about encoding, via encoding on the target image, and may output the generated bitstream. The generated bitstream may be stored in a computer-readable storage medium and may be streamed through a wired/wireless transmission medium.

When the intra mode is used as a prediction mode, the switch 115 may switch to the intra mode. When the inter mode is used as a prediction mode, the switch 115 may switch to the inter mode.

The encoding apparatus 100 may generate a prediction block of a target block. Further, after the prediction block has been generated, the encoding apparatus 100 may encode a residual between the target block and the prediction block.

When the prediction mode is the intra mode, the intra-prediction unit 120 may use pixels of previously encoded/decoded neighboring blocks around the target block as reference samples. The intra-prediction unit 120 may perform spatial prediction on the target block using the reference samples, and may generate prediction samples for the target block via spatial prediction.

The inter-prediction unit 110 may include a motion prediction unit and a motion compensation unit.

When the prediction mode is an inter mode, the motion prediction unit may search a reference image for the area most closely matching the target block in a motion prediction procedure, and may derive a motion vector for the target block and the found area based on the found area.

The reference image may be stored in the reference picture buffer 190. More specifically, the reference image may be stored in the reference picture buffer 190 when the encoding and/or decoding of the reference image have been processed.

The motion compensation unit may generate a prediction block for the target block by performing motion compensation using a motion vector. Here, the motion vector may be a two-dimensional (2D) vector used for inter-prediction. Further, the motion vector may indicate an offset between the target image and the reference image.

The motion prediction unit and the motion compensation unit may generate a prediction block by applying an interpolation filter to a partial area of a reference image when the motion vector has a value other than an integer. In order to perform inter prediction or motion compensation, it may be determined which one of a skip mode, a merge mode, an advanced motion vector prediction (AMVP) mode, and a current picture reference mode corresponds to a method for predicting the motion of a PU included in a CU, based on the CU, and compensating for the motion, and inter prediction or motion compensation may be performed depending on the mode.

The subtractor 125 may generate a residual block, which is the differential between the target block and the prediction block. A residual block may also be referred to as a "residual signal".

The residual signal may be the difference between an original signal and a prediction signal. Alternatively, the residual signal may be a signal generated by transforming or quantizing the difference between an original signal and a prediction signal or by transforming and quantizing the difference. A residual block may be a residual signal for a block unit.

The transform unit 130 may generate a transform coefficient by transforming the residual block, and may output the generated transform coefficient. Here, the transform coefficient may be a coefficient value generated by transforming the residual block.

The transform unit 130 may use one of multiple predefined transform methods when performing a transform.

The multiple predefined transform methods may include a Discrete Cosine Transform (DCT), a Discrete Sine Transform (DST), a Karhunen-Loeve Transform (KLT), etc.

The transform method used to transform a residual block may be determined depending on at least one of coding parameters for a target block and/or a neighboring block. For example, the transform method may be determined based on at least one of an inter-prediction mode for a PU, an intra-prediction mode for a PU, the size of a TU, and the shape of a TU. Alternatively, transformation information indicating the transform method may be signaled from the encoding apparatus 100 to the decoding apparatus 200.

When a transform skip mode is used, the transform unit 130 may omit transforming the residual block.

By applying quantization to the transform coefficient, a quantized transform coefficient level or a quantized level may be generated. Hereinafter, in the embodiments, each of the quantized transform coefficient level and the quantized level may also be referred to as a 'transform coefficient'.

The quantization unit 140 may generate a quantized transform coefficient level or a quantized level by quantizing the transform coefficient depending on quantization parameters. The quantization unit 140 may output the quantized transform coefficient level or the quantized level that is generated. In this case, the quantization unit 140 may quantize the transform coefficient using a quantization matrix.

The entropy encoding unit 150 may generate a bitstream by performing probability distribution-based entropy encoding based on values, calculated by the quantization unit 140, and/or coding parameter values, calculated in the encoding procedure. The entropy encoding unit 150 may output the generated bitstream.

The entropy encoding unit 150 may perform entropy encoding on information about the pixels of the image and information required to decode the image. For example, the information required to decode the image may include syntax elements or the like.

When entropy encoding is applied, fewer bits may be assigned to more frequently occurring symbols, and more bits may be assigned to rarely occurring symbols. As symbols are represented by means of this assignment, the size of a bit string for target symbols to be encoded may be reduced. Therefore, the compression performance of video encoding may be improved through entropy encoding.

Further, for entropy encoding, the entropy encoding unit 150 may use a coding method such as exponential Golomb, Context-Adaptive Variable Length Coding (CAVLC), or Context-Adaptive Binary Arithmetic Coding (CABAC). For example, the entropy encoding unit 150 may perform entropy encoding using a Variable Length Coding/Code (VLC) table. For example, the entropy encoding unit 150 may derive a binarization method for a target symbol. Further, the entropy encoding unit 150 may derive a probability model for a target symbol/bin. The entropy encoding unit 150 may perform arithmetic coding using the derived binarization method, a probability model, and a context model.

The entropy encoding unit 150 may transform the coefficient of the form of a 2D block into the form of a 1D vector through a transform coefficient scanning method so as to encode a quantized transform coefficient level.

The coding parameters may be information required for encoding and/or decoding. The coding parameters may include information encoded by the encoding apparatus 100 and transferred from the encoding apparatus 100 to a decoding apparatus, and may also include information that may be derived in the encoding or decoding procedure. For example, information transferred to the decoding apparatus may include syntax elements.

The coding parameters may include not only information (or a flag or an index), such as a syntax element, which is encoded by the encoding apparatus and is signaled by the encoding apparatus to the decoding apparatus, but also information derived in an encoding or decoding process. Further, the coding parameters may include information required so as to encode or decode images. For example, the coding parameters may include at least one value, combinations or statistics of the size of a unit/block, the depth of a unit/block, partition information of a unit/block, the partition structure of a unit/block, information indicating whether a unit/block is partitioned in a quad-tree structure, information indicating whether a unit/block is partitioned in a binary tree structure, the partitioning direction of a binary tree structure (horizontal direction or vertical direction), the partitioning form of a binary tree structure (symmetrical partitioning or asymmetrical partitioning), information indicating whether a unit/block is partitioned in a ternary tree structure, the partitioning direction of a ternary tree structure (horizontal direction or vertical direction), a prediction scheme (intra prediction or inter prediction), an intra-prediction mode/direction, a reference sample filtering method, a prediction block filtering method, a prediction block boundary filtering method, a filter tap for filtering, a filter coefficient for filtering, an inter-prediction mode, motion information, a motion vector, a reference picture index, an inter-prediction direction, an inter-prediction indicator, a reference picture list, a reference image, a motion vector predictor, a motion vector prediction candidate, a motion vector candidate list, information indicating whether a merge mode is used, a merge candidate, a merge candidate list, information indicating whether a skip mode is used, the type of an interpolation filter, the tap of an interpolation filter, the filter coefficient of an interpolation filter, the magnitude of a motion vector, accuracy of motion vector representation, a transform type, a transform size, information indicating whether a primary transform is used, information indicating whether an additional (secondary) transform is used, a primary transform index, a secondary transform index, information indicating the presence or absence of a residual signal, a coded block pattern, a coded block flag, a quantization parameter, a quantization matrix, information about an intra-loop filter, information indicating whether an intra-loop filter is applied, the coefficient of an intra-loop filter, the tap of an intra-loop filter, the shape/form of an intra-loop filter, information indicating whether a deblocking filter is applied, the coefficient of a deblocking filter, the tap of a deblocking filter, deblocking filter strength, the shape/form of a deblocking filter, information indicating whether an adaptive sample offset is applied, the value of an adaptive sample offset, the category of an adaptive sample offset, the type of an adaptive sample offset, information indicating whether an adaptive in-loop filter is applied, the coefficient of an adaptive in-loop filter, the tap of an adaptive in-loop filter, the shape/form of an adaptive in-loop filter, a binarization/inverse binarization method, a context model, a context model decision method, a context model update method, information indicating whether a regular mode is performed, information whether a bypass mode is performed, a context bin, a bypass bin, a transform coefficient, a transform coefficient level, a transform coefficient level scanning method, an image display/output order, slice identification information, a slice type, slice partition information, tile identification information, a tile type, tile partition information, a picture type, bit depth, information about a luma signal, and information about a chroma signal. The prediction scheme may denote one prediction mode of an intra prediction mode and an inter prediction mode.

The residual signal may denote the difference between the original signal and a prediction signal. Alternatively, the residual signal may be a signal generated by transforming the difference between the original signal and the prediction signal. Alternatively, the residual signal may be a signal generated by transforming and quantizing the difference between the original signal and the prediction signal. A residual block may be the residual signal for a block.

Here, signaling a flag or an index may mean that the encoding apparatus 100 includes an entropy-encoded flag or an entropy-encoded index, generated by performing entropy encoding on the flag or index, in a bitstream, and that the decoding apparatus 200 acquires a flag or an index by performing entropy decoding on the entropy-encoded flag or the entropy-encoded index, extracted from the bitstream.

Since the encoding apparatus 100 performs encoding via inter prediction, the encoded target image may be used as a reference image for additional image(s) to be subsequently processed. Therefore, the encoding apparatus 100 may reconstruct or decode the encoded target image and store the reconstructed or decoded image as a reference image in the reference picture buffer 190. For decoding, dequantization and inverse transform on the encoded target image may be processed.

The quantized level may be inversely quantized by the dequantization unit 160, and may be inversely transformed by the inverse transform unit 170. The coefficient that has been inversely quantized and/or inversely transformed may be added to the prediction block by the adder 175. The inversely quantized and/or inversely transformed coefficient and the prediction block are added, and then a reconstructed block may be generated. Here, the inversely quantized and/or inversely transformed coefficient may denote a coefficient on which one or more of dequantization and inverse transform are performed, and may also denote a reconstructed residual block.

The reconstructed block may be subjected to filtering through the filter unit 180. The filter unit 180 may apply one or more of a deblocking filter, a Sample Adaptive Offset (SAO) filter, and an Adaptive Loop Filter (ALF) to the reconstructed block or a reconstructed picture. The filter unit 180 may also be referred to as an "in-loop filter".

The deblocking filter may eliminate block distortion occurring at the boundaries between blocks. In order to determine whether to apply the deblocking filter, the number of columns or rows which are included in a block and which include pixel(s) based on which it is determined whether to apply the deblocking filter to a target block may be decided on.

When the deblocking filter is applied to the target block, the applied filter may differ depending on the strength of the required deblocking filtering. In other words, among different filters, a filter decided on in consideration of the strength of deblocking filtering may be applied to the target block. When a deblocking filter is applied to a target block, a filter corresponding to any one of a strong filter and a weak filter may be applied to the target block depending on the strength of required deblocking filtering.

Also, when vertical filtering and horizontal filtering are performed on the target block, the horizontal filtering and the vertical filtering may be processed in parallel.

The SAO may add a suitable offset to the values of pixels to compensate for coding error. The SAO may perform, for the image to which deblocking is applied, correction that uses an offset in the difference between an original image and the image to which deblocking is applied, on a pixel basis. To perform an offset correction for an image, a method for dividing the pixels included in the image into a certain number of regions, determining a region to which an offset is to be applied, among the divided regions, and applying an offset to the determined region may be used, and a method for applying an offset in consideration of edge information of each pixel may also be used.

The ALF may perform filtering based on a value obtained by comparing a reconstructed image with an original image. After pixels included in an image have been divided into a predetermined number of groups, filters to be applied to each group may be determined, and filtering may be differentially performed for respective groups. For a luma signal, information related to whether to apply an adaptive loop filter may be signaled for each CU. The shapes and filter coefficients of ALFs to be applied to respective blocks may differ for respective blocks. Alternatively, regardless of the features of a block, an ALF having a fixed form may be applied to the block.

The reconstructed block or the reconstructed image subjected to filtering through the filter unit 180 may be stored in the reference picture buffer 190. The reconstructed block subjected to filtering through the filter unit 180 may be a part of a reference picture. In other words, the reference picture may be a reconstructed picture composed of reconstructed blocks subjected to filtering through the filter unit 180. The stored reference picture may be subsequently used for inter prediction.

Figure 2:
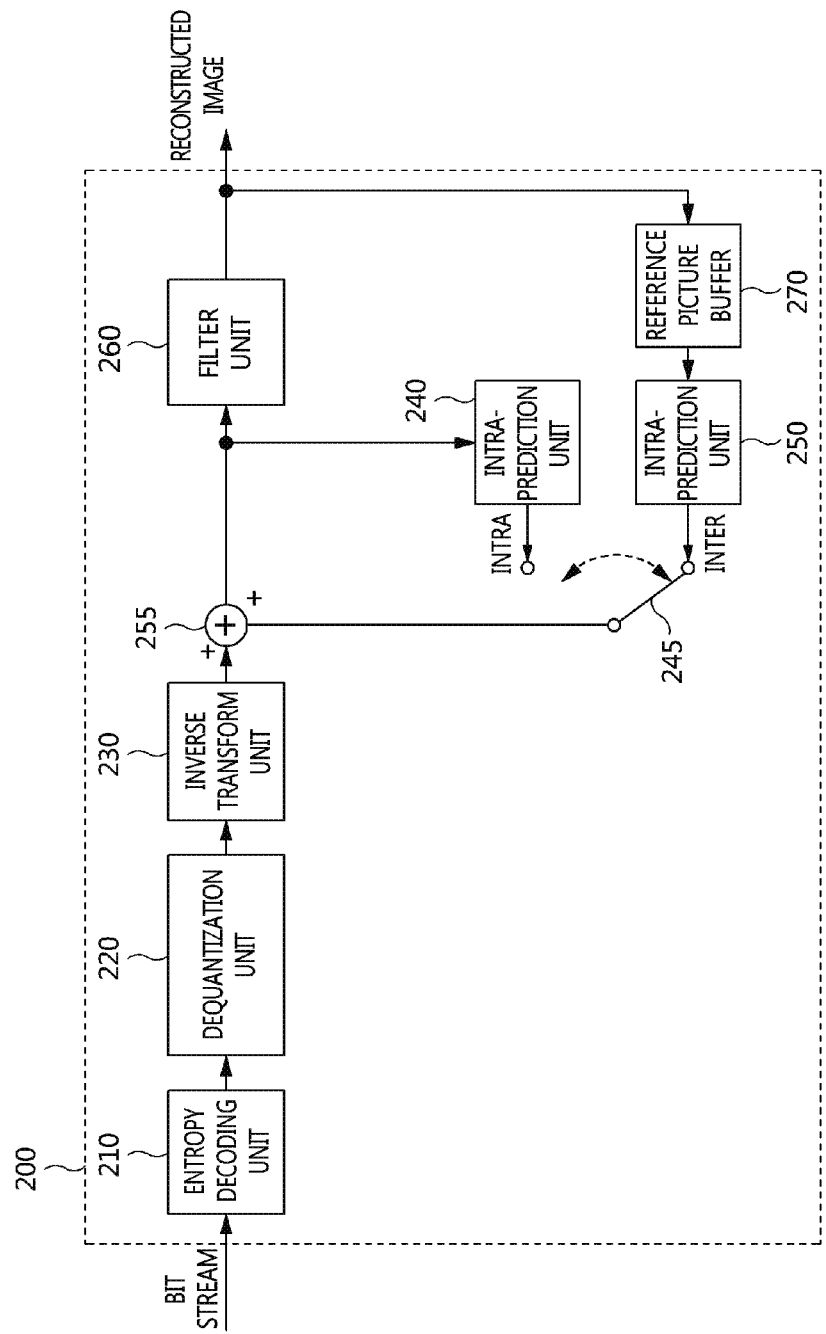
FIG. 2 is a block diagram illustrating the configuration of an embodiment of a decoding apparatus to which the present disclosure is applied.

FIG. 2 is a block diagram illustrating the configuration of an embodiment of a decoding apparatus to which the present disclosure is applied.

A decoding apparatus 200 may be a decoder, a video decoding apparatus or an image decoding apparatus.

Referring to FIG. 2, the decoding apparatus 200 may include an entropy decoding unit 210, a dequantization (inverse quantization) unit 220, an inverse transform unit 230, an intra-prediction unit 240, an inter-prediction unit 250, a switch 245 an adder 255, a filter unit 260, and a reference picture buffer 270.

The decoding apparatus 200 may receive a bitstream output from the encoding apparatus 100. The decoding apparatus 200 may receive a bitstream stored in a computer-readable storage medium, and may receive a bitstream that is streamed through a wired/wireless transmission medium.

The decoding apparatus 200 may perform decoding on the bitstream in an intra mode and/or an inter mode. Further, the decoding apparatus 200 may generate a reconstructed image or a decoded image via decoding, and may output the reconstructed image or decoded image.

For example, switching to an intra mode or an inter mode based on the prediction mode used for decoding may be performed by the switch 245. When the prediction mode used for decoding is an intra mode, the switch 245 may be operated to switch to the intra mode. When the prediction mode used for decoding is an inter mode, the switch 245 may be operated to switch to the inter mode.

The decoding apparatus 200 may acquire a reconstructed residual block by decoding the input bitstream, and may generate a prediction block. When the reconstructed residual block and the prediction block are acquired, the decoding apparatus 200 may generate a reconstructed block, which is the target to be decoded, by adding the reconstructed residual block to the prediction block.

The entropy decoding unit 210 may generate symbols by performing entropy decoding on the bitstream based on the probability distribution of a bitstream. The generated symbols may include quantized transform coefficient level-format symbols. Here, the entropy decoding method may be similar to the above-described entropy encoding method. That is, the entropy decoding method may be the reverse procedure of the above-described entropy encoding method.

The entropy decoding unit 210 may change a coefficient having a one-dimensional (1D) vector form to a 2D block shape through a transform coefficient scanning method in order to decode a quantized transform coefficient level.

For example, the coefficients of the block may be changed to 2D block shapes by scanning the block coefficients using up-right diagonal scanning. Alternatively, which one of up-right diagonal scanning, vertical scanning, and horizontal scanning is to be used may be determined depending on the size and/or the intra-prediction mode of the corresponding block.

The quantized coefficient may be inversely quantized by the dequantization unit 220. The dequantization unit 220 may generate an inversely quantized coefficient by performing dequantization on the quantized coefficient. Further, the inversely quantized coefficient may be inversely transformed by the inverse transform unit 230. The inverse transform unit 230 may generate a reconstructed residual block by performing an inverse transform on the inversely quantized coefficient. As a result of performing dequantization and the inverse transform on the quantized coefficient, the reconstructed residual block may be generated. Here, the dequantization unit 220 may apply a quantization matrix to the quantized coefficient when generating the reconstructed residual block.

When the intra mode is used, the intra-prediction unit 240 may generate a prediction block by performing spatial prediction that uses the pixel values of previously decoded neighboring blocks around a target block.

The inter-prediction unit 250 may include a motion compensation unit. Alternatively, the inter-prediction unit 250 may be designated as a "motion compensation unit".

When the inter mode is used, the motion compensation unit may generate a prediction block by performing motion compensation that uses a motion vector and a reference image stored in the reference picture buffer 270.

The motion compensation unit may apply an interpolation filter to a partial area of the reference image when the motion vector has a value other than an integer, and may generate a prediction block using the reference image to which the interpolation filter is applied. In order to perform motion compensation, the motion compensation unit may determine which one of a skip mode, a merge mode, an Advanced Motion Vector Prediction (AMVP) mode, and a current picture reference mode corresponds to the motion compensation method used for a PU included in a CU, based on the CU, and may perform motion compensation depending on the determined mode.

The reconstructed residual block and the prediction block may be added to each other by the adder 255. The adder 255 may generate a reconstructed block by adding the reconstructed residual block to the prediction block.

The reconstructed block may be subjected to filtering through the filter unit 260. The filter unit 260 may apply at least one of a deblocking filter, an SAO filter, and an ALF to the reconstructed block or the reconstructed image. The reconstructed image may be a picture including the reconstructed block.

The reconstructed image subjected to filtering may be outputted by the encoding apparatus 100, and may be used by the encoding apparatus.

The reconstructed image subjected to filtering through the filter unit 260 may be stored as a reference picture in the reference picture buffer 270. The reconstructed block subjected to filtering through the filter unit 260 may be a part of the reference picture. In other words, the reference picture may be an image composed of reconstructed blocks subjected to filtering through the filter unit 260. The stored reference picture may be subsequently used for inter prediction.

Figure 3:
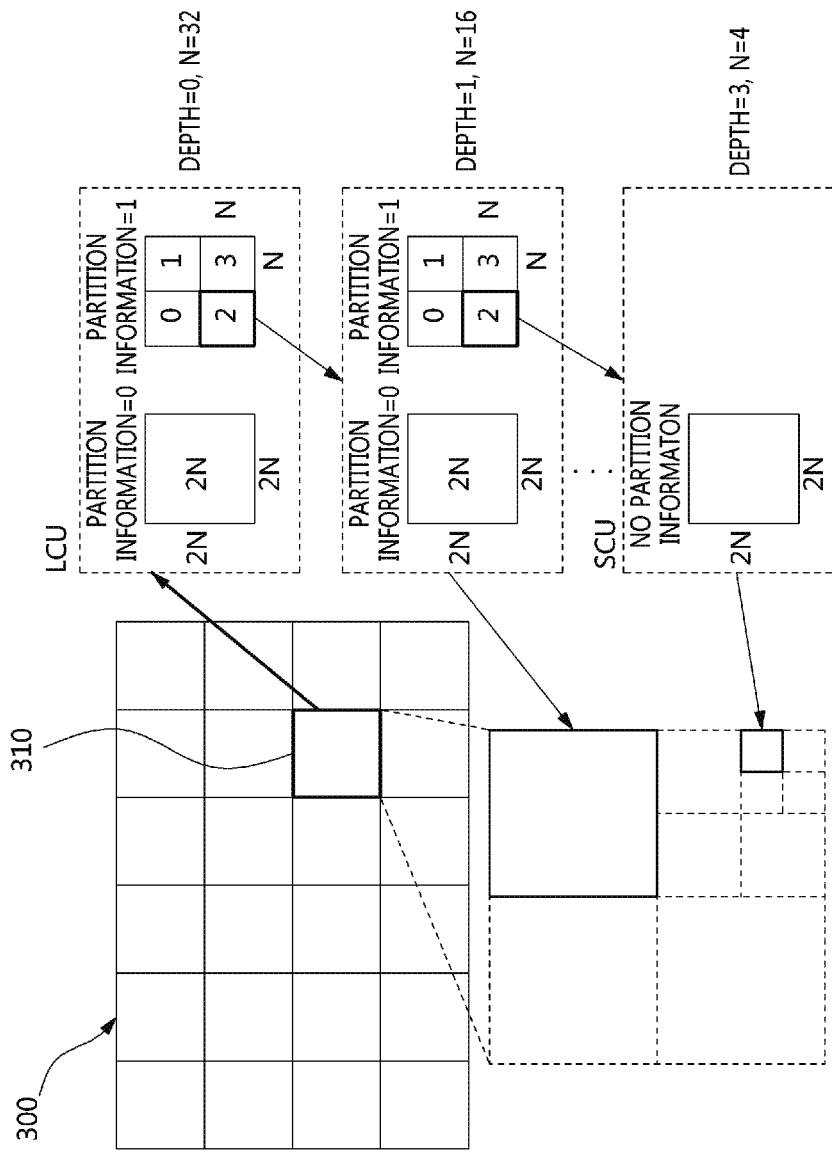
FIG. 3 is a diagram schematically illustrating the partition structure of an image when the image is encoded and decoded.

FIG. 3 is a diagram schematically illustrating the partition structure of an image when the image is encoded and decoded.

FIG. 3 may schematically illustrate an example in which a single unit is partitioned into multiple sub-units.

In order to efficiently partition the image, a Coding Unit (CU) may be used in encoding and decoding. The term "unit" may be used to collectively designate 1) a block including image samples and 2) a syntax element. For example, the "partitioning of a unit" may mean the "partitioning of a block corresponding to a unit".

A CU may be used as a base unit for image encoding/decoding. A CU may be used as a unit to which one mode selected from an intra mode and an inter mode in image encoding/decoding is applied. In other words, in image encoding/decoding, which one of an intra mode and an inter mode is to be applied to each CU may be determined.

Further, a CU may be a base unit in prediction, transform, quantization, inverse transform, dequantization, and encoding/decoding of transform coefficients.

Referring to FIG. 3, an image 200 may be sequentially partitioned into units corresponding to a Largest Coding Unit (LCU), and a partition structure may be determined for each LCU. Here, the LCU may be used to have the same meaning as a Coding Tree Unit (CTU).

The partitioning of a unit may mean the partitioning of a block corresponding to the unit. Block partition information may include depth information about the depth of a unit. The depth information may indicate the number of times the unit is partitioned and/or the degree to which the unit is partitioned. A single unit may be hierarchically partitioned into sub-units while having depth information based on a tree structure. Each of partitioned sub-units may have depth information. The depth information may be information indicating the size of a CU. The depth information may be stored for each CU.

Each CU may have depth information. When the CU is partitioned, CUs resulting from partitioning may have a depth increased from the depth of the partitioned CU by 1.

The partition structure may mean the distribution of Coding Units (CUs) to efficiently encode the image in an LCU 310. Such a distribution may be determined depending on whether a single CU is to be partitioned into multiple CUs. The number of CUs generated by partitioning may be a positive integer of 2 or more, including 2, 3, 4, 8, 16, etc. The horizontal size and the vertical size of each of CUs generated by the partitioning may be less than the horizontal size and the vertical size of a CU before being partitioned, depending on the number of CUs generated by partitioning.

Each partitioned CU may be recursively partitioned into four CUs in the same way. Via the recursive partitioning, at least one of the horizontal size and the vertical size of each partitioned CU may be reduced compared to at least one of the horizontal size and the vertical size of the CU before being partitioned.

The partitioning of a CU may be recursively performed up to a predefined depth or a predefined size. For example, the depth of a CU may have a value ranging from 0 to 3. The size of the CU may range from a size of 64×64 to a size of 8×8 depending on the depth of the CU.

For example, the depth of an LCU may be 0, and the depth of a Smallest Coding Unit (SCU) may be a predefined maximum depth. Here, as described above, the LCU may be the CU having the maximum coding unit size, and the SCU may be the CU having the minimum coding unit size.

Partitioning may start at the LCU 310, and the depth of a CU may be increased by 1 whenever the horizontal and/or vertical sizes of the CU are reduced by partitioning.

For example, for respective depths, a CU that is not partitioned may have a size of 2N×2N. Further, in the case of a CU that is partitioned, a CU having a size of 2N×2N may be partitioned into four CUs, each having a size of N×N. The value of N may be halved whenever the depth is increased by 1.

Referring to FIG. 3, an LCU having a depth of 0 may have 64×64 pixels or 64×64 blocks. 0 may be a minimum depth. An SCU having a depth of 3 may have 8×8 pixels or 8×8 blocks. 3 may be a maximum depth. Here, a CU having 64×64 blocks, which is the LCU, may be represented by a depth of 0. A CU having 32×32 blocks may be represented by a depth of 1. A CU having 16×16 blocks may be represented by a depth of 2. A CU having 8×8 blocks, which is the SCU, may be represented by a depth of 3.

Information about whether the corresponding CU is partitioned may be represented by the partition information of the CU. The partition information may be 1-bit information. All CUs except the SCU may include partition information. For example, the value of the partition information of a CU that is not partitioned may be 0. The value of the partition information of a CU that is partitioned may be 1.

For example, when a single CU is partitioned into four CUs, the horizontal size and vertical size of each of four CUs generated by partitioning may be half the horizontal size and the vertical size of the CU before being partitioned. When a CU having a 32×32 size is partitioned into four CUs, the size of each of four partitioned CUs may be 16×16. When a single CU is partitioned into four CUs, it may be considered that the CU has been partitioned in a quad-tree structure.

For example, when a single CU is partitioned into two CUs, the horizontal size or the vertical size of each of two CUs generated by partitioning may be half the horizontal size or the vertical size of the CU before being partitioned. When a CU having a 32×32 size is vertically partitioned into two CUs, the size of each of two partitioned CUs may be 16×32. When a CU having a 32×32 size is horizontally partitioned into two CUs, the size of each of two partitioned CUs may be 32×16. When a single CU is partitioned into two CUs, it may be considered that the CU has been partitioned in a binary-tree structure.

Both of quad-tree partitioning and binary-tree partitioning are applied to the LCU 310 of FIG. 3.

In the encoding apparatus 100, a Coding Tree Unit (CTU) having a size of 64×64 may be partitioned into multiple smaller CUs by a recursive quad-tree structure. A single CU may be partitioned into four CUs having the same size. Each CU may be recursively partitioned, and may have a quad-tree structure.

By the recursive partitioning of a CU, an optimal partitioning method that incurs a minimum rate-distortion cost may be selected.

Figure 4:
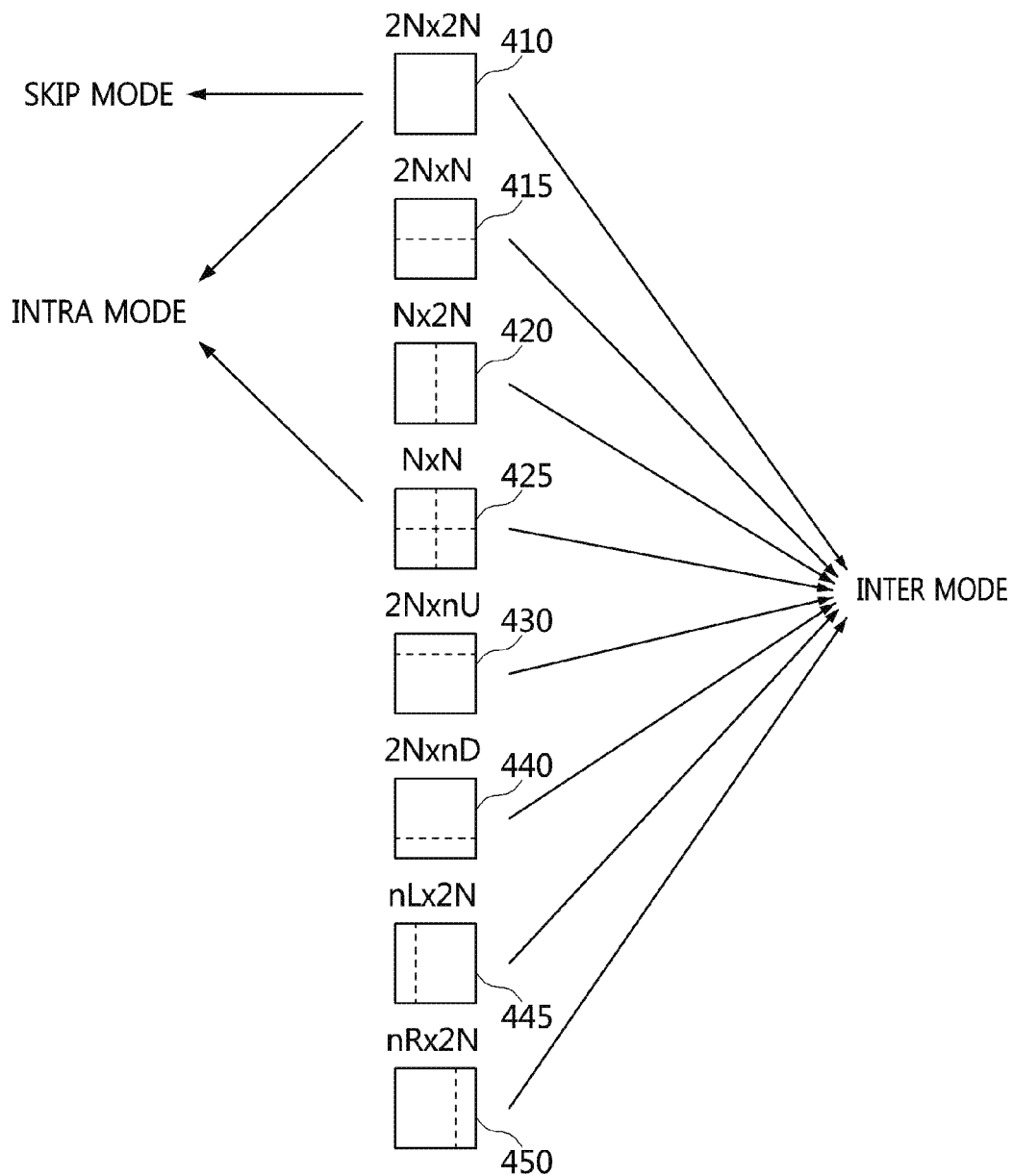
FIG. 4 is a diagram illustrating the form of a Prediction Unit (PU) that a Coding Unit (CU) can include.

FIG. 4 is a diagram illustrating the form of a Prediction Unit (PU) that a Coding Unit (CU) can include.

When, among CUs partitioned from an LCU, a CU, which is not partitioned any further, may be divided into one or more Prediction Units (PUs). Such division is also referred to as "partitioning".

A PU may be a base unit for prediction. A PU may be encoded and decoded in any one of a skip mode, an inter mode, and an intra mode. A PU may be partitioned into various shapes depending on respective modes. For example, the target block, described above with reference to FIG. 1, and the target block, described above with reference to FIG. 2, may each be a PU.

A CU may not be split into PUs. When the CU is not split into PUs, the size of the CU and the size of a PU may be equal to each other.

In a skip mode, partitioning may not be present in a CU. In the skip mode, a 2N×2N mode 410, in which the sizes of a PU and a CU are identical to each other, may be supported without partitioning.

In an inter mode, 8 types of partition shapes may be present in a CU. For example, in the inter mode, the 2N×2N mode 410, a 2N×N mode 415, an N×2N mode 420, an N×N mode 425, a 2N×nU mode 430, a 2N×nD mode 435, an nL×2N mode 440, and an nR×2N mode 445 may be supported.

In an intra mode, the 2N×2N mode 410 and the N×N mode 425 may be supported.

In the 2N×2N mode 410, a PU having a size of 2N×2N may be encoded. The PU having a size of 2N×2N may mean a PU having a size identical to that of the CU. For example, the PU having a size of 2N×2N may have a size of 64×64, 32×32, 16×16 or 8×8.

In the N×N mode 425, a PU having a size of N×N may be encoded.

For example, in intra prediction, when the size of a PU is 8×8, four partitioned PUs may be encoded. The size of each partitioned PU may be 4×4.

When a PU is encoded in an intra mode, the PU may be encoded using any one of multiple intra-prediction modes. For example, HEVC technology may provide 35 intra-prediction modes, and the PU may be encoded in any one of the 35 intra-prediction modes.

Which one of the 2N×2N mode 410 and the N×N mode 425 is to be used to encode the PU may be determined based on rate-distortion cost.

The encoding apparatus 100 may perform an encoding operation on a PU having a size of 2N×2N. Here, the encoding operation may be the operation of encoding the PU in each of multiple intra-prediction modes that can be used by the encoding apparatus 100. Through the encoding operation, the optimal intra-prediction mode for a PU having a size of 2N×2N may be derived. The optimal intra-prediction mode may be an intra-prediction mode in which a minimum rate-distortion cost occurs upon encoding the PU having a size of 2N×2N, among multiple intra-prediction modes that can be used by the encoding apparatus 100.

Further, the encoding apparatus 100 may sequentially perform an encoding operation on respective PUs obtained from N×N partitioning. Here, the encoding operation may be the operation of encoding a PU in each of multiple intra-prediction modes that can be used by the encoding apparatus 100. By means of the encoding operation, the optimal intra-prediction mode for the PU having a size of N×N may be derived. The optimal intra-prediction mode may be an intra-prediction mode in which a minimum rate-distortion cost occurs upon encoding the PU having a size of N×N, among multiple intra-prediction modes that can be used by the encoding apparatus 100.

The encoding apparatus 100 may determine which of a PU having a size of 2N×2N and PUs having sizes of N×N to be encoded based on a comparison of a rate-distortion cost of the PU having a size of 2N×2N and a rate-distortion costs of the PUs having sizes of N×N.

A single CU may be partitioned into one or more PUs, and a PU may be partitioned into multiple PUs.

For example, when a single PU is partitioned into four PUs, the horizontal size and vertical size of each of four PUs generated by partitioning may be half the horizontal size and the vertical size of the PU before being partitioned. When a PU having a 32×32 size is partitioned into four PUs, the size of each of four partitioned PUs may be 16×16. When a single PU is partitioned into four PUs, it may be considered that the PU has been partitioned in a quad-tree structure.

For example, when a single PU is partitioned into two PUs, the horizontal size or the vertical size of each of two PUs generated by partitioning may be half the horizontal size or the vertical size of the PU before being partitioned. When a PU having a 32×32 size is vertically partitioned into two PUs, the size of each of two partitioned PUs may be 16×32. When a PU having a 32×32 size is horizontally partitioned into two PUs, the size of each of two partitioned PUs may be 32×16. When a single PU is partitioned into two PUs, it may be considered that the PU has been partitioned in a binary-tree structure.

Figure 5:
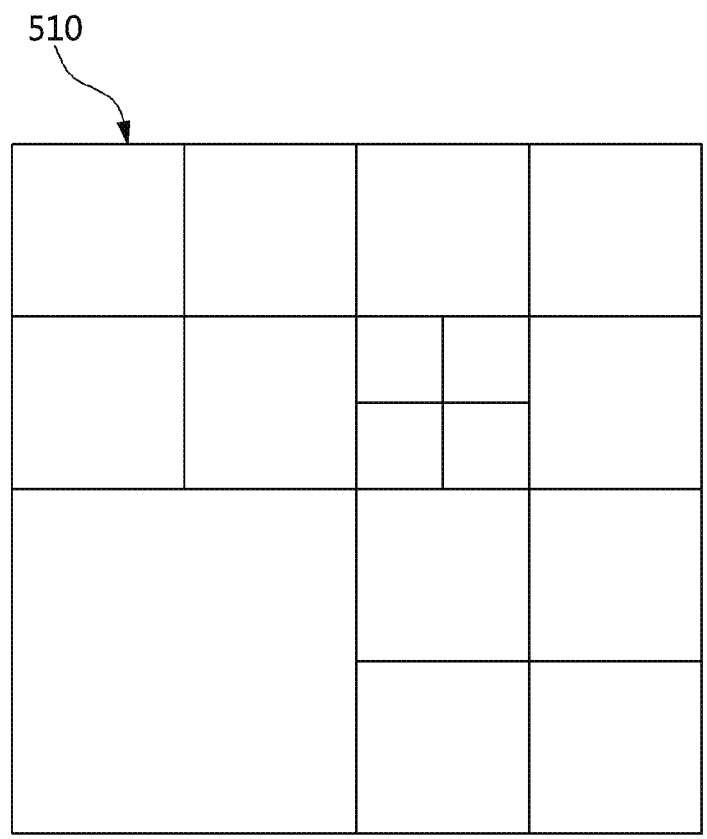
FIG. 5 is a diagram illustrating the form of a Transform Unit (TU) that can be included in a CU.

FIG. 5 is a diagram illustrating the form of a Transform Unit (TU) that can be included in a CU.

A Transform Unit (TU) may have a base unit that is used for a procedure, such as transform, quantization, inverse transform, dequantization, entropy encoding, and entropy decoding, in a CU.

A TU may have a square shape or a rectangular shape. A shape of a TU may be determined based on a size and/or a shape of a CU.

Among CUs partitioned from the LCU, a CU which is not partitioned into CUs any further may be partitioned into one or more TUs. Here, the partition structure of a TU may be a quad-tree structure. For example, as shown in FIG. 5, a single CU 510 may be partitioned one or more times depending on the quad-tree structure. By means of this partitioning, the single CU 510 may be composed of TUs having various sizes.

It can be considered that when a single CU is split two or more times, the CU is recursively split. Through splitting, a single CU may be composed of Transform Units (TUs) having various sizes.

Alternatively, a single CU may be split into one or more TUs based on the number of vertical lines and/or horizontal lines that split the CU.

A CU may be split into symmetric TUs or asymmetric TUs. For splitting into asymmetric TUs, information about the size and/or shape of each TU may be signaled from the encoding apparatus 100 to the decoding apparatus 200. Alternatively, the size and/or shape of each TU may be derived from information about the size and/or shape of the CU.

A CU may not be split into TUs. When the CU is not split into TUs, the size of the CU and the size of a TU may be equal to each other.

A single CU may be partitioned into one or more TUs, and a TU may be partitioned into multiple TUs.

For example, when a single TU is partitioned into four TUs, the horizontal size and vertical size of each of four TUs generated by partitioning may be half the horizontal size and the vertical size of the TU before being partitioned. When a TU having a 32×32 size is partitioned into four TUs, the size of each of four partitioned TUs may be 16×16. When a single TU is partitioned into four TUs, it may be considered that the TU has been partitioned in a quad-tree structure.

For example, when a single TU is partitioned into two TUs, the horizontal size or the vertical size of each of two TUs generated by partitioning may be half the horizontal size or the vertical size of the TU before being partitioned. When a TU having a 32×32 size is vertically partitioned into two TUs, the size of each of two partitioned TUs may be 16×32. When a TU having a 32×32 size is horizontally partitioned into two TUs, the size of each of two partitioned TUs may be 32×16. When a single TU is partitioned into two TUs, it may be considered that the TU has been partitioned in a binary-tree structure.

Figure 6:
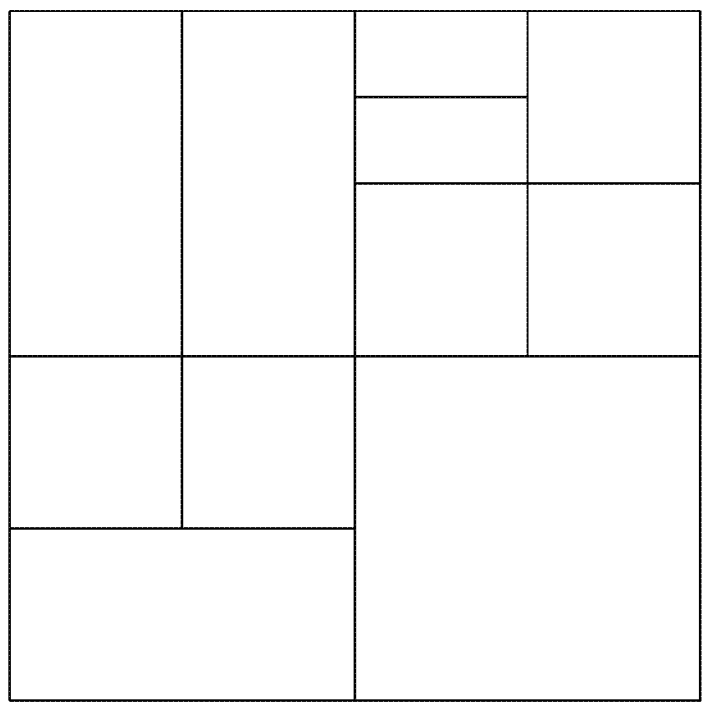
FIG. 6 illustrates splitting of a block according to an example.

FIG. 6 illustrates the splitting of a block according to an example.

In a video encoding and/or decoding process, a target block may be split, as illustrated in FIG. 6.

For splitting of the target block, an indicator indicating split information may be signaled from the encoding apparatus 100 to the decoding apparatus 200. The split information may be information indicating how the target block is split.

The split information may be one or more of a split flag (hereinafter referred to as "split_flag"), a quad-binary flag (hereinafter referred to as "QB_flag"), a quad-tree flag (hereinafter referred to as "quadtree_flag"), a binary tree flag (hereinafter referred to as "binarytree_flag"), and a binary type flag (hereinafter referred to as "Btype_flag").

"split_flag" may be a flag indicating whether a block is split. For example, a split_flag value of 1 may indicate that the corresponding block is split. A split_flag value of 0 may indicate that the corresponding block is not split.

"QB_flag" may be a flag indicating which one of a quad-tree form and a binary tree form corresponds to the shape in which the block is split. For example, a QB_flag value of 0 may indicate that the block is split in a quad-tree form. A QB_flag value of 1 may indicate that the block is split in a binary tree form. Alternatively, a QB_flag value of 0 may indicate that the block is split in a binary tree form. A QB_flag value of 1 may indicate that the block is split in a quad-tree form.

"quadtree_flag" may be a flag indicating whether a block is split in a quad-tree form. For example, a quadtree_flag value of 1 may indicate that the block is split in a quad-tree form. A quadtree_flag value of 0 may indicate that the block is not split in a quad-tree form.

"binarytree_flag" may be a flag indicating whether a block is split in a binary tree form. For example, a binarytree_flag value of 1 may indicate that the block is split in a binary tree form. A binarytree_flag value of 0 may indicate that the block is not split in a binary tree form.

"Btype_flag" may be a flag indicating which one of a vertical split and a horizontal split corresponds to a split direction when a block is split in a binary tree form. For example, a Btype_flag value of 0 may indicate that the block is split in a horizontal direction. A Btype_flag value of 1 may indicate that a block is split in a vertical direction. Alternatively, a Btype_flag value of 0 may indicate that the block is split in a vertical direction. A Btype_flag value of 1 may indicate that a block is split in a horizontal direction.

For example, the split information of the block in FIG. 6 may be derived by signaling at least one of quadtree_flag, binarytree_flag, and Btype_flag, as shown in the following Table 1.

TABLE 1

| quadtree_flag | binarytree_flag | Btype_flag |
|---|---|---|
| 1 | | |
| 0 | | |
| | 1 | |
| | | 1 |
| | 0 | |
| | 0 | |
| 1 | | |
| 0 | | |
| | 1 | |
| | | 0 |
| | 0 | |
| | 0 | |
| 0 | | |
| | 0 | |
| | 0 | |
| 0 | | |
| | | 0 |

TABLE 1-continued

| quadtree_flag | binarytree_flag | Btype_flag |
|---|---|---|
| 0 | | |
| | 1 | |
| | | 0 |
| | 1 | |
| | | 1 |
| | 0 | |
| | 0 | |
| | | 0 |
| 0 | | |
| | 0 | |

For example, the split information of the block in FIG. 6 may be derived by signaling at least one of split_flag, QB_flag and Btype_flag, as shown in the following Table 2.

TABLE 2

| split_flag | QB_flag | Btype_flag |
|---|---|---|
| 1 | | |
| | 0 | |
| 1 | | |
| | 1 | |
| | | 1 |
| 0 | | |
| 0 | | |
| 1 | | |
| | 0 | |
| 1 | | |
| | 1 | |
| | | 0 |
| 0 | | |
| 0 | | |
| 0 | | |
| 0 | | |
| 0 | | |
| 1 | | |
| | 1 | |
| | | 0 |
| 1 | | |
| | | 1 |
| 0 | | |
| 0 | | |
| 0 | | |
| 0 | | |

The splitting method may be limited only to a quad-tree or to a binary tree depending on the size and/or shape of the block. When this limitation is applied, split_flag may be a flag indicating whether a block is split in a quad-tree form or a flag indicating whether a block is split in a binary tree form. The size and shape of a block may be derived depending on the depth information of the block, and the depth information may be signaled from the encoding apparatus 100 to the decoding apparatus 200.

When the size of a block falls within a specific range, only splitting in a quad-tree form may be possible. For example, the specific range may be defined by at least one of a maximum block size and a minimum block size at which only splitting in a quad-tree form is possible.

Information indicating the maximum block size and the minimum block size at which only splitting in a quad-tree form is possible may be signaled from the encoding apparatus 100 to the decoding apparatus 200 through a bitstream. Further, this information may be signaled for at least one of units such as a video, a sequence, a picture, and a slice (or a segment).

Alternatively, the maximum block size and/or the minimum block size may be fixed sizes predefined by the encoding apparatus 100 and the decoding apparatus 200. For example, when the size of a block is above 64×64 and below 256×256, only splitting in a quad-tree form may be possible. In this case, split_flag may be a flag indicating whether splitting in a quad-tree form is performed.

When the size of a block falls within the specific range, only splitting in a binary tree form may be possible. For example, the specific range may be defined by at least one of a maximum block size and a minimum block size at which only splitting in a binary tree form is possible.

Information indicating the maximum block size and/or the minimum block size at which only splitting in a binary tree form is possible may be signaled from the encoding apparatus 100 to the decoding apparatus 200 through a bitstream. Further, this information may be signaled for at least one of units such as a sequence, a picture, and a slice (or a segment).

Alternatively, the maximum block size and/or the minimum block size may be fixed sizes predefined by the encoding apparatus 100 and the decoding apparatus 200. For example, when the size of a block is above 8×8 and below 16×16, only splitting in a binary tree form may be possible. In this case, split_flag may be a flag indicating whether splitting in a binary tree form is performed.

The splitting of a block may be limited by previous splitting. For example, when a block is split in a binary tree form and multiple partition blocks are generated, each partition block may be additionally split only in a binary tree form.

When the horizontal size or vertical size of a partition block is a size that cannot be split further, the above-described indicator may not be signaled.

Figure 7:
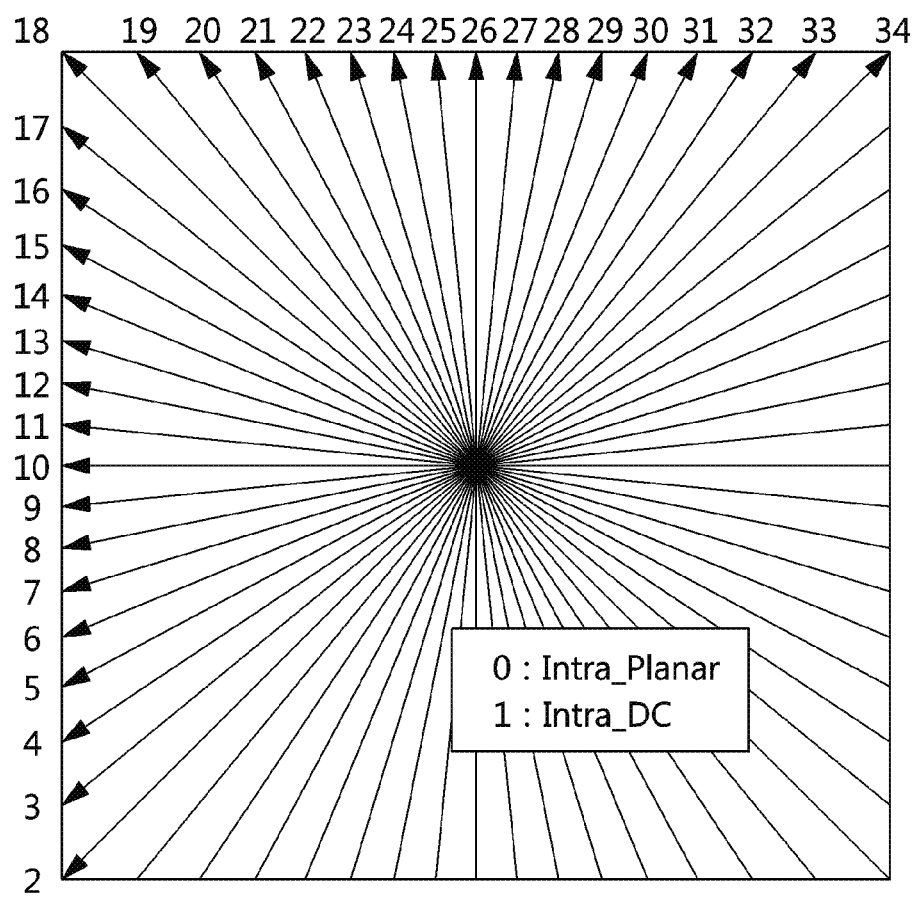
FIG. 7 is a diagram for explaining an embodiment of an intra-prediction procedure.

FIG. 7 is a diagram for explaining an embodiment of an intra-prediction process.

Arrows radially extending from the center of the graph in FIG. 7 indicate the prediction directions of intra-prediction modes. Further, numbers appearing near the arrows indicate examples of mode values assigned to intra-prediction modes or to the prediction directions of the intra-prediction modes.

Intra encoding and/or decoding may be performed using reference samples of blocks neighboring a target block. The neighboring blocks may be neighboring reconstructed blocks. For example, intra encoding and/or decoding may be performed using the values of reference samples which are included in each neighboring reconstructed block or the coding parameters of the neighboring reconstructed block.

The encoding apparatus 100 and/or the decoding apparatus 200 may generate a prediction block by performing intra prediction on a target block based on information about samples in a target image. When intra prediction is performed, the encoding apparatus 100 and/or the decoding apparatus 200 may generate a prediction block for the target block by performing intra prediction based on information about samples in the target image. When intra prediction is performed, the encoding apparatus 100 and/or the decoding apparatus 200 may perform directional prediction and/or non-directional prediction based on at least one reconstructed reference sample.

A prediction block may be a block generated as a result of performing intra prediction. A prediction block may correspond to at least one of a CU, a PU, and a TU.

The unit of a prediction block may have a size corresponding to at least one of a CU, a PU, and a TU. The prediction block may have a square shape having a size of 2N×2N or N×N. The size of N×N may include sizes of 4×4, 8×8, 16×16, 32×32, 64×64, or the like.

Alternatively, a prediction block may a square block having a size of 2×2, 4×4, 8×8, 16×16, 32×32, 64×64 or the like or a rectangular block having a size of 2×8, 4×8, 2×16, 4×16, 8×16, or the like.

Intra prediction may be performed in consideration of the intra-prediction mode for the target block. The number of intra-prediction modes that the target block can have may be a predefined fixed value, and may be a value determined differently depending on the attributes of a prediction block. For example, the attributes of the prediction block may include the size of the prediction block, the type of prediction block, etc.

For example, the number of intra-prediction modes may be fixed at 35 regardless of the size of a prediction block. Alternatively, the number of intra-prediction modes may be, for example, 3, 5, 9, 17, 34, 35, or 36.

The intra-prediction modes may be non-directional modes or directional modes. For example, the intra-prediction modes may include two non-directional modes and 33 directional modes, as shown in FIG. 7.

The two non-directional modes may include a DC mode and a planar mode.

The directional modes may be prediction modes having a specific direction or a specific angle.

The intra-prediction modes may each be represented by at least one of a mode number, a mode value, and a mode angle. The number of intra-prediction modes may be M. The value of M may be 1 or more. In other words, the number of intra-prediction modes may be M, which includes the number of non-directional modes and the number of directional modes.

The number of intra-prediction modes may be fixed to M regardless of the size of a block. For example, the number of intra-prediction modes may be fixed at any one of 35 and 67 regardless of the size of a block.

Alternatively, the number of intra-prediction modes may differ depending on the size of a block and/or the type of color component.

For example, the larger the size of the block, the greater the number of intra-prediction modes. Alternatively, the larger the size of the block, the smaller the number of intra-prediction modes. When the size of the block is 4×4 or 8×8, the number of intra-prediction modes may be 67. When the size of the block is 16×16, the number of intra-prediction modes may be 35. When the size of the block is 32×32, the number of intra-prediction modes may be 19. When the size of a block is 64×64, the number of intra-prediction modes may be 7.

For example, the number of intra prediction modes may differ depending on whether a color component is a luma signal or a chroma signal. Alternatively, the number of intra-prediction modes corresponding to a luma component block may be greater than the number of intra-prediction modes corresponding to a chroma component block.

For example, in a vertical mode having a mode value of 26, prediction may be performed in a vertical direction based on the pixel value of a reference sample. For example, in a horizontal mode having a mode value of 10, prediction may be performed in a horizontal direction based on the pixel value of a reference sample.

Even in directional modes other than the above-described mode, the encoding apparatus 100 and the decoding apparatus 200 may perform intra prediction on a target unit using reference samples depending on angles corresponding to the directional modes.

Intra-prediction modes located on a right side with respect to the vertical mode may be referred to as 'vertical-right modes'. Intra-prediction modes located below the horizontal mode may be referred to as 'horizontal-below modes'. For example, in FIG. 7, the intra-prediction modes in which a mode value is one of 27, 28, 29, 30, 31, 32, 33, and 34 may be vertical-right modes 613. Intra-prediction modes in which a mode value is one of 2, 3, 4, 5, 6, 7, 8, and 9 may be horizontal-below modes 616.

The non-directional mode may include a DC mode and a planar mode. For example, a value of the DC mode may be 1. A value of the planar mode may be 0.

The directional mode may include an angular mode. Among the plurality of the intra prediction modes, remaining modes except for the DC mode and the planar mode may be directional modes.

When the intra-prediction mode is a DC mode, a prediction block may be generated based on the average of pixel values of a plurality of reference pixels. For example, a value of a pixel of a prediction block may be determined based on the average of pixel values of a plurality of reference pixels.

The number of above-described intra-prediction modes and the mode values of respective intra-prediction modes are merely exemplary. The number of above-described intra-prediction modes and the mode values of respective intra-prediction modes may be defined differently depending on the embodiments, implementation and/or requirements.

In order to perform intra prediction on a target block, the step of checking whether samples included in a reconstructed neighboring block can be used as reference samples of a target block may be performed. When a sample that cannot be used as a reference sample of the target block is present among samples in the neighboring block, a value generated via copying and/or interpolation that uses at least one sample value, among the samples included in the reconstructed neighboring block, may replace the sample value of the sample that cannot be used as the reference sample. When the value generated via copying and/or interpolation replaces the sample value of the existing sample, the sample may be used as the reference sample of the target block.

In intra prediction, a filter may be applied to at least one of a reference sample and a prediction sample based on at least one of the intra-prediction mode and the size of the target block.

The type of filter to be applied to at least one of a reference sample and a prediction sample may differ depending on at least one of the intra-prediction mode of a target block, the size of the target block, and the shape of the target block. The types of filters may be classified depending on one or more of the number of filter taps, the value of a filter coefficient, and filter strength.

When the intra-prediction mode is a planar mode, a sample value of a prediction target block may be generated using a weighted sum of an above reference sample of the target block, a left reference sample of the target block, an above-right reference sample of the target block, and a below-left reference sample of the target block depending on the location of the prediction target sample in the prediction block when the prediction block of the target block is generated.

When the intra-prediction mode is a DC mode, the average of reference samples above the target block and the reference samples to the left of the target block may be used when the prediction block of the target block is generated. Also, filtering using the values of reference samples may be performed on specific rows or specific columns in the target block. The specific rows may be one or more upper rows adjacent to the reference sample. The specific columns may be one or more left columns adjacent to the reference sample.

When the intra-prediction mode is a directional mode, a prediction block may be generated using the above reference samples, left reference samples, above-right reference sample and/or below-left reference sample of the target block.

In order to generate the above-described prediction sample, real-number-based interpolation may be performed.

The intra-prediction mode of the target block may be predicted from intra prediction mode of a neighboring block adjacent to the target block, and the information used for prediction may be entropy-encoded/decoded.

For example, when the intra-prediction modes of the target block and the neighboring block are identical to each other, it may be signaled, using a predefined flag, that the intra-prediction modes of the target block and the neighboring block are identical.

For example, an indicator for indicating an intra-prediction mode identical to that of the target block, among intra-prediction modes of multiple neighboring blocks, may be signaled.

When the intra-prediction modes of the target block and a neighboring block are different from each other, information about the intra-prediction mode of the target block may be encoded and/or decoded using entropy encoding and/or decoding.

Figure 8:
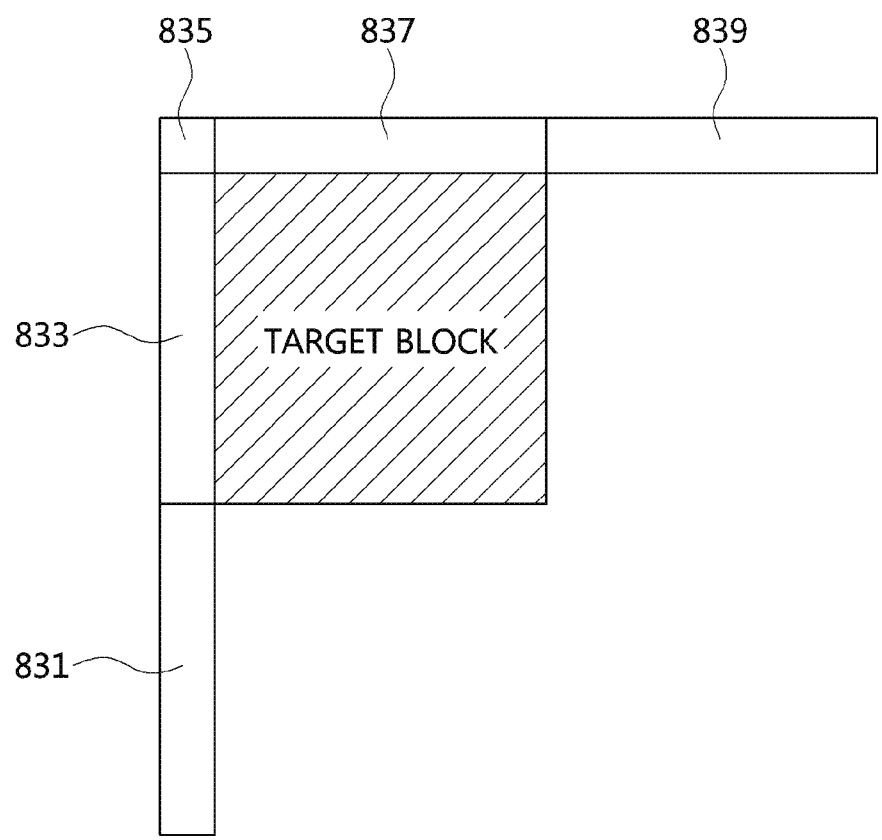
FIG. 8 is a diagram for explaining the locations of reference samples used in an intra-prediction procedure.

FIG. 8 is a diagram for explaining the locations of reference samples used in an intra-prediction procedure.

FIG. 8 illustrates the locations of reference samples used for intra prediction of a target block. Referring to FIG. 8, reconstructed reference samples used for intra prediction of the target block may include below-left reference samples 831, left reference samples 833, an above-left corner reference sample 835, above reference samples 837, and above-right reference samples 839.

For example, the left reference samples 833 may mean reconstructed reference pixels adjacent to the left side of the target block. The above reference samples 837 may mean reconstructed reference pixels adjacent to the top of the target block. The above-left corner reference sample 835 may mean a reconstructed reference pixel located at the above-left corner of the target block. The below-left reference samples 831 may mean reference samples located below a left sample line composed of the left reference samples 833, among samples located on the same line as the left sample line. The above-right reference samples 839 may mean reference samples located to the right of an above sample line composed of the above reference samples 837, among samples located on the same line as the above sample line.

When the size of a target block is N×N, the numbers of the below-left reference samples 831, the left reference samples 833, the above reference samples 837, and the above-right reference samples 839 may each be N.

By performing intra prediction on the target block, a prediction block may be generated. The generation of the prediction block may include the determination of the values of pixels in the prediction block. The sizes of the target block and the prediction block may be equal.

The reference samples used for intra prediction of the target block may vary depending on the intra-prediction mode of the target block. The direction of the intra-prediction mode may represent a dependence relationship between the reference samples and the pixels of the prediction block. For example, the value of a specified reference sample may be used as the values of one or more specified pixels in the prediction block. In this case, the specified reference sample and the one or more specified pixels in the prediction block may be the sample and pixels which are positioned in a straight line in the direction of an intra-prediction mode. In other words, the value of the specified reference sample may be copied as the value of a pixel located in a direction reverse to the direction of the intra-prediction mode. Alternatively, the value of a pixel in the prediction block may be the value of a reference sample located in the direction of the intra-prediction mode with respect to the location of the pixel.

In an example, when the intra-prediction mode of a target block is a vertical mode having a mode value of 26, the above reference samples 837 may be used for intra prediction. When the intra-prediction mode is the vertical mode, the value of a pixel in the prediction block may be the value of a reference sample vertically located above the location of the pixel. Therefore, the above reference samples 837 adjacent to the top of the target block may be used for intra prediction. Furthermore, the values of pixels in one row of the prediction block may be identical to those of the above reference samples 837.

In an example, when the intra-prediction mode of a target block is a horizontal mode having a mode value of 10, the left reference samples 833 may be used for intra prediction. When the intra-prediction mode is the horizontal mode, the value of a pixel in the prediction block may be the value of a reference sample horizontally located left to the location of the pixel. Therefore, the left reference samples 833 adjacent to the left of the target block may be used for intra prediction. Furthermore, the values of pixels in one column of the prediction block may be identical to those of the left reference samples 833.

In an example, when the mode value of the intra-prediction mode of the current block is 18, at least some of the left reference samples 833, the above-left corner reference sample 835, and at least some of the above reference samples 837 may be used for intra prediction. When the mode value of the intra-prediction mode is 18, the value of a pixel in the prediction block may be the value of a reference sample diagonally located at the above-left corner of the pixel.

Further, At least a part of the above-right reference samples 839 may be used for intra prediction in a case that a intra prediction mode having a mode value of 27, 28, 29, 30, 31, 32, 33 or 34 is used.

Further, At least a part of the below-left reference samples 831 may be used for intra prediction in a case that a intra prediction mode having a mode value of 2, 3, 4, 5, 6, 7, 8 or 9 is used.

Further, the above-left corner reference sample 835 may be used for intra prediction in a case that a intra prediction mode of which a mode value is a value ranging from 11 to 25.

The number of reference samples used to determine the pixel value of one pixel in the prediction block may be either 1, or 2 or more.

As described above, the pixel value of a pixel in the prediction block may be determined depending on the location of the pixel and the location of a reference sample indicated by the direction of the intra-prediction mode. When the location of the pixel and the location of the reference sample indicated by the direction of the intra-prediction mode are integer positions, the value of one reference sample indicated by an integer position may be used to determine the pixel value of the pixel in the prediction block.

When the location of the pixel and the location of the reference sample indicated by the direction of the intra-prediction mode are not integer positions, an interpolated reference sample based on two reference samples closest to the location of the reference sample may be generated. The value of the interpolated reference sample may be used to determine the pixel value of the pixel in the prediction block. In other words, when the location of the pixel in the prediction block and the location of the reference sample indicated by the direction of the intra-prediction mode indicate the location between two reference samples, an interpolated value based on the values of the two samples may be generated.

The prediction block generated via prediction may not be identical to an original target block. In other words, there may be a prediction error which is the difference between the target block and the prediction block, and there may also be a prediction error between the pixel of the target block and the pixel of the prediction block.

Hereinafter, the terms "difference", "error", and "residual" may be used to have the same meaning, and may be used interchangeably with each other.

For example, in the case of directional intra prediction, the longer the distance between the pixel of the prediction block and the reference sample, the greater the prediction error that may occur. Such a prediction error may result in discontinuity between the generated prediction block and neighboring blocks.

In order to reduce the prediction error, filtering for the prediction block may be used. Filtering may be configured to adaptively apply a filter to an area, regarded as having a large prediction error, in the prediction block. For example, the area regarded as having a large prediction error may be the boundary of the prediction block. Further, an area regarded as having a large prediction error in the prediction block may differ depending on the intra-prediction mode, and the characteristics of filters may also differ depending thereon.

Figure 9:
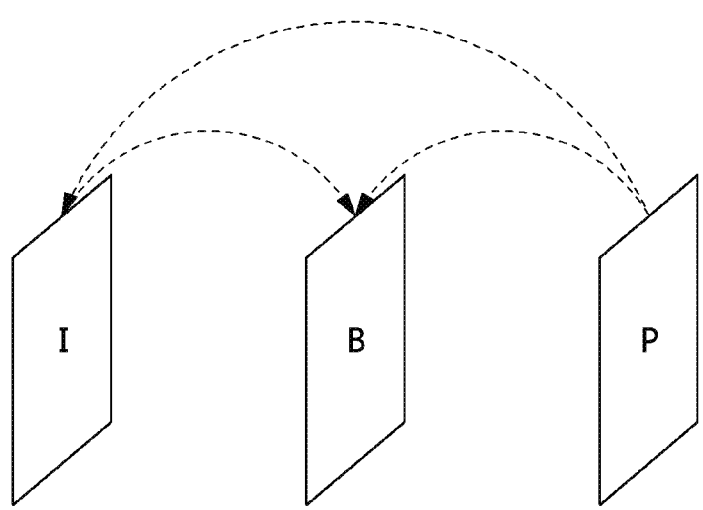
FIG. 9 is a diagram for explaining an embodiment of an inter-prediction procedure.

FIG. 9 is a diagram for explaining an embodiment of an inter prediction procedure.

The rectangles shown in FIG. 9 may represent images (or pictures). Further, in FIG. 9, arrows may represent prediction directions. That is, each image may be encoded and/or decoded depending on the prediction direction.

Images may be classified into an Intra Picture (I picture), a Uni-prediction Picture or Predictive Coded Picture (P picture), and a Bi-prediction Picture or Bi-predictive Coded Picture (B picture) depending on the encoding type. Each picture may be encoded and/or decoded depending on the encoding type thereof.

When a target image that is the target to be encoded is an I picture, the target image may be encoded using data contained in the image itself without inter prediction that refers to other images. For example, an I picture may be encoded only via intra prediction.

When a target image is a P picture, the target image may be encoded via inter prediction, which uses reference pictures existing in one direction. Here, the one direction may be a forward direction or a backward direction.

When a target image is a B picture, the image may be encoded via inter prediction that uses reference pictures existing in two directions, or may be encoded via inter prediction that uses reference pictures existing in one of a forward direction and a backward direction. Here, the two directions may be the forward direction and the backward direction.

A P picture and a B picture that are encoded and/or decoded using reference pictures may be regarded as images in which inter prediction is used.

Below, inter prediction in an inter mode according to an embodiment will be described in detail.

Inter prediction may be performed using motion information.

In an inter mode, the encoding apparatus 100 may perform inter prediction and/or motion compensation on a target block. The decoding apparatus 200 may perform inter prediction and/or motion compensation, corresponding to inter prediction and/or motion compensation performed by the encoding apparatus 100, on a target block.

Motion information of the target block may be individually derived by the encoding apparatus 100 and the decoding apparatus 200 during the inter prediction. The motion information may be derived using motion information of a reconstructed neighboring block, motion information of a col block, and/or motion information of a block adjacent to the col block.

For example, the encoding apparatus 100 or the decoding apparatus 200 may perform prediction and/or motion compensation by using motion information of a spatial candidate and/or a temporal candidate as motion information of the target block.

The target block may mean a PU and/or a PU partition.

A spatial candidate may be a reconstructed block which is spatially adjacent to the target block.

A temporal candidate may be a reconstructed block corresponding to the target block in a previously reconstructed co-located picture (col picture).

In inter prediction, the encoding apparatus 100 and the decoding apparatus 200 may improve encoding efficiency and decoding efficiency by utilizing the motion information of a spatial candidate and/or a temporal candidate. The motion information of a spatial candidate may be referred to as 'spatial motion information'. The motion information of a temporal candidate may be referred to as 'temporal motion information'.

Below, the motion information of a spatial candidate may be the motion information of a PU including the spatial candidate. The motion information of a temporal candidate may be the motion information of a PU including the temporal candidate. The motion information of a candidate block may be the motion information of a PU including the candidate block.

Inter prediction may be performed using a reference picture.

The reference picture may be at least one of a picture previous to a target picture and a picture subsequent to the target picture. The reference picture may be an image used for the prediction of the target block.

In inter prediction, a region in the reference picture may be specified by utilizing a reference picture index (or refIdx) for indicating a reference picture, a motion vector, which will be described later, etc. Here, the region specified in the reference picture may indicate a reference block.

Inter prediction may select a reference picture, and may also select a reference block corresponding to the target block from the reference picture. Further, inter prediction may generate a prediction block for the target block using the selected reference block.

The motion information may be derived during inter prediction by each of the encoding apparatus 100 and the decoding apparatus 200.

A spatial candidate may be a block 1) which is present in a target picture, 2) which has been previously reconstructed via encoding and/or decoding, and 3) which is adjacent to the target block or is located at the corner of the target block. Here, the "block located at the corner of the target block" may be either a block vertically adjacent to a neighboring block that is horizontally adjacent to the target block, or a block horizontally adjacent to a neighboring block that is vertically adjacent to the target block. Further, "block located at the corner of the target block" may have the same meaning as "block adjacent to the corner of the target block". The meaning of "block located at the corner of the target block" may be included in the meaning of "block adjacent to the target block".

For example, a spatial candidate may be a reconstructed block located to the left of the target block, a reconstructed block located above the target block, a reconstructed block located at the below-left corner of the target block, a reconstructed block located at the above-right corner of the target block, or a reconstructed block located at the above-left corner of the target block.

Each of the encoding apparatus 100 and the decoding apparatus 200 may identify a block present at the location spatially corresponding to the target block in a col picture. The location of the target block in the target picture and the location of the identified block in the col picture may correspond to each other.

Each of the encoding apparatus 100 and the decoding apparatus 200 may determine a col block present at the predefined relative location for the identified block to be a temporal candidate. The predefined relative location may be a location present inside and/or outside the identified block.

For example, the col block may include a first col block and a second col block. When the coordinates of the identified block are (xP, yP) and the size of the identified block is represented by (nPSW, nPSH), the first col block may be a block located at coordinates (xP+nPSW, yP+nPSH). The second col block may be a block located at coordinates (xP+(nPSW>>1), yP+(nPSH>>1)). The second col block may be selectively used when the first col block is unavailable.

The motion vector of the target block may be determined based on the motion vector of the col block. Each of the encoding apparatus 100 and the decoding apparatus 200 may scale the motion vector of the col block. The scaled motion vector of the col block may be used as the motion vector of the target block. Further, a motion vector for the motion information of a temporal candidate stored in a list may be a scaled motion vector.

The ratio of the motion vector of the target block to the motion vector of the col block may be identical to the ratio of a first distance to a second distance. The first distance may be the distance between the reference picture and the target picture of the target block. The second distance may be the distance between the reference picture and the col picture of the col block.

The scheme for deriving motion information may change depending on the inter-prediction mode of a target block. For example, as inter-prediction modes applied for inter prediction, an Advanced Motion Vector Predictor (AMVP) mode, a merge mode, a skip mode, a current picture reference mode, etc. may be present. The merge mode may also be referred to as a "motion merge mode". Individual modes will be described in detail below.

1) AMVP Mode

When an AMVP mode is used, the encoding apparatus 100 may search a neighboring region of a target block for a similar block. The encoding apparatus 100 may acquire a prediction block by performing prediction on the target block using motion information of the found similar block. The encoding apparatus 100 may encode a residual block, which is the difference between the target block and the prediction block.

1-1) Creation of List of Prediction Motion Vector Candidates

When an AMVP mode is used as the prediction mode, each of the encoding apparatus 100 and the decoding apparatus 200 may create a list of prediction motion vector candidates using the motion vector of a spatial candidate, the motion vector of a temporal candidate, and a zero vector. The prediction motion vector candidate list may include one or more prediction motion vector candidates. At least one of the motion vector of a spatial candidate, the motion vector of a temporal candidate, and a zero vector may be determined and used as a prediction motion vector candidate.

Hereinafter, the terms "prediction motion vector (candidate)" and "motion vector (candidate)" may be used to have the same meaning, and may be used interchangeably with each other.

Hereinafter, the terms "prediction motion vector candidate" and "AMVP candidate" may be used to have the same meaning, and may be used interchangeably with each other.

Hereinafter, the terms "prediction motion vector candidate list" and "AMVP candidate list" may be used to have the same meaning, and may be used interchangeably with each other.

Spatial candidates may include a reconstructed spatial neighboring block. In other words, the motion vector of the reconstructed neighboring block may be referred to as a "spatial prediction motion vector candidate".

Temporal candidates may include a col block and a block adjacent to the col block. In other words, the motion vector of the col block or the motion vector of the block adjacent to the col block may be referred to as a "temporal prediction motion vector candidate".

The zero vector may be a (0, 0) motion vector.

The prediction motion vector candidates may be motion vector predictors for predicting a motion vector. Also, in the encoding apparatus 100, each prediction motion vector candidate may be an initial search location for a motion vector.

1-2) Search for Motion Vectors that Use List of Prediction Motion Vector Candidates The encoding apparatus 100 may determine the motion vector to be used to encode a target block within a search range using a list of prediction motion vector candidates. Further, the encoding apparatus 100 may determine a prediction motion vector candidate to be used as the prediction motion vector of the target block, among prediction motion vector candidates present in the prediction motion vector candidate list.

The motion vector to be used to encode the target block may be a motion vector that can be encoded at minimum cost.

Further, the encoding apparatus 100 may determine whether to use the AMVP mode to encode the target block.

1-3) Transmission of Inter-Prediction Information

The encoding apparatus 100 may generate a bitstream including inter-prediction information required for inter prediction. The decoding apparatus 200 may perform inter prediction on the target block using the inter-prediction information of the bitstream.

The inter-prediction information may contain 1) mode information indicating whether an AMVP mode is used, 2) a prediction motion vector index, 3) a Motion Vector Difference (MVD), 4) a reference direction, and 5) a reference picture index.

Hereinafter, the terms "prediction motion vector index" and "AMVP index" may be used to have the same meaning, and may be used interchangeably with each other.

Further, the inter-prediction information may contain a residual signal.

The decoding apparatus 200 may acquire a prediction motion vector index, an MVD, a reference direction, and a reference picture index from the bitstream through entropy decoding when mode information indicates that the AMVP mode is used.

The prediction motion vector index may indicate a prediction motion vector candidate to be used for the prediction of a target block, among prediction motion vector candidates included in the prediction motion vector candidate list.

1-4) Inter Prediction in AMVP Mode that Uses Inter-Prediction Information

The decoding apparatus 200 may derive prediction motion vector candidates using a prediction motion vector candidate list, and may determine the motion information of a target block based on the derived prediction motion vector candidates.

The decoding apparatus 200 may determine a motion vector candidate for the target block, among the prediction motion vector candidates included in the prediction motion vector candidate list, using a prediction motion vector index. The decoding apparatus 200 may select a prediction motion vector candidate, indicated by the prediction motion vector index, from among prediction motion vector candidates included in the prediction motion vector candidate list, as the prediction motion vector of the target block.

The motion vector to be actually used for inter prediction of the target block may not match the prediction motion vector. In order to indicate the difference between the motion vector to be actually used for inter prediction of the target block and the prediction motion vector, an MVD may be used. The encoding apparatus 100 may derive a prediction motion vector similar to the motion vector to be actually used for inter prediction of the target block so as to use an MVD that is as small as possible.

An MVD may be the difference between the motion vector of the target block and the prediction motion vector. The encoding apparatus 100 may calculate an MVD and may entropy-encode the MVD.

The MVD may be transmitted from the encoding apparatus 100 to the decoding apparatus 200 through a bitstream. The decoding apparatus 200 may decode the received MVD. The decoding apparatus 200 may derive the motion vector of the target block by summing the decoded MVD and the prediction motion vector. In other words, the motion vector of the target block derived by the decoding apparatus 200 may be the sum of the entropy-decoded MVD and the motion vector candidate.

The reference direction may indicate a list of reference pictures to be used for prediction of the target block. For example, the reference direction may indicate one of a reference picture list L0 and a reference picture list L1.

The reference direction merely indicates the reference picture list to be used for prediction of the target block, and may not mean that the directions of reference pictures are limited to a forward direction or a backward direction. In other words, each of the reference picture list L0 and the reference picture list L1 may include pictures in a forward direction and/or a backward direction.

That the reference direction is unidirectional may mean that a single reference picture list is used. That the reference direction is bidirectional may mean that two reference picture lists are used. In other words, the reference direction may indicate one of the case where only the reference picture list L0 is used, the case where only the reference picture list L1 is used, and the case where two reference picture lists are used.

The reference picture index may indicate a reference picture to be used for prediction of a target block, among reference pictures in the reference picture list. The reference picture index may be entropy-encoded by the encoding apparatus 100. The entropy-encoded reference picture index may be signaled to the decoding apparatus 200 by the encoding apparatus 100 through a bitstream.

When two reference picture lists are used to predict the target block, a single reference picture index and a single motion vector may be used for each of the reference picture lists. Further, when two reference picture lists are used to predict the target block, two prediction blocks may be specified for the target block. For example, the (final) prediction block of the target block may be generated using the average or weighted sum of the two prediction blocks for the target block.

The motion vector of the target block may be derived by the prediction motion vector index, the MVD, the reference direction, and the reference picture index.

The decoding apparatus 200 may generate a prediction block for the target block based on the derived motion vector and the reference picture index. For example, the prediction block may be a reference block, indicated by the derived motion vector, in the reference picture indicated by the reference picture index.

Since the prediction motion vector index and the MVD are encoded without the motion vector itself of the target block being encoded, the number of bits transmitted from the encoding apparatus 100 to the decoding apparatus 200 may be decreased, and encoding efficiency may be improved.

For the target block, the motion information of reconstructed neighboring blocks may be used. In a specific inter-prediction mode, the encoding apparatus 100 may not separately encode the actual motion information of the target block. The motion information of the target block is not encoded, and additional information that enables the motion information of the target block to be derived using the motion information of reconstructed neighboring blocks may be encoded instead. As the additional information is encoded, the number of bits transmitted to the decoding apparatus 200 may be decreased, and encoding efficiency may be improved.

For example, as inter-prediction modes in which the motion information of the target block is not directly encoded, there may be a skip mode and/or a merge mode. Here, each of the encoding apparatus 100 and the decoding apparatus 200 may use an identifier and/or an index that indicates a unit, the motion information of which is to be used as the motion information of the target unit, among reconstructed neighboring units.

2) Merge Mode

As a scheme for deriving the motion information of a target block, there is merging. The term "merging" may mean the merging of the motion of multiple blocks. "Merging" may mean that the motion information of one block is also applied to other blocks. In other words, a merge mode may be a mode in which the motion information of the target block is derived from the motion information of a neighboring block.

When a merge mode is used, the encoding apparatus 100 may predict the motion information of a target block using the motion information of a spatial candidate and/or the motion information of a temporal candidate. The spatial candidate may include a reconstructed spatial neighboring block that is spatially adjacent to the target block. The spatial neighboring block may include a left adjacent block and an above adjacent block. The temporal candidate may include a col block. The terms "spatial candidate" and "spatial merge candidate" may be used to have the same meaning, and may be used interchangeably with each other. The terms "temporal candidate" and "temporal merge candidate" may be used to have the same meaning, and may be used interchangeably with each other.

The encoding apparatus 100 may acquire a prediction block via prediction. The encoding apparatus 100 may encode a residual block, which is the difference between the target block and the prediction block.

2-1) Creation of Merge Candidate List

When the merge mode is used, each of the encoding apparatus 100 and the decoding apparatus 200 may create a merge candidate list using the motion information of a spatial candidate and/or the motion information of a temporal candidate. The motion information may include 1) a motion vector, 2) a reference picture index, and 3) a reference direction. The reference direction may be unidirectional or bidirectional.

The merge candidate list may include merge candidates. The merge candidates may be motion information. In other words, the merge candidate list may be a list in which pieces of motion information are stored.

The merge candidates may be pieces of motion information of temporal candidates and/or spatial candidates. Further, the merge candidate list may include new merge candidates generated by a combination of merge candidates that are already present in the merge candidate list. In other words, the merge candidate list may include new motion information generated by a combination of pieces of motion information previously present in the merge candidate list.

The merge candidates may be specific modes deriving inter prediction information. The merge candidate may be information indicating a specific mode deriving inter prediction information. Inter prediction information of a target block may be derived according to a specific mode which the merge candidate indicates. Furthermore, the specific mode may include a process of deriving a series of inter prediction information. This specific mode may be an inter prediction information derivation mode or a motion information derivation mode.

The inter prediction information of the target block may be derived according to the mode indicated by the merge candidate selected by the merge index among the merge candidates in the merge candidate list For example, the motion information derivation modes in the merge candidate list may be at least one of 1) motion information derivation mode for a sub-block unit and 2) an affine motion information derivation mode.

Furthermore, the merge candidate list may include motion information of a zero vector. The zero vector may also be referred to as a "zero-merge candidate".

In other words, pieces of motion information in the merge candidate list may be at least one of 1) motion information of a spatial candidate, 2) motion information of a temporal candidate, 3) motion information generated by a combination of pieces of motion information previously present in the merge candidate list, and 4) a zero vector.

Motion information may include 1) a motion vector, 2) a reference picture index, and 3) a reference direction. The reference direction may also be referred to as an "inter-prediction indicator". The reference direction may be unidirectional or bidirectional. The unidirectional reference direction may indicate L0 prediction or L1 prediction.

The merge candidate list may be created before prediction in the merge mode is performed.

The number of merge candidates in the merge candidate list may be predefined. Each of the encoding apparatus 100 and the decoding apparatus 200 may add merge candidates to the merge candidate list depending on the predefined scheme and predefined priorities so that the merge candidate list has a predefined number of merge candidates. The merge candidate list of the encoding apparatus 100 and the merge candidate list of the decoding apparatus 200 may be made identical to each other using the predefined scheme and the predefined priorities.

Merging may be applied on a CU basis or a PU basis. When merging is performed on a CU basis or a PU basis, the encoding apparatus 100 may transmit a bitstream including predefined information to the decoding apparatus 200. For example, the predefined information may contain 1) information indicating whether to perform merging for individual block partitions, and 2) information about a block with which merging is to be performed, among blocks that are spatial candidates and/or temporal candidates for the target block.

2-2) Search for Motion Vector that Uses Merge Candidate List

The encoding apparatus 100 may determine merge candidates to be used to encode a target block. For example, the encoding apparatus 100 may perform prediction on the target block using merge candidates in the merge candidate list, and may generate residual blocks for the merge candidates. The encoding apparatus 100 may use a merge candidate that incurs the minimum cost in prediction and in the encoding of residual blocks to encode the target block.

Further, the encoding apparatus 100 may determine whether to use a merge mode to encode the target block.

2-3) Transmission of Inter-Prediction Information

The encoding apparatus 100 may generate a bitstream that includes inter-prediction information required for inter prediction. The encoding apparatus 100 may generate entropy-encoded inter-prediction information by performing entropy encoding on inter-prediction information, and may transmit a bitstream including the entropy-encoded inter-prediction information to the decoding apparatus 200. Through the bitstream, the entropy-encoded inter-prediction information may be signaled to the decoding apparatus 200 by the encoding apparatus 100.

The decoding apparatus 200 may perform inter prediction on the target block using the inter-prediction information of the bitstream.

The inter-prediction information may contain 1) mode information indicating whether a merge mode is used and 2) a merge index.

Further, the inter-prediction information may contain a residual signal.

The decoding apparatus 200 may acquire the merge index from the bitstream only when the mode information indicates that the merge mode is used.

The mode information may be a merge flag. The unit of the mode information may be a block. Information about the block may include mode information, and the mode information may indicate whether a merge mode is applied to the block.

The merge index may indicate a merge candidate to be used for the prediction of the target block, among merge candidates included in the merge candidate list. Alternatively, the merge index may indicate a block with which the target block is to be merged, among neighboring blocks spatially or temporally adjacent to the target block.

The encoding apparatus 100 may select a merge candidate having the highest encoding performance among the merge candidates included in the merge candidate list and set a value of the merge index to indicate the selected merge candidate.

2-4) Inter Prediction of Merge Mode that Uses Inter-Prediction Information

The decoding apparatus 200 may perform prediction on the target block using the merge candidate indicated by the merge index, among merge candidates included in the merge candidate list.

The motion vector of the target block may be specified by the motion vector, reference picture index, and reference direction of the merge candidate indicated by the merge index.

3) Skip Mode

A skip mode may be a mode in which the motion information of a spatial candidate or the motion information of a temporal candidate is applied to the target block without change. Also, the skip mode may be a mode in which a residual signal is not used. In other words, when the skip mode is used, a reconstructed block may be a prediction block.

The difference between the merge mode and the skip mode lies in whether or not a residual signal is transmitted or used. That is, the skip mode may be similar to the merge mode except that a residual signal is not transmitted or used.

When the skip mode is used, the encoding apparatus 100 may transmit information about a block, the motion information of which is to be used as the motion information of the target block, among blocks that are spatial candidates or temporal candidates, to the decoding apparatus 200 through a bitstream. The encoding apparatus 100 may generate entropy-encoded information by performing entropy encoding on the information, and may signal the entropy-encoded information to the decoding apparatus 200 through a bitstream.

Further, when the skip mode is used, the encoding apparatus 100 may not transmit other syntax information, such as an MVD, to the decoding apparatus 200. For example, when the skip mode is used, the encoding apparatus 100 may not signal a syntax element related to at least one of an MVC, a coded block flag, and a transform coefficient level to the decoding apparatus 200.

3-1) Creation of Merge Candidate List

The skip mode may also use a merge candidate list. In other words, a merge candidate list may be used both in the merge mode and in the skip mode. In this aspect, the merge candidate list may also be referred to as a "skip candidate list" or a "merge/skip candidate list".

Alternatively, the skip mode may use an additional candidate list different from that of the merge mode. In this case, in the following description, a merge candidate list and a merge candidate may be replaced with a skip candidate list and a skip candidate, respectively.

The merge candidate list may be created before prediction in the skip mode is performed.

3-2) Search for Motion Vector that Uses Merge Candidate List

The encoding apparatus 100 may determine the merge candidates to be used to encode a target block. For example, the encoding apparatus 100 may perform prediction on the target block using the merge candidates in a merge candidate list. The encoding apparatus 100 may use a merge candidate that incurs the minimum cost in prediction to encode the target block.

Further, the encoding apparatus 100 may determine whether to use a skip mode to encode the target block.

3-3) Transmission of Inter-Prediction Information

The encoding apparatus 100 may generate a bitstream that includes inter-prediction information required for inter prediction. The decoding apparatus 200 may perform inter prediction on the target block using the inter-prediction information of the bitstream.

The inter-prediction information may include 1) mode information indicating whether a skip mode is used, and 2) a skip index.

The skip index may be identical to the above-described merge index.

When the skip mode is used, the target block may be encoded without using a residual signal. The inter-prediction information may not contain a residual signal. Alternatively, the bitstream may not include a residual signal.

The decoding apparatus 200 may acquire a skip index from the bitstream only when the mode information indicates that the skip mode is used. As described above, a merge index and a skip index may be identical to each other. The decoding apparatus 200 may acquire the skip index from the bitstream only when the mode information indicates that the merge mode or the skip mode is used.

The skip index may indicate the merge candidate to be used for the prediction of the target block, among the merge candidates included in the merge candidate list.

3-4) Inter Prediction in Skip Mode that Uses Inter-Prediction Information

The decoding apparatus 200 may perform prediction on the target block using a merge candidate indicated by a skip index, among the merge candidates included in a merge candidate list.

The motion vector of the target block may be specified by the motion vector, reference picture index, and reference direction of the merge candidate indicated by the skip index.

4) Current Picture Reference Mode

The current picture reference mode may denote a prediction mode that uses a previously reconstructed region in a target picture to which a target block belongs.

A motion vector for specifying the previously reconstructed region may be used. Whether the target block has been encoded in the current picture reference mode may be determined using the reference picture index of the target block.

A flag or index indicating whether the target block is a block encoded in the current picture reference mode may be signaled by the encoding apparatus 100 to the decoding apparatus 200. Alternatively, whether the target block is a block encoded in the current picture reference mode may be inferred through the reference picture index of the target block.

When the target block is encoded in the current picture reference mode, the target picture may exist at a fixed location or an arbitrary location in a reference picture list for the target block.

For example, the fixed location may be either a location where a value of the reference picture index is 0 or the last location.

When the targett picture exists at an arbitrary location in the reference picture list, an additional reference picture index indicating such an arbitrary location may be signaled by the encoding apparatus 100 to the decoding apparatus 200.

In the above-described AMVP mode, merge mode, and skip mode, motion information to be used for the prediction of a target block may be specified, among pieces of motion information in the list, using the index of the list.

In order to improve encoding efficiency, the encoding apparatus 100 may signal only the index of an element that incurs the minimum cost in inter prediction of the target block, among elements in the list. The encoding apparatus 100 may encode the index, and may signal the encoded index.

Therefore, the above-described lists (i.e. the prediction motion vector candidate list and the merge candidate list) must be able to be derived by the encoding apparatus 100 and the decoding apparatus 200 using the same scheme based on the same data. Here, the same data may include a reconstructed picture and a reconstructed block. Further, in order to specify an element using an index, the order of the elements in the list must be fixed.

Figure 10:
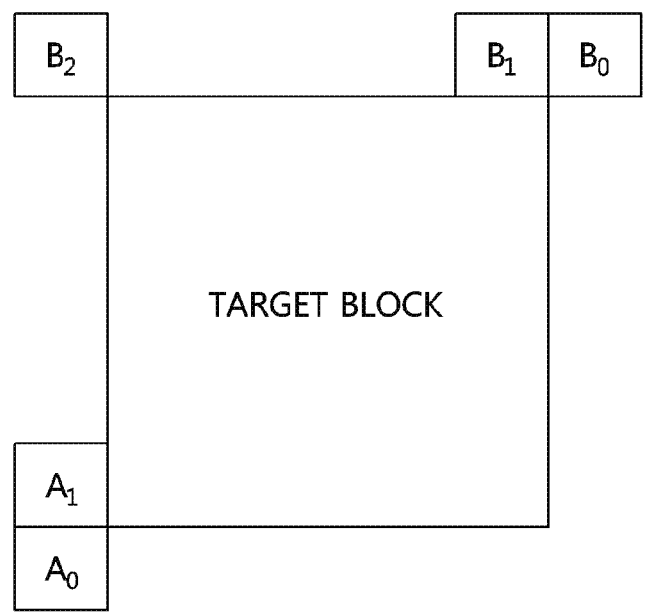
FIG. 10 illustrates spatial candidates according to an embodiment.

FIG. 10 illustrates spatial candidates according to an embodiment.

In FIG. 10, the locations of spatial candidates are illustrated.

The large block in the center of the drawing may denote a target block. Five small blocks may denote spatial candidates.

The coordinates of the target block may be (xP, yP), and the size of the target block may be represented by (nPSW, nPSH).

Spatial candidate $A_0$ may be a block adjacent to the below-left corner of the target block. $A_0$ may be a block that occupies pixels located at coordinates (xP−1, yP+nPSH+1).

Spatial candidate $A_1$ may be a block adjacent to the left of the target block. $A_1$ may be a lowermost block, among blocks adjacent to the left of the target block. Alternatively, $A_1$ may be a block adjacent to the top of $A_0$. $A_1$ may be a block that occupies pixels located at coordinates (xP−1, yP+nPSH).

Spatial candidate $B_0$ may be a block adjacent to the above-right corner of the target block. $B_0$ may be a block that occupies pixels located at coordinates (xP+nPSW+1, yP−1).

Spatial candidate $B_1$ may be a block adjacent to the top of the target block. $B_1$ may be a rightmost block, among blocks adjacent to the top of the target block. Alternatively, $B_1$ may be a block adjacent to the left of $B_0$. $B_1$ may be a block that occupies pixels located at coordinates (xP+nPSW, yP−1).

Spatial candidate $B_2$ may be a block adjacent to the above-left corner of the target block. $B_2$ may be a block that occupies pixels located at coordinates (xP−1, yP−1).

Determination of Availability of Spatial Candidate and Temporal Candidate

In order to include the motion information of a spatial candidate or the motion information of a temporal candidate in a list, it must be determined whether the motion information of the spatial candidate or the motion information of the temporal candidate is available.

Hereinafter, a candidate block may include a spatial candidate and a temporal candidate.

For example, the determination may be performed by sequentially applying the following steps 1) to 4).

Step 1) When a PU including a candidate block is out of the boundary of a picture, the availability of the candidate block may be set to "false". The expression "availability is set to false" may have the same meaning as "set to be unavailable".

Step 2) When a PU including a candidate block is out of the boundary of a slice, the availability of the candidate block may be set to "false". When the target block and the candidate block are located in different slices, the availability of the candidate block may be set to "false".

Step 3) When a PU including a candidate block is out of the boundary of a tile, the availability of the candidate block may be set to "false". When the target block and the candidate block are located in different tiles, the availability of the candidate block may be set to "false".

Step 4) When the prediction mode of a PU including a candidate block is an intra-prediction mode, the availability of the candidate block may be set to "false". When a PU including a candidate block does not use inter prediction, the availability of the candidate block may be set to "false".

Figure 11:
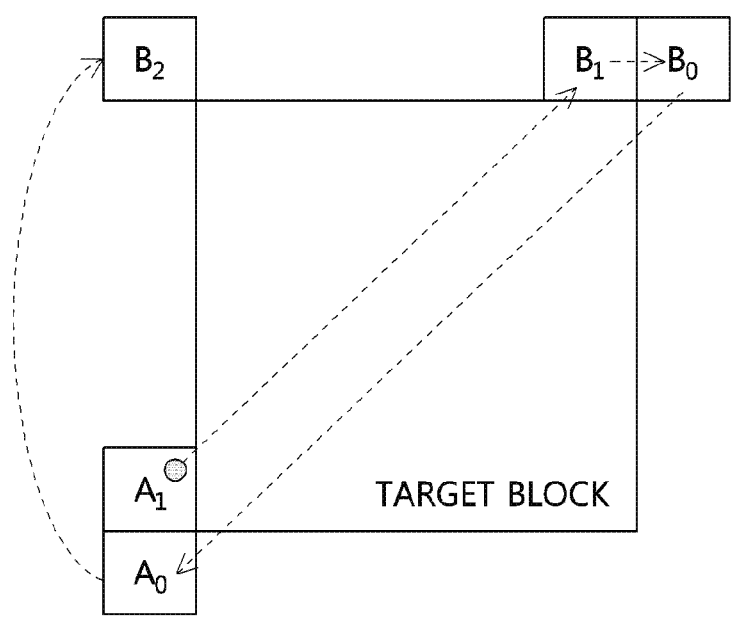
FIG. 11 illustrates the order of addition of motion information of spatial candidates to a merge list according to an embodiment.

FIG. 11 illustrates the order of addition of motion information of spatial candidates to a merge list according to an embodiment.

As shown in FIG. 11, when pieces of motion information of spatial candidates are added to a merge list, the order of $A_1$, $B_1$, $B_0$, $A_0$, and $B_2$ may be used. That is, pieces of motion information of available spatial candidates may be added to the merge list in the order of $A_1$, $B_1$, $B_0$, $A_0$, and $B_2$.

Method for Deriving Merge List in Merge Mode and Skip Mode

As described above, the maximum number of merge candidates in the merge list may be set. The set maximum number is indicated by "N". The set number may be transmitted from the encoding apparatus 100 to the decoding apparatus 200. The slice header of a slice may include N. In other words, the maximum number of merge candidates in the merge list for the target block of the slice may be set by the slice header. For example, the value of N may be basically 5.

Pieces of motion information (i.e., merge candidates) may be added to the merge list in the order of the following steps 1) to 4).

Step 1) Among spatial candidates, available spatial candidates may be added to the merge list. Pieces of motion information of the available spatial candidates may be added to the merge list in the order illustrated in FIG. 10. Here, when the motion information of an available spatial candidate overlaps other motion information already present in the merge list, the motion information may not be added to the merge list. The operation of checking whether the corresponding motion information overlaps other motion information present in the list may be referred to in brief as an "overlap check".

The maximum number of pieces of motion information that are added may be N.

Step 2) When the number of pieces of motion information in the merge list is less than N and a temporal candidate is available, the motion information of the temporal candidate may be added to the merge list. Here, when the motion information of the available temporal candidate overlaps other motion information already present in the merge list, the motion information may not be added to the merge list.

Step 3) When the number of pieces of motion information in the merge list is less than N and the type of a target slice is "B", combined motion information generated by combined bidirectional prediction (bi-prediction) may be added to the merge list.

The target slice may be a slice including a target block.

The combined motion information may be a combination of L0 motion information and L1 motion information. L0 motion information may be motion information that refers only to a reference picture list L0. L1 motion information may be motion information that refers only to a reference picture list L1.

In the merge list, one or more pieces of L0 motion information may be present. Further, in the merge list, one or more pieces of L1 motion information may be present.

The combined motion information may include one or more pieces of combined motion information. When the combined motion information is generated, L0 motion information and L1 motion information, which are to be used for generation, among the one or more pieces of L0 motion information and the one or more pieces of L1 motion information, may be predefined. One or more pieces of combined motion information may be generated in a predefined order via combined bidirectional prediction, which uses a pair of different pieces of motion information in the merge list. One of the pair of different pieces of motion information may be L0 motion information and the other of the pair may be L1 motion information.

For example, combined motion information that is added with the highest priority may be a combination of L0 motion information having a merge index of 0 and L1 motion information having a merge index of 1. When motion information having a merge index of 0 is not L0 motion information or when motion information having a merge index of 1 is not L1 motion information, the combined motion information may be neither generated nor added. Next, the combined motion information that is added with the next priority may be a combination of L0 motion information, having a merge index of 1, and L1 motion information, having a merge index of 0. Subsequent detailed combinations may conform to other combinations of video encoding/decoding fields.

Here, when the combined motion information overlaps other motion information already present in the merge list, the combined motion information may not be added to the merge list.

Step 4) When the number of pieces of motion information in the merge list is less than N, motion information of a zero vector may be added to the merge list.

The zero-vector motion information may be motion information for which the motion vector is a zero vector.

The number of pieces of zero-vector motion information may be one or more. The reference picture indices of one or more pieces of zero-vector motion information may be different from each other. For example, the value of the reference picture index of first zero-vector motion information may be 0. The value of the reference picture index of second zero-vector motion information may be 1.

The number of pieces of zero-vector motion information may be identical to the number of reference pictures in the reference picture list.

The reference direction of zero-vector motion information may be bidirectional. Both of the motion vectors may be zero vectors. The number of pieces of zero-vector motion information may be the smaller one of the number of reference pictures in the reference picture list L0 and the number of reference pictures in the reference picture list L1. Alternatively, when the number of reference pictures in the reference picture list L0 and the number of reference pictures in the reference picture list L1 are different from each other, a reference direction that is unidirectional may be used for a reference picture index that may be applied only to a single reference picture list.

The encoding apparatus 100 and/or the decoding apparatus 200 may sequentially add the zero-vector motion information to the merge list while changing the reference picture index.

When zero-vector motion information overlaps other motion information already present in the merge list, the zero-vector motion information may not be added to the merge list.

The order of the above-described steps 1) to 4) is merely exemplary, and may be changed. Further, some of the above steps may be omitted depending on predefined conditions.

Method for Deriving Prediction Motion Vector Candidate List in AMVP Mode

The maximum number of prediction motion vector candidates in a prediction motion vector candidate list may be predefined. The predefined maximum number is indicated by N. For example, the predefined maximum number may be 2.

Pieces of motion information (i.e. prediction motion vector candidates) may be added to the prediction motion vector candidate list in the order of the following steps 1) to 3).

Step 1) Available spatial candidates, among spatial candidates, may be added to the prediction motion vector candidate list. The spatial candidates may include a first spatial candidate and a second spatial candidate.

The first spatial candidate may be one of $A_0$, $A_1$, scaled $A_0$, and scaled $A_1$. The second spatial candidate may be one of $B_0$, $B_1$, $B_2$, scaled $B_0$, scaled $B_1$, and scaled $B_2$.

Pieces of motion information of available spatial candidates may be added to the prediction motion vector candidate list in the order of the first spatial candidate and the second spatial candidate. In this case, when the motion information of an available spatial candidate overlaps other motion information already present in the prediction motion vector candidate list, the motion information may not be added to the prediction motion vector candidate list. In other words, when the value of N is 2, if the motion information of a second spatial candidate is identical to the motion information of a first spatial candidate, the motion information of the second spatial candidate may not be added to the prediction motion vector candidate list.

The maximum number of pieces of motion information that are added may be N.

Step 2) When the number of pieces of motion information in the prediction motion vector candidate list is less than N and a temporal candidate is available, the motion information of the temporal candidate may be added to the prediction motion vector candidate list. In this case, when the motion information of the available temporal candidate overlaps other motion information already present in the prediction motion vector candidate list, the motion information may not be added to the prediction motion vector candidate list.

Step 3) When the number of pieces of motion information in the prediction motion vector candidate list is less than N, zero-vector motion information may be added to the prediction motion vector candidate list.

The zero-vector motion information may include one or more pieces of zero-vector motion information. The reference picture indices of the one or more pieces of zero-vector motion information may be different from each other.

The encoding apparatus 100 and/or the decoding apparatus 200 may sequentially add pieces of zero-vector motion information to the prediction motion vector candidate list while changing the reference picture index.

When zero-vector motion information overlaps other motion information already present in the prediction motion vector candidate list, the zero-vector motion information may not be added to the prediction motion vector candidate list.

The description of the zero-vector motion information, made above in connection with the merge list, may also be applied to zero-vector motion information. A repeated description thereof will be omitted.

The order of the above-described steps 1) to 3) is merely exemplary, and may be changed. Further, some of the steps may be omitted depending on predefined conditions.

Figure 12:
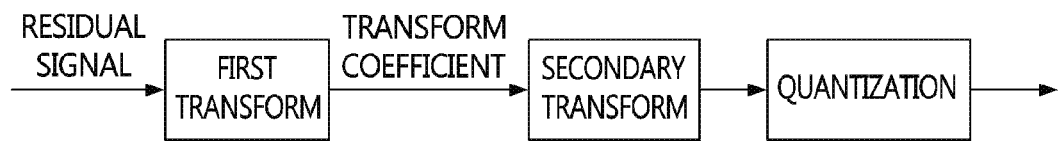
FIG. 12 illustrates a transform and quantization process according to an example.

FIG. 12 illustrates a transform and quantization process according to an example.

As illustrated in FIG. 12, quantized levels may be generated by performing a transform and/or quantization process on a residual signal.

A residual signal may be generated as the difference between an original block and a prediction block. Here, the prediction block may be a block generated via intra prediction or inter prediction.

The residual signal may be transformed into a signal in a frequency domain through a transform procedure that is a part of a quantization procedure.

A transform kernel used for a transform may include various DCT kernels, such as Discrete Cosine Transform (DCT) type 2 (DCT-II) and Discrete Sine Transform (DST) kernels.

These transform kernels may perform a separable transform or a two-dimensional (2D) non-separable transform on the residual signal. The separable transform may be a transform indicating that a one-dimensional (1D) transform is performed on the residual signal in each of a horizontal direction and a vertical direction.

The DCT type and the DST type, which are adaptively used for a 1D transform, may include DCT-V, DCT-VIII, DST-I, and DST-VII in addition to DCT-II, as shown in the following Table 3.

TABLE 3

| Transform set | Transform candidates |
| --- | --- |
| 0 | DST-VII, DCT-VIII |
| 1 | DST-VII, DST-I |
| 2 | DST-VII, DCT-V |

As shown in Table 3, when a DCT type or a DST type to be used for a transform is derived, transform sets may be used. Each transform set may include multiple transform candidates. Each transform candidate may be a DCT type or a DST type.

The following Table 4 shows examples of a transform set that is applied to a horizontal direction depending on the intra-prediction mode.

TABLE 4

| Intra-prediction mode | Transform set |
| --- | --- |
| 0 | 2 |
| 1 | 1 |
| 2 | 0 |
| 3 | 1 |
| 4 | 0 |
| 5 | 1 |
| 6 | 0 |
| 7 | 1 |
| 8 | 0 |
| 9 | 1 |
| 10 | 0 |
| 11 | 1 |
| 12 | 0 |
| 13 | 1 |
| 14 | 2 |
| 15 | 2 |
| 16 | 2 |
| 17 | 2 |
| 18 | 2 |
| 19 | 2 |
| 20 | 2 |
| 21 | 2 |
| 22 | 2 |
| 23 | 1 |
| 24 | 0 |
| 25 | 1 |
| 26 | 0 |
| 27 | 1 |
| 28 | 0 |
| 29 | 1 |
| 30 | 0 |
| 31 | 1 |
| 32 | 0 |
| 33 | 1 |

In Table 4, the number of each transform set to be applied to the horizontal direction of a residual signal is indicated depending on the intra-prediction mode of the target block.

The following Table 5 shows examples of a transform set that is applied to the vertical direction of the residual signal depending on the intra-prediction mode.

TABLE 5

| Intra-prediction mode | Transform set |
| --- | --- |
| 0 | 2 |
| 1 | 1 |
| 2 | 0 |

TABLE 5-continued

| Intra-prediction mode | Transform set |
| --- | --- |
| 3 | 1 |
| 4 | 0 |
| 5 | 1 |
| 6 | 0 |
| 7 | 1 |
| 8 | 0 |
| 9 | 1 |
| 10 | 0 |
| 11 | 1 |
| 12 | 0 |
| 13 | 1 |
| 14 | 0 |
| 15 | 0 |
| 16 | 0 |
| 17 | 0 |
| 18 | 0 |
| 19 | 0 |
| 20 | 0 |
| 21 | 0 |
| 22 | 0 |
| 23 | 1 |
| 24 | 0 |
| 25 | 1 |
| 26 | 0 |
| 27 | 1 |
| 28 | 0 |
| 29 | 1 |
| 30 | 0 |
| 31 | 1 |
| 32 | 0 |
| 33 | 1 |

As exemplified in Tables 4 and 5, transform sets to be applied to the horizontal direction and the vertical direction may be predefined depending on the intra-prediction mode of the target block. The encoding apparatus 100 may perform a transform and an inverse transform on the residual signal using a transform included in the transform set corresponding to the intra-prediction mode of the target block. Further, the decoding apparatus 200 may perform an inverse transform on the residual signal using a transform included in the transform set corresponding to the intra-prediction mode of the target block.

In the transform and inverse transform, transform sets to be applied to the residual signal may be determined, as exemplified in Tables 3, 4, and 5, and may not be signaled. Transform indication information may be signaled from the encoding apparatus 100 to the decoding apparatus 200. The transform indication information may be information indicating which one of multiple transform candidates included in the transform set to be applied to the residual signal is used.

As described above, methods using various transforms may be applied to a residual signal generated via intra prediction or inter prediction.

The transform may include at least one of a first transform and a secondary transform. A transform coefficient may be generated by performing the first transform on the residual signal, and a secondary transform coefficient may be generated by performing the secondary transform on the transform coefficient.

The first transform may be referred to as a "primary transform". Further, the first transform may also be referred to as an "Adaptive Multiple Transform (AMT) scheme". AMT may mean that, as described above, different transforms are applied to respective 1D directions (i.e. a vertical direction and a horizontal direction).

A secondary transform may be a transform for improving energy concentration on a transform coefficient generated by the first transform. Similar to the first transform, the secondary transform may be a separable transform or a non-separable transform. Such a non-separable transform may be a Non-Separable Secondary Transform (NSST).

The first transform may be performed using at least one of predefined multiple transform methods. For example, the predefined multiple transform methods may include a Discrete Cosine Transform (DCT), a Discrete Sine Transform (DST), a Karhunen-Loeve Transform (KLT), etc.

The secondary transform may be performed on the transform coefficient generated by performing the first transform.

A first transform and a secondary transform may be applied to signal components corresponding to one or more of a luminance (luma) component and a chrominance (chroma) component. Whether to apply the first transform and/or the secondary transform may be determined depending on at least one of coding parameters for a target block and/or a neighboring block. For example, whether to apply the first transform and/or the secondary transform may be determined depending on the size and/or shape of the target block.

The transform method(s) to be applied to a first transform and/or a secondary transform may be determined depending on at least one of coding parameters for a target block and/or a neighboring block. The determined transform method may also indicate that a first transform and/or a secondary transform are not used.

Alternatively, transform information indicating a transform method may be signaled from the encoding apparatus 100 to the decoding apparatus 200. For example, the transform information may include the index of a transform to be used for a first transform and/or a secondary transform.

The quantized levels may be generated by performing quantization on the result, generated by performing the primary transform and/or the secondary transform, or on the residual signal.

Figure 13:
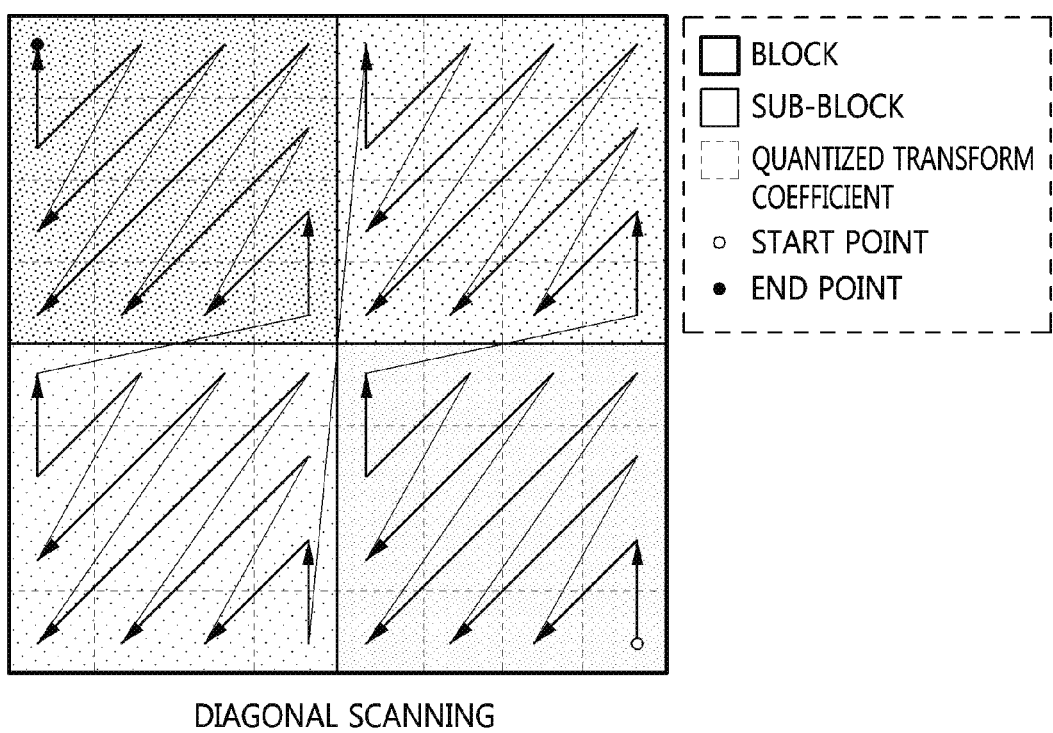
FIG. 13 illustrates diagonal scanning according to an example.

FIG. 13 illustrates diagonal scanning according to an example.

Figure 14:
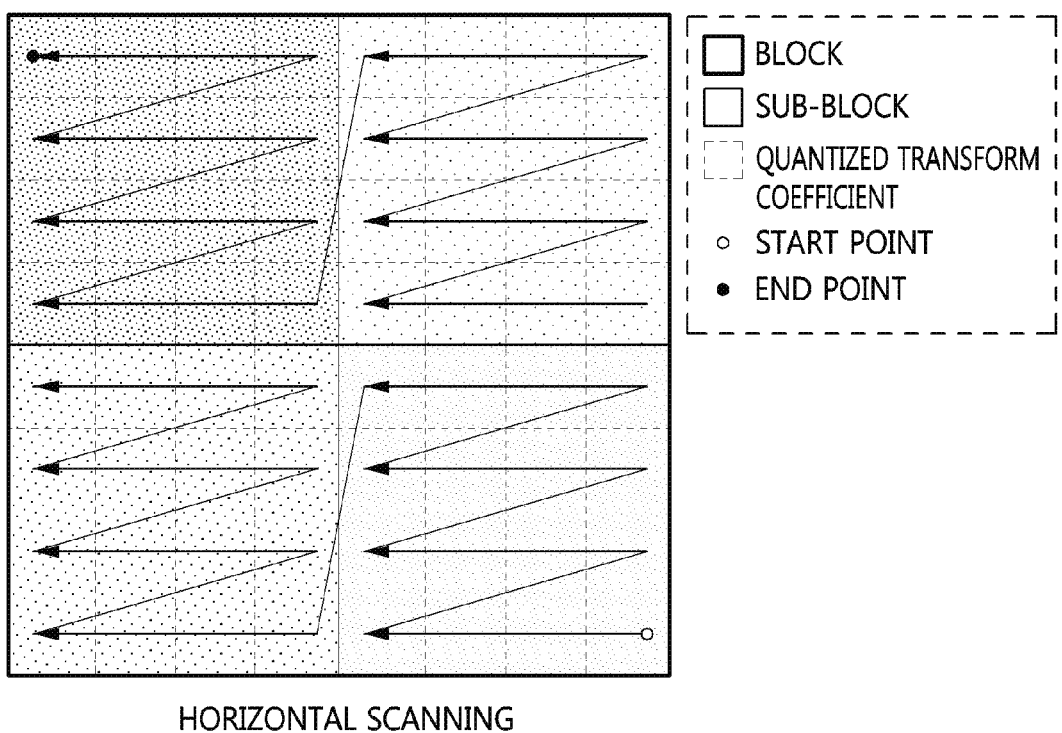
FIG. 14 illustrates horizontal scanning according to an example.

FIG. 14 illustrates horizontal scanning according to an example.

Figure 15:
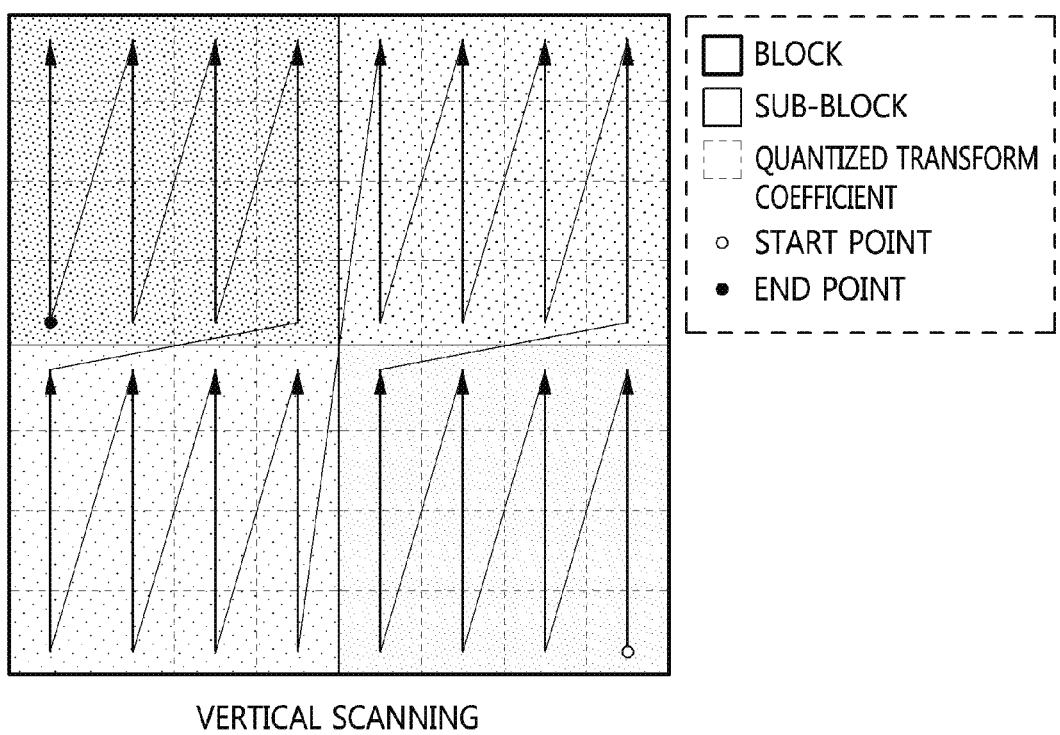
FIG. 15 illustrates vertical scanning according to an example.

FIG. 15 illustrates vertical scanning according to an example.

Quantized transform coefficients may be scanned via at least one of (up-right) diagonal scanning, vertical scanning, and horizontal scanning depending on at least one of an intra-prediction mode, a block size, and a block shape. The block may be a Transform Unit (TU).

Each scanning may be initiated at a specific start point, and may be terminated at a specific end point.

For example, quantized transform coefficients may be changed to 1D vector forms by scanning the coefficients of a block using diagonal scanning of FIG. 13. Alternatively, horizontal scanning of FIG. 14 or vertical scanning of FIG. 15, instead of diagonal scanning, may be used depending on the size and/or intra-prediction mode of a block.

Vertical scanning may be the operation of scanning 2D block-type coefficients in a column direction. Horizontal scanning may be the operation of scanning 2D block-type coefficients in a row direction.

In other words, which one of diagonal scanning, vertical scanning, and horizontal scanning is to be used may be determined depending on the size and/or inter-prediction mode of the block.

As illustrated in FIGS. 13, 14, and 15, the quantized transform coefficients may be scanned along a diagonal direction, a horizontal direction or a vertical direction.

The quantized transform coefficients may be represented by block shapes. Each block may include multiple sub-blocks. Each sub-block may be defined depending on a minimum block size or a minimum block shape.

In scanning, a scanning sequence depending on the type or direction of scanning may be primarily applied to sub-blocks. Further, a scanning sequence depending on the direction of scanning may be applied to quantized transform coefficients in each sub-block.

For example, as illustrated in FIGS. 13, 14, and 15, when the size of a target block is 8×8, quantized transform coefficients may be generated through a primary transform, a secondary transform, and quantization on the residual signal of the target block. Therefore, one of three types of scanning sequences may be applied to four 4×4 sub-blocks, and quantized transform coefficients may also be scanned for each 4×4 sub-block depending on the scanning sequence.

The scanned quantized transform coefficients may be entropy-encoded, and a bitstream may include the entropy-encoded quantized transform coefficients.

The decoding apparatus 200 may generate quantized transform coefficients via entropy decoding on the bitstream. The quantized transform coefficients may be aligned in the form of a 2D block via inverse scanning Here, as the method of inverse scanning, at least one of up-right diagonal scanning, vertical scanning, and horizontal scanning may be performed.

Dequantization may be performed on the quantized transform coefficients. A secondary inverse transform may be performed on the result generated by performing dequantization depending on whether to perform the secondary inverse transform. Further, a primary inverse transform may be performed on the result generated by performing the secondary inverse transform depending on whether the primary inverse transform is to be performed. A reconstructed residual signal may be generated by performing the primary inverse transform on the result generated by performing the secondary inverse transform.

Figure 16:
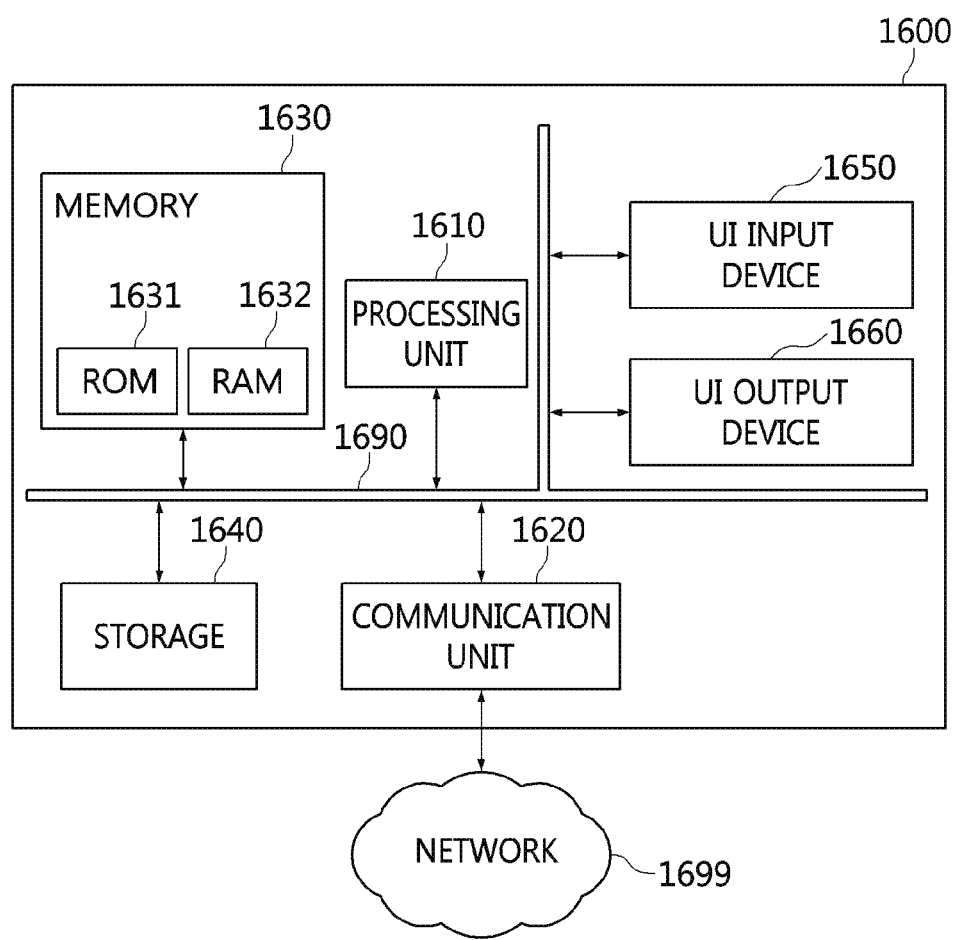
FIG. 16 is a configuration diagram of an encoding apparatus according to an embodiment.

FIG. 16 is a configuration diagram of an encoding apparatus according to an embodiment.

An encoding apparatus 1600 may correspond to the above-described encoding apparatus 100.

The encoding apparatus 1600 may include a processing unit 1610, memory 1630, a user interface (UI) input device 1650, a UI output device 1660, and storage 1640, which communicate with each other through a bus 1690. The encoding apparatus 1600 may further include a communication unit 1620 coupled to a network 1699.

The processing unit 1610 may be a Central Processing Unit (CPU) or a semiconductor device for executing processing instructions stored in the memory 1630 or the storage 1640. The processing unit 1610 may be at least one hardware processor.

The processing unit 1610 may generate and process signals, data or information that are input to the encoding apparatus 1600, are output from the encoding apparatus 1600, or are used in the encoding apparatus 1600, and may perform examination, comparison, determination, etc. related to the signals, data or information. In other words, in embodiments, the generation and processing of data or information and examination, comparison and determination related to data or information may be performed by the processing unit 1610.

The processing unit 1610 may include an inter-prediction unit 110, an intra-prediction unit 120, a switch 115, a subtractor 125, a transform unit 130, a quantization unit 140, an entropy encoding unit 150, a dequantization unit 160, an inverse transform unit 170, an adder 175, a filter unit 180, and a reference picture buffer 190.

At least some of the inter-prediction unit 110, the intra-prediction unit 120, the switch 115, the subtractor 125, the transform unit 130, the quantization unit 140, the entropy encoding unit 150, the dequantization unit 160, the inverse transform unit 170, the adder 175, the filter unit 180, and the reference picture buffer 190 may be program modules, and may communicate with an external device or system. The program modules may be included in the encoding apparatus 1600 in the form of an operating system, an application program module, or other program modules.

The program modules may be physically stored in various types of well-known storage devices. Further, at least some of the program modules may also be stored in a remote storage device that is capable of communicating with the encoding apparatus 1200.

The program modules may include, but are not limited to, a routine, a subroutine, a program, an object, a component, and a data structure for performing functions or operations according to an embodiment or for implementing abstract data types according to an embodiment.

The program modules may be implemented using instructions or code executed by at least one processor of the encoding apparatus 1600.

The processing unit 1610 may execute instructions or code in the inter-prediction unit 110, the intra-prediction unit 120, the switch 115, the subtractor 125, the transform unit 130, the quantization unit 140, the entropy encoding unit 150, the dequantization unit 160, the inverse transform unit 170, the adder 175, the filter unit 180, and the reference picture buffer 190.

A storage unit may denote the memory 1630 and/or the storage 1640.

Each of the memory 1630 and the storage 1640 may be any of various types of volatile or nonvolatile storage media. For example, the memory 1630 may include at least one of Read-Only Memory (ROM) 1631 and Random Access Memory (RAM) 1632.

The storage unit may store data or information used for the operation of the encoding apparatus 1600. In an embodiment, the data or information of the encoding apparatus 1600 may be stored in the storage unit.

For example, the storage unit may store pictures, blocks, lists, motion information, inter-prediction information, bitstreams, etc.

The encoding apparatus 1600 may be implemented in a computer system including a computer-readable storage medium.

The storage medium may store at least one module required for the operation of the encoding apparatus 1600. The memory 1630 may store at least one module, and may be configured such that the at least one module is executed by the processing unit 1610.

Functions related to communication of the data or information of the encoding apparatus 1600 may be performed through the communication unit 1220.

For example, the communication unit 1620 may transmit a bitstream to a decoding apparatus 1600, which will be described later.

Figure 17:
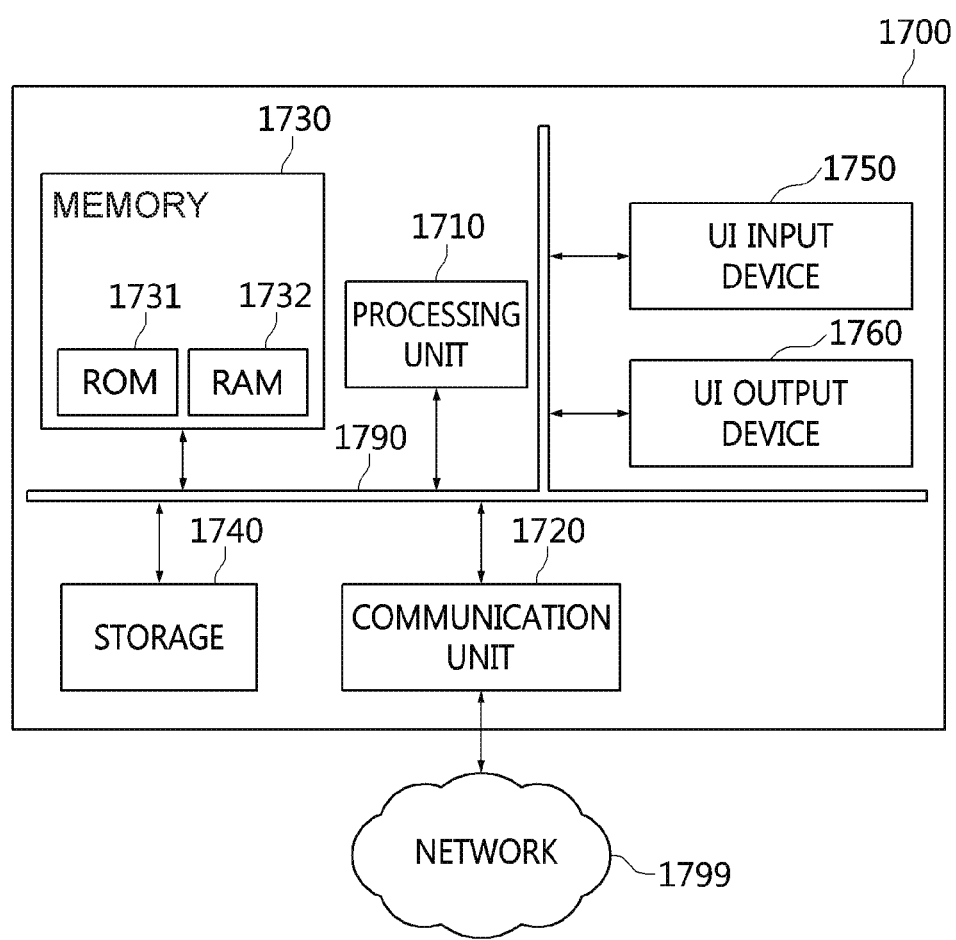
FIG. 17 is a configuration diagram of a decoding apparatus according to an embodiment.

FIG. 17 is a configuration diagram of a decoding apparatus according to an embodiment.

The decoding apparatus 1700 may correspond to the above-described decoding apparatus 200.

The decoding apparatus 1700 may include a processing unit 1710, memory 1730, a user interface (UI) input device 1750, a UI output device 1760, and storage 1740, which communicate with each other through a bus 1790. The decoding apparatus 1700 may further include a communication unit 1720 coupled to a network 1399.

The processing unit 1710 may be a Central Processing Unit (CPU) or a semiconductor device for executing processing instructions stored in the memory 1730 or the storage 1740. The processing unit 1710 may be at least one hardware processor.

The processing unit 1710 may generate and process signals, data or information that are input to the decoding apparatus 1700, are output from the decoding apparatus 1700, or are used in the decoding apparatus 1700, and may perform examination, comparison, determination, etc. related to the signals, data or information. In other words, in embodiments, the generation and processing of data or information and examination, comparison and determination related to data or information may be performed by the processing unit 1710.

The processing unit 1710 may include an entropy decoding unit 210, a dequantization unit 220, an inverse transform unit 230, an intra-prediction unit 240, an inter-prediction unit 250, a switch 245, an adder 255, a filter unit 260, and a reference picture buffer 270.

At least some of the entropy decoding unit 210, the dequantization unit 220, the inverse transform unit 230, the intra-prediction unit 240, the inter-prediction unit 250, the adder 255, the switch 245, the filter unit 260, and the reference picture buffer 270 of the decoding apparatus 200 may be program modules, and may communicate with an external device or system. The program modules may be included in the decoding apparatus 1700 in the form of an operating system, an application program module, or other program modules.

The program modules may be physically stored in various types of well-known storage devices. Further, at least some of the program modules may also be stored in a remote storage device that is capable of communicating with the decoding apparatus 1700.

The program modules may include, but are not limited to, a routine, a subroutine, a program, an object, a component, and a data structure for performing functions or operations according to an embodiment or for implementing abstract data types according to an embodiment.

The program modules may be implemented using instructions or code executed by at least one processor of the decoding apparatus 1700.

The processing unit 1710 may execute instructions or code in the entropy decoding unit 210, the dequantization unit 220, the inverse transform unit 230, the intra-prediction unit 240, the inter-prediction unit 250, the switch 245, the adder 255, the filter unit 260, and the reference picture buffer 270.

A storage unit may denote the memory 1730 and/or the storage 1740.

Each of the memory 1730 and the storage 1740 may be any of various types of volatile or nonvolatile storage media. For example, the memory 1730 may include at least one of ROM 1731 and RAM 1732.

The storage unit may store data or information used for the operation of the decoding apparatus 1700. In an embodiment, the data or information of the decoding apparatus 1700 may be stored in the storage unit.

For example, the storage unit may store pictures, blocks, lists, motion information, inter-prediction information, bitstreams, etc.

The decoding apparatus 1700 may be implemented in a computer system including a computer-readable storage medium.

The storage medium may store at least one module required for the operation of the decoding apparatus 1700. The memory 1730 may store at least one module, and may be configured such that the at least one module is executed by the processing unit 1710.

Functions related to communication of the data or information of the decoding apparatus 1700 may be performed through the communication unit 1720.

For example, the communication unit 1720 may receive a bitstream from the encoding apparatus 1600.

Method and Apparatus for Bidirectional Intra-Prediction

Figure 18:
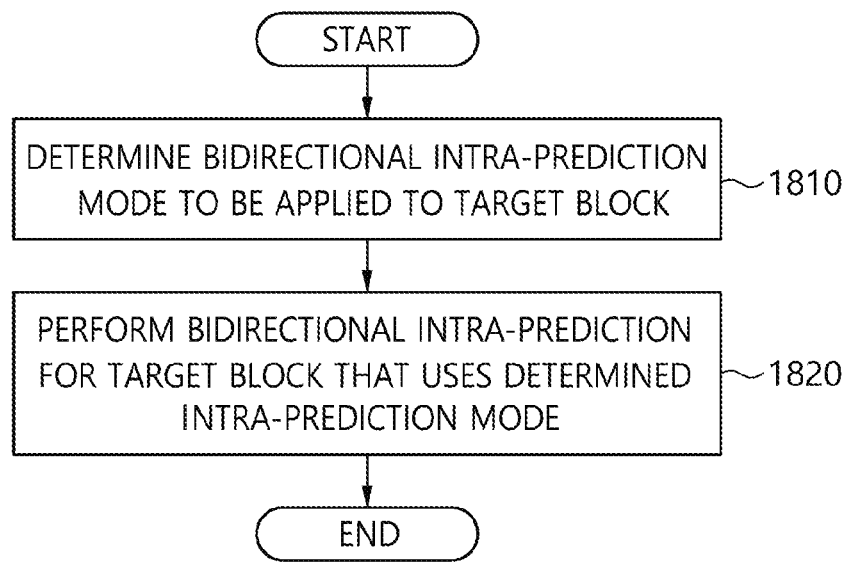
FIG. 18 is a flowchart of a bidirectional intra-prediction method according to an embodiment.

FIG. 18 is a flowchart of a bidirectional intra-prediction method according to an embodiment.

The bidirectional intra-prediction method may be performed by an encoding apparatus 1600 and/or a decoding apparatus 1700.

For example, the encoding apparatus 1600 may perform the prediction method according to the embodiment so as to compare the efficiencies of multiple prediction methods for a target block and/or multiple partition blocks, and may also perform the prediction method according to the embodiment so as to generate a reconstructed block for the target block.

In an embodiment, the target block may be a PU, or may be at least one of a CTB, a CU, a PU, a TU, a sub-block, a block having a specific size, and a block having a size within a predefined range. Alternatively, the target block may be a unit of coding.

For example, the decoding apparatus 1700 may perform the prediction method according to the embodiment so as to generate a reconstructed block for the target block.

Below, the term "processing unit" may correspond to the processing unit 1610 of the encoding apparatus 1600 and/or the processing unit 1710 of the decoding apparatus 1700.

At step 1810, the processing unit may determine the bidirectional intra-prediction mode to be applied to the encoding and/or decoding of the target block.

The processing unit may determine and derive a bidirectional intra-prediction mode based on at least one of 1) an intra-prediction mode indicator, 2) a unidirectional/bidirectional classification indicator, 3) a Most Probable Mode (MPM), 4) the availability of a pixel in a neighbor block located in a specified direction from a target block, and 5) the prediction mode of the neighbor block.

At step 1820, the processing unit may determine a prediction value of a prediction block for the target block by performing bidirectional intra-prediction for the target block that uses the determined bidirectional intra-prediction mode.

In an embodiment, the two directions of bidirectional intra-prediction may be two linear directions implemented in opposite directions. For example, the two directions may be the direction of an angle of 45° and the direction of an angle of 225°.

In an embodiment, the two directions of bidirectional intra-prediction may be two different directions that are not collinearly oriented. For example, the two directions may be the direction of an angle of 45° and the direction of an angle of 90°.

The processing unit may generate at least one virtual neighbor pixel in a specified direction from the target block, and may perform bidirectional intra-prediction for the target block using the at least one virtual neighbor pixel. The processing unit may derive a prediction value of a target pixel in a prediction block based on the at least one virtual neighbor pixel. The specified direction may include one or more of a right direction and a bottom direction.

The target pixel may be a pixel that is the target of encoding and/or decoding.

The processing unit may derive the prediction value of the target pixel in the target block using at least one of 1) pixels in neighbor blocks located in two directions of bidirectional intra-prediction, 2) weights depending on the distances between respective pixels in the neighbor blocks located in two directions and the target pixel, and 3) weights for the two directions.

The prediction value of the target pixel in the target block may be the value of a pixel in the prediction block.

The processing unit may perform encoding and/or decoding in intra-prediction using the derived prediction value.

The processing unit may derive the bidirectional intra-prediction mode at step 1810 based on at least one of a coding parameter related to the target block, information of a target picture, information of a target slice, a quantization parameter, a Coded Block Flag (CBF), the size of the target block, the form of the target block, the entropy-coding method applied to the target block, the intra-prediction mode of a neighbor block of the target block, and the temporal layer level of the target block.

Alternatively, the processing unit may derive the prediction value of the target pixel in the target block at step 1820 based on at least one of a coding parameter related to the target block, information of a target picture, information of a target slice, a quantization parameter, a Coded Block Flag (CBF), the size of the target block, the form of the target block, the entropy-coding method applied to the target block, the intra-prediction mode of a neighbor block of the target block, and the temporal layer level of the target block.

Determination of Bidirectional Intra-Prediction Mode

Hereinafter, the bidirectional intra-prediction mode may indicate the directions of bidirectional intra-prediction. The terms "bidirectional intra-prediction mode" and "directions of bidirectional intra-prediction" may be used to have the same meaning, and may be used interchangeably with each other.

Figure 19:
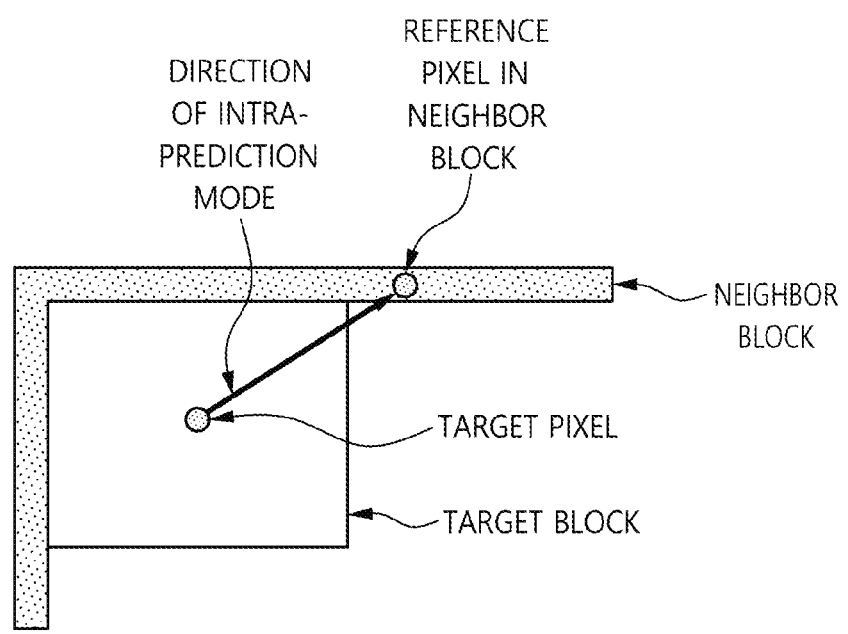
FIG. 19 illustrates a unidirectional intra-prediction mode according to an example.

FIG. 19 illustrates a unidirectional intra-prediction mode according to an example.

Figure 20:
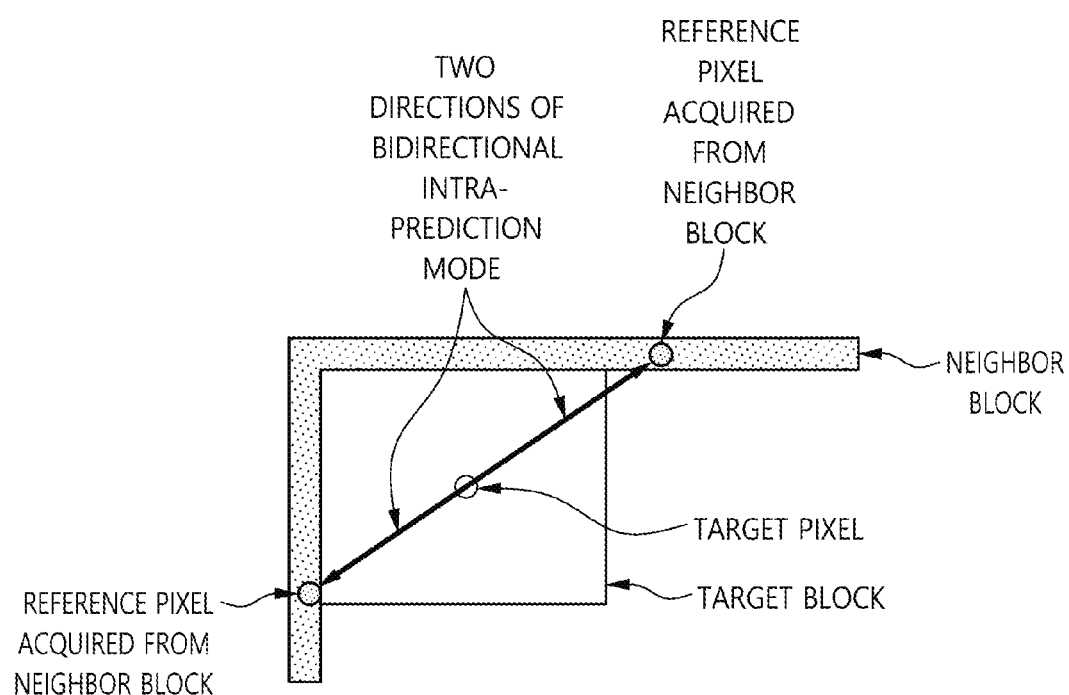
FIG. 20 illustrates a bidirectional intra-prediction mode according to an example.

FIG. 20 illustrates a bidirectional intra-prediction mode according to an example.

Figure 21:
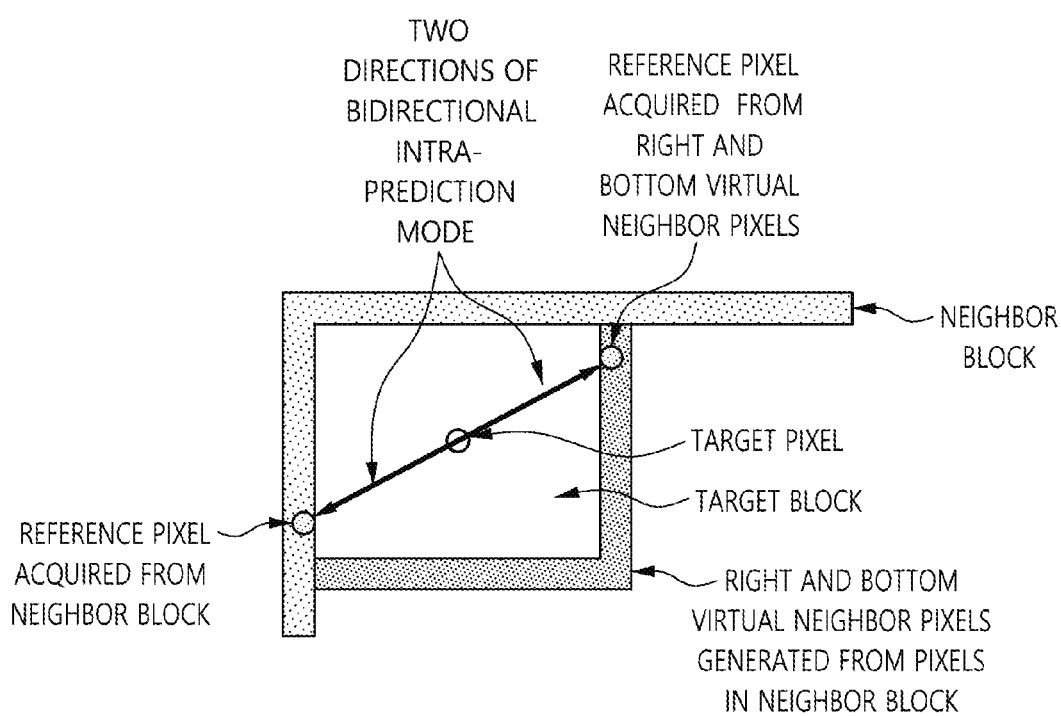
FIG. 21 illustrates a bidirectional intra-prediction mode using virtual neighbor pixels according to an example.

FIG. 21 illustrates a bidirectional intra-prediction mode using virtual neighbor pixels according to an example.

A processing unit may determine and derive a bidirectional intra-prediction mode based on at least one of 1) an intra-prediction mode indicator, 2) a unidirectional/bidirectional classification indicator, 3) MPM, 4) the availability of pixels in a neighbor block located in a specified direction from a target block, and 5) the prediction mode of the neighbor block.

As illustrated in FIG. 19, the unidirectional intra-prediction mode may be an intra-prediction mode that refers to pixels located in a single specified direction.

As illustrated in FIG. 20, the bidirectional intra-prediction mode may be an intra-prediction mode that refers to pixels located in two specified directions.

Here, the pixels to be referred to may be pixels adjacent to the target block. The pixels to be referred to for intra-prediction may also be referred to as "samples".

Here, the term "pixels located in two specified directions" may mean "pixels located in a first specified direction and pixels located in a second specified direction".

As illustrated in FIG. 21, in the bidirectional intra-prediction mode, at least one virtual neighbor pixel located to the right of the target block or below the target block may be generated using pixels in a reconstructed neighbor block. In other words, at least one virtual neighbor pixel may be located to the right of the target block or below the target block. The bidirectional intra-prediction mode may be an intra-prediction mode that refers to pixels located in two specified directions using the pixels in the reconstructed neighbor block and the virtual neighbor pixel.

Here, the virtual neighbor pixel located to the right of the target block may be adjacent to and to the right of the target block. Here, the virtual neighbor pixel located below the target block may be adjacent to and below the target block.

The processing unit may determine whether a bidirectional intra-prediction mode is to be used for the target block based on at least one of the unidirectional/bidirectional classification indicator and the intra-prediction mode indicator, and may derive a bidirectional intra-prediction mode.

The unidirectional/bidirectional classification indicator may indicate whether the bidirectional intra-prediction mode is to be used for the target block. The unidirectional/bidirectional classification indicator may have any one of a first value and a second value. The first value may indicate that unidirectional intra-prediction is used. For example, the first value may be "0". The second value may indicate that bidirectional intra-prediction is used. For example, the second value may be "1".

The unidirectional/bidirectional classification indicator may be signaled at the level of a specific unit of encoding and/or decoding, such as a video, a sequence, a picture, a slice, a tile, a CTU, a CU, a target block, the sub-block of a target block, and a block having a specific size. In other words, the specific unit of encoding and/or decoding may include a unidirectional/bidirectional classification indicator indicating whether the bidirectional intra-prediction mode is to be used for targets in the unit.

The bidirectional intra-prediction mode may indicate two directions for bidirectional intra-prediction. The two directions may be indicated using the following schemes given in 1) to 4).

1) The number of intra-prediction mode indicators may be two, and the two directions of bidirectional intra-prediction may be respectively indicated by the two intra-prediction mode indicators.

Each of the two intra-prediction mode indicators may indicate the direction of a unidirectional intra-prediction mode. The two directions of bidirectional intra-prediction may be determined by the two directions indicated by the two intra-prediction mode indicators.

In this case, one intra-prediction mode indicator may indicate one direction for the intra-prediction mode, rather than classifying between unidirectional and bidirectional prediction modes. Here, the direction may correspond to an angle such as 45°, 80°, or 135°.

2) One intra-prediction mode indicator may indicate any one of the direction of unidirectional intra-prediction and the directions of bidirectional intra-prediction.

For example, the value "3" of the intra-prediction mode indicator may indicate unidirectional intra-prediction at 45°, and the value "70" of the intra-prediction mode indicator may indicate bidirectional intra-prediction at 45° and 225°.

3) In order to indicate the direction of intra-prediction, a unidirectional/bidirectional classification indicator and an intra-prediction mode indicator may be used together.

The unidirectional/bidirectional classification indicator may indicate which one of unidirectional intra-prediction and bidirectional intra-prediction is to be used, and the intra-prediction mode indicator may indicate the direction of prediction.

For example, when the value of the unidirectional/bidirectional classification indicator is the second value and the value of the intra-prediction mode indicator is 7, bidirectional intra-prediction at 45° and 255°, which is the direction opposite 45°, may be used.

For example, when the value of the unidirectional/bidirectional classification indicator is the first value, and the value of the intra-prediction mode indicator is 7, unidirectional intra-prediction at 45° may be used.

4) When one intra-prediction mode indicator indicates the specified direction of unidirectional intra-prediction, bidirectional intra-prediction may be performed.

For example, when the intra-prediction mode indicator indicates unidirectional prediction at 45°, bidirectional intra-prediction at 45° and 255°, which is the direction opposite 45°, may be performed.

Figure 22:
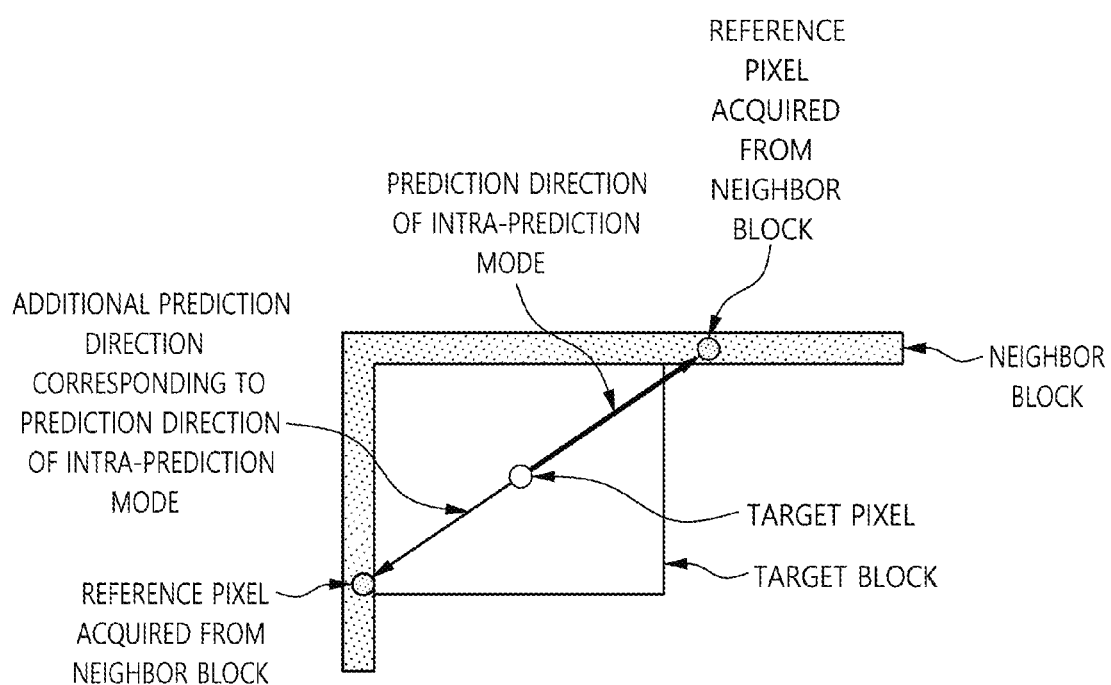
FIG. 22 illustrates the derivation and selection of bidirectional intra-prediction from the direction of an intra-prediction mode indicator according to an example.

FIG. 22 illustrates the derivation and selection of bidirectional intra-prediction from the direction of an intra-prediction mode indicator according to an example.

A processing unit may adaptively determine and derive a bidirectional intra-prediction mode based on 1) an intra-prediction mode indicator and 2) the availability of pixels in a neighbor block of a target block.

As illustrated in FIG. 22, the intra-prediction mode indicator may indicate one direction of the intra-prediction mode, and an additional direction corresponding to the direction of the intra-prediction mode may be determined. Here, the additional direction may be a direction for bidirectional intra-prediction determined according to the direction of the intra-prediction mode.

The additional direction may be the direction opposite the direction of intra-prediction.

Any one of unidirectional intra-prediction and bidirectional intra-prediction may be selected and derived depending on the availability of a reference pixel in a direction corresponding to the direction indicated by the intra-prediction mode indicator.

For example, any one of unidirectional intra-prediction and bidirectional intra-prediction may be selected and derived depending on the availability of a reference pixel in the direction opposite the direction indicated by the intra-prediction mode indicator.

Here, when the reference pixel in the corresponding direction is available, bidirectional intra-prediction may be selected, whereas when the reference pixel in the corresponding direction is not available, unidirectional intra-prediction may be selected.

Hereinafter, the term "(reference) pixel in a specified direction" may mean a "(reference) pixel located in the specified direction".

Here, the fact that a reference pixel is available may mean that the value of the reference pixel has been determined. Alternatively, the fact that the reference pixel is available may mean that reconstruction of the reference pixel has been performed before intra-prediction of the target block is performed. The fact that a reference pixel is not available may mean that the value of the reference pixel has not been determined. Alternatively, the fact that the reference pixel is not available may mean that reconstruction of the reference pixel has not been performed before intra-prediction of the target block is performed, and thus the value of the reference pixel has not been determined.

For example, when the intra-prediction mode indicator indicates an upper-right direction (e.g. at an angle of 45°), and a pixel in a neighbor block in a lower-left direction (e.g. at an angle of 225°), which is the direction opposite the upper-right direction, is available, the processing unit may determine that the intra-prediction to be used for the target block is bidirectional intra-prediction in two directions, i.e., the upper-right direction and the lower-left direction.

For example, when the intra-prediction mode indicator indicates an upper-right direction (e.g. at an angle of 45°), and a pixel in a neighbor block in the lower-left direction (e.g. direction at an angle of 225 degrees), which is the direction opposite the upper-right direction, is not available, the processing unit may determine that the intra-prediction to be used for the target block is unidirectional intra-prediction in the upper-right direction.

The unit of the determination and derivation of an intra-prediction mode may be a target block. The selection of the intra-prediction mode may be the determination of which one of unidirectional intra-prediction and bidirectional intra-prediction is to be used. That is, which one of unidirectional intra-prediction and bidirectional intra-prediction is to be used for the entire target block may be adaptively determined.

Hereinafter, an intra-prediction direction indicated by the intra-prediction mode indicator may be designated as a "first direction", and a second direction may designate the direction corresponding to the first direction or the direction opposite the first direction.

For example, for all pixels in the target block, when all reference pixels in the first direction and all reference pixels in the second direction are available, bidirectional intra-prediction in the first direction and the second direction may be used. For all pixels in the target block, when at least one unavailable reference pixel is present among all reference pixels in the second direction, unidirectional intra-prediction in the first direction may be used.

The unit of the determination and derivation of an intra-prediction mode may be each pixel in a target block. That is, which one of unidirectional intra-prediction and bidirectional intra-prediction is to be used for each of the pixels in the target block may be adaptively determined.

For example, for a specific pixel in the target block, when a reference pixel in the first direction and a reference pixel in the second direction are available, bidirectional intra-prediction in the first direction and the second direction may be used. For a specific pixel in the target block, when a reference pixel in the second direction is not available, unidirectional intra-prediction in the first direction may be used.

When the reference pixel in the first direction or the reference pixel in the second direction is not available, the processing unit may generate the value of the unavailable reference pixel using padding. Here, the value to be used for padding of the unavailable reference pixel may be the value of an available reference pixel closest to the unavailable reference pixel. When there are multiple reference pixels closest to the unavailable reference pixel, the value used to pad the unavailable reference pixel may be the average of the values of multiple closest available reference pixels.

By means of padding, the unavailable reference pixel may be made available, and unidirectional intra-prediction or bidirectional intra-prediction using the available reference pixel may be performed.

The second direction may be a collinear direction opposite the first direction indicated by the intra-prediction mode indicator. In other words, the second direction may be the direction resulting from adding 180° to the first direction. Alternatively, the second direction may be the direction in which a predefined angle c is added to the first direction indicated by the intra-prediction mode indicator. The predefined angle $\alpha$ may be set to the same value in an encoding apparatus 1600 and a decoding apparatus 1700, and may be signaled from the encoding apparatus 1600 to the decoding apparatus 1700.

As described above, the intra-prediction mode indicator in the embodiment may not distinguish a unidirectional mode from a bidirectional mode, and may indicate the direction of intra-prediction.

The processing unit may select the bidirectional intra-prediction mode for the target block based on at least one of 1) an MPM, 2) a unidirectional/bidirectional classification indicator, 3) an intra-prediction mode of a neighbor block, and 4) the availability of a reference pixel in a specified direction.

The processing unit may determine the bidirectional intra-prediction mode for the target block using the intra-prediction mode of a neighbor block and an MPM.

The processing unit may determine the bidirectional intra-prediction mode for the target block using the intra-prediction mode of the neighbor block of the target block and an MPM.

For example, when bidirectional intra-prediction has been used for at least one of neighbor blocks, and at least one of MPMs of the target block matches the bidirectional intra-prediction mode of the neighbor block, the processing unit may determine the bidirectional intra-prediction mode that uses the matched MPM to be the bidirectional intra-prediction mode of the target block.

For example, the processing unit may determine a bidirectional intra-prediction mode for the target block using two directional MPMs, among N MPMs of the target block. N may be an integer of 2 or more. For example, n may be 6.

The processing unit may determine a bidirectional intra-prediction mode for the target block using the intra-prediction mode of the neighbor block of the target block, an MPM, and a unidirectional/bidirectional classification indicator.

For example, when the unidirectional/bidirectional classification indicator indicates that bidirectional intra-prediction is used, the processing unit may determine a bidirectional intra-prediction mode for the target block using one of the MPMs of the target block. For example, the MPM to be used may be a first MPM in an MPM list.

The processing unit may select a bidirectional intra-prediction mode for the target block based on the intra-prediction mode of a neighbor block, an MPM, and the availability of a reference pixel in a direction opposite the intra-prediction direction of the neighbor block.

For example, the processing unit may be configured to derive the direction of intra-prediction for the target block from any one of the MPMs of the target block, and may be configured to, when a reference pixel in a direction corresponding to the derived direction is available, use a bidirectional intra-prediction mode in the derived direction and the corresponding direction for intra-prediction of the target block.

Intra-Prediction Using Bidirectional Intra-Prediction Mode

When the intra-prediction mode of a target block is derived and selected as a bidirectional intra-prediction mode, the processing unit may determine a prediction value for a target pixel by referring to at least one of pixels in neighbor blocks located in two prediction directions of the bidirectional intra-prediction mode.

Here, the target pixel may be a pixel that is the target of prediction, and may be a pixel in a target block or a pixel in a prediction block for the target block. In other words, a prediction value for the target block may be determined via bidirectional intra-prediction depending on the bidirectional intra-prediction mode.

In such bidirectional intra-prediction, the processing unit may acquire reference pixels in respective prediction directions by filtering pixels in neighbor blocks located in respective prediction directions of bidirectional intra-prediction. The processing unit may derive a prediction value for the target pixel using at least one of the acquired reference pixels.

In other words, the reference pixels may be pixels in neighbor blocks, and may be pixels at locations designated by a specified prediction direction from a pixel in the target block. Alternatively, reference pixels may be values acquired by applying filtering to pixels neighboring locations designated by a specified prediction direction from the pixel in the target block.

The processing unit may determine the prediction value for the target pixel using at least one of reference pixels in two prediction directions of the bidirectional intra-prediction mode.

When at least one of the reference pixels in the two prediction directions of the bidirectional intra-prediction mode is used, weights may be applied to respective reference pixels. The weights may be predefined. Alternatively, the weights may be set through calculation.

For example, the weights may be set based on the distances between the target pixel and respective reference pixels. The weights may be in inverse proportion to the distances between the target pixel and respective reference pixels. Alternatively, the weights may be in proportion to the distances between the target pixel and respective reference pixels. The ratio of the weights of the reference pixels may be the reciprocal of the ratio of the distances between the respective reference pixels and the target pixel.

The weights of the reference pixels may differ depending on the prediction directions.

The weight of each reference pixel may differ depending on whether the corresponding reference pixel is a reference pixel in the direction indicated by the intra-prediction mode indicator. For example, the weight of the direction indicated by the intra-prediction mode indicator may be $\alpha$, and the weight of the direction corresponding to the indicated direction may be $1-\alpha$. c may be a real number that is greater than 0 and less than 1. For example, $\alpha$ may be 2/3.

Alternatively, the weight of each reference pixel may be set based on the distance between the target pixel and the corresponding reference pixel and based on whether the reference pixel is a reference pixel in a direction indicated by the intra-prediction mode indicator.

The weights may be set by the encoding apparatus 1600, and the set weights may be signaled from the encoding apparatus 1600 to the decoding apparatus 1700 through a bitstream.

When the weight of one of the two prediction directions of the bidirectional intra-prediction mode is signaled, the weight of the other prediction direction may be set based on the signaled weight.

Each weight may be signaled at the level of a specific unit of encoding and/or decoding, such as a video, a sequence, a picture, a slice, a tile, a CTU, a CU, a target block, the sub-block of a target block, and a block having a specific size. In other words, the specific unit of encoding and/or decoding may include weights to be used for targets in the corresponding unit or information to be used to derive the weights.

Bidirectional Intra-Prediction Using Virtual Pixels

Figure 23:
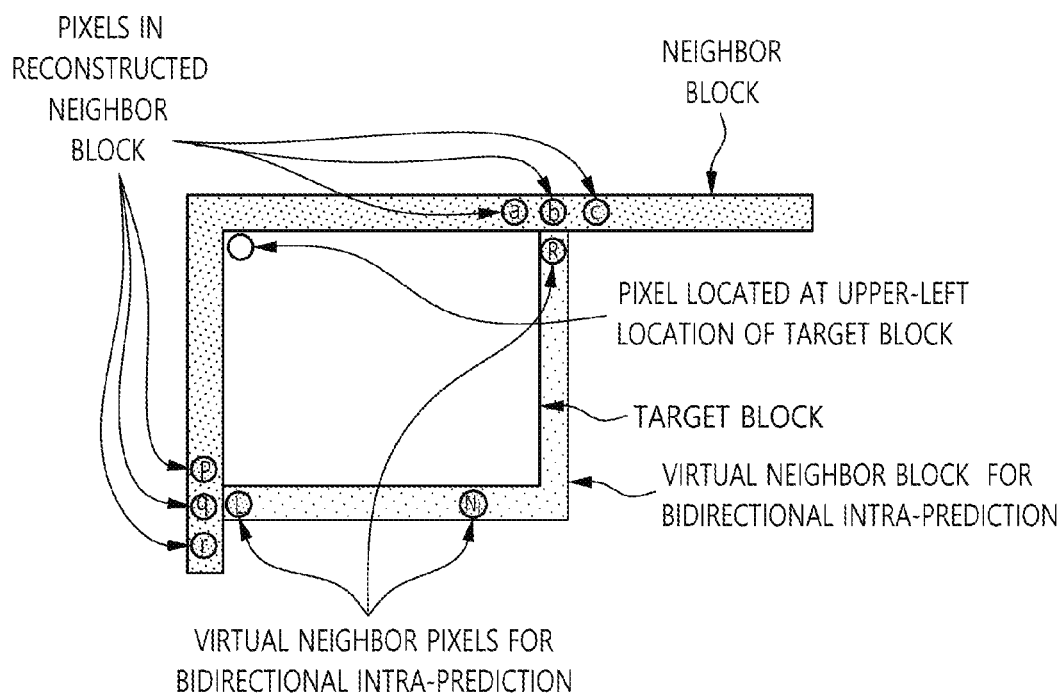
FIG. 23 illustrates the generation of virtual neighbor pixels according to an example.

FIG. 23 illustrates the generation of virtual neighbor pixels according to an example.

Since some of the pixels in two prediction directions of a bidirectional intra-prediction mode were not reconstructed before bidirectional intra-prediction, they may not be used for bidirectional intra-prediction. A processing unit may generate virtual neighbor pixels corresponding to the pixels that are not reconstructed, and may perform bidirectional intra-prediction using the virtual neighbor pixels.

The neighbor pixels may be reconstructed pixels in a reconstructed neighbor block. Each virtual neighbor pixel may be a pixel generated using one or more reconstructed pixels. In other words, the value of the virtual neighbor pixel may be generated based on the values of one or more reconstructed pixels.

For example, the virtual neighbor pixel may be a pixel adjacent to and above or to the left of a target block. The virtual neighbor pixel may be a pixel adjacent to and below or to the right of the target block.

Virtual neighbor pixels for the target block may be pixels in a virtual neighbor block for the target block. The virtual neighbor block may be an unreconstructed block that is adjacent to the target block. For example, the virtual neighbor block may be a block adjacent to and below or to the right of the target block.

When the intra-prediction mode of the target block is derived and determined to be a bidirectional intra-prediction mode, the processing unit may determine a prediction value for a target pixel by referring to at least one of neighbor pixels and virtual neighbor pixels located in two prediction directions of the bidirectional intra-prediction mode.

When prediction is performed in this way, the processing unit may acquire reference pixels in respective prediction directions by filtering the neighbor pixels in respective prediction directions. Further, the processing unit may acquire reference pixels in respective prediction directions by filtering the virtual neighbor pixels in respective prediction directions. The processing unit may derive a prediction value for the target pixel using at least one of the acquired reference pixels.

In other words, the reference pixels may be neighbor pixels or virtual neighbor pixels, and may be pixels at locations designated by a specified prediction direction from a pixel in the target block. Alternatively, the reference pixels may be values acquired by applying filtering to neighbor pixels and/or virtual neighbor pixels neighboring locations designated by a specified prediction direction from a pixel in the target block.

The processing unit may determine the prediction value for the target pixel using at least one of reference pixels in two prediction directions of the bidirectional intra-prediction mode. The reference pixels may include neighbor pixels and virtual neighbor pixels.

The description of the foregoing weights may also be applied to virtual neighbor pixels. When at least one of reference pixels in two prediction directions of the bidirectional intra-prediction mode is used, weights may be respectively applied to neighbor pixels and virtual neighbor pixels that are reference pixels.

Below, exemplary methods for generating virtual neighbor pixels will be described.

The upper-left coordinates of a target block may be (Cx, Cy). W may be the horizontal size of the target block. H may be the height or the vertical size of the target block.

Hereinafter, "pixel ($\alpha$, $\beta$)" may denote a pixel having coordinates ($\alpha$, $\beta$).

1) The processing unit may generate virtual neighbor pixels based on pixels in reconstructed neighbor blocks.

The virtual neighbor pixels may include right virtual neighbor pixels adjacent to and to the right of the target block and bottom virtual neighbor pixels adjacent to and below the target block.

The locations of the right virtual neighbor pixels may be given by the following Equation 2:

$$N(Cx+W, y) \text{ where}(y \in \{Cy, Cy+1, Cy+2, \ldots, Cy+H\}) \quad \text{[Equation 2]}$$

The locations of the bottom virtual neighbor pixels may be given by the following Equation 3:

$$N(x, Cy+H) \text{ where}(x \in \{Cx, Cx+1, Cx+2, Cx+W\}) \quad \text{[Equation 3]}$$

2) The processing unit may generate a virtual neighbor pixel (Cx+W, Cy) based on one or more of reconstructed neighbor pixels adjacent to and above the target block.

For example, in FIG. 23, a virtual neighbor pixel R may be generated using one or more of reconstructed neighbor pixels adjacent to and above the target block. The virtual neighbor pixel R may be the uppermost virtual neighbor pixel, among the right virtual neighbor pixels.

3) The processing unit may generate the virtual neighbor pixel (Cx+W, Cy) based on a neighbor pixel (Cx+W, Cy−1).

For example, in FIG. 23, the virtual neighbor pixel R may be generated based on a neighbor pixel b. The virtual neighbor pixel R may be the uppermost virtual neighbor pixel, among the right virtual neighbor pixels. The neighbor pixel b may be a pixel adjacent to and above the virtual neighbor pixel R.

For example, the relationship between the virtual neighbor pixel R and the neighbor pixel b may be represented by the following Equation 4:

$$R = b \quad \text{[Equation 4]}$$

4) The processing unit may generate the virtual neighbor pixel (Cx+W, Cy) based on one or more of a neighbor pixel (Cx+W−1, Cy−1), a neighbor pixel (Cx+W, Cy−1), and a neighbor pixel (Cx+W+1, Cy−1).

For example, in FIG. 23, the virtual neighbor pixel R may be generated using a neighbor pixel a, the neighbor pixel b, and a neighbor pixel c. The virtual neighbor pixel R may be the uppermost virtual neighbor pixel, among the right virtual neighbor pixels.

The coordinates of the neighbor pixel a, the neighbor pixel b, and the neighbor pixel c may be given by the following Equations 5, 6, and 7:

$$(Cx+W-1, Cy-1) \quad \text{[Equation 5]}$$

$$(Cx+W, Cy-1) \quad \text{[Equation 6]}$$

$$(Cx+W+1, Cy-1) \quad \text{[Equation 7]}$$

In other words, the neighbor pixel b may be a pixel adjacent to and above the virtual neighbor pixel R. The neighbor pixel a may be a pixel adjacent to and to the left of the neighbor pixel b. The neighbor pixel c may be a pixel adjacent to and to the right of the neighbor pixel b.

For example, in FIG. 23, the virtual neighbor pixel R may be a weighted sum of the neighbor pixel a, the neighbor pixel b, and the neighbor pixel c. When the virtual neighbor pixel R is generated, weights may be assigned to the neighbor pixel a, the neighbor pixel b, and the neighbor pixel c, respectively.

For example, the relationships between the virtual neighbor pixel R, the neighbor pixel a, the neighbor pixel b, and the neighbor pixel c may be represented by the following Equation 8:

$$R=1/4*a+2/4*b+1/4*c=1/4*a+1/2*b+1/4*c=(a+b<<1+c)>>2 \quad \text{[Equation 8]}$$

Here, "<<" may be a left-shift operator. ">>" may be a right-shift operator.

5) Similar to the above-described requirements 2) to 4), the processing unit may generate a virtual neighbor pixel (Cx, Cy+H) based on one or more of reconstructed neighbor pixels adjacent to and to the left of the target block.

For example, in FIG. 23, a virtual neighbor pixel L may be generated using one or more of reconstructed neighbor pixels adjacent to and to the left of the target block. The virtual neighbor pixel L may be the leftmost virtual neighbor pixel, among the bottom virtual neighbor pixels.

6) The processing unit may generate the virtual neighbor pixel (Cx, Cy+H) based on a neighbor pixel (Cx−1, Cy+H).

For example, in FIG. 23, the virtual neighbor pixel L may be generated using a neighbor pixel q. The virtual neighbor pixel L may be the leftmost virtual neighbor pixel, among the bottom virtual neighbor pixels. The neighbor pixel q may be a pixel adjacent to and to the left of the virtual neighbor pixel L.

For example, the relationship between the virtual neighbor pixel L and the neighbor pixel q may be represented by the following Equation 9:

$$L=q \quad \text{[Equation 9]}$$

7) The processing unit may generate the virtual neighbor pixel (Cx, Cy+H) based on one or more of a neighbor pixel (Cx−1, Cy+H−1), a neighbor pixel (Cx−1, Cy+H), and a neighbor pixel (Cx−1, Cy+H+1).

For example, in FIG. 23, the virtual neighbor pixel L may be generated using a neighbor pixel p, the neighbor pixel q, and a neighbor pixel r. The virtual neighbor pixel L may be the leftmost virtual neighbor pixel, among the bottom virtual neighbor pixels.

The coordinates of the neighbor pixel p, the neighbor pixel q, and the neighbor pixel r may be given by the following Equations 10, 11, and 12.

$$(Cx-1, Cy+H-1) \quad \text{[Equation 10]}$$

$$(Cx-1, Cy+H) \quad \text{[Equation 11]}$$

$$(Cx-1, Cy+H+1) \quad \text{[Equation 12]}$$

In other words, the neighbor pixel q may be a pixel adjacent to and to the left of the virtual neighbor pixel L. The neighbor pixel p may be a pixel adjacent to and above the neighbor pixel q. The neighbor pixel r may be a pixel adjacent to and below the neighbor pixel q.

For example, in FIG. 23, the virtual neighbor pixel L may be a weighted sum of the neighbor pixel p, the neighbor pixel q, and the neighbor pixel r. When the virtual neighbor pixel L is generated, respective weights may be assigned to the neighbor pixel p, the neighbor pixel q, and the neighbor pixel r.

For example, the relationship between the virtual neighbor pixel L, the neighbor pixel p, the neighbor pixel q, and the neighbor pixel r may be represented by the following Equation 13:

$$L=1/4*p+2/4*q+1/4*r=1/4*p+1/2*q+1/4*r=(p+q<<1+r)>>2 \quad \text{[Equation 13]}$$

8) The processing unit may generate an additional virtual neighbor pixel based on multiple virtual neighbor pixels generated using neighbor pixels.

For example, in FIG. 23, a virtual neighbor pixel $N_i$ may be generated based on the virtual neighbor pixel R and the virtual neighbor pixel L. The virtual neighbor pixel $N_i$ may be a virtual neighbor pixel between the virtual neighbor pixel R and the virtual neighbor pixel L.

Figure 24:
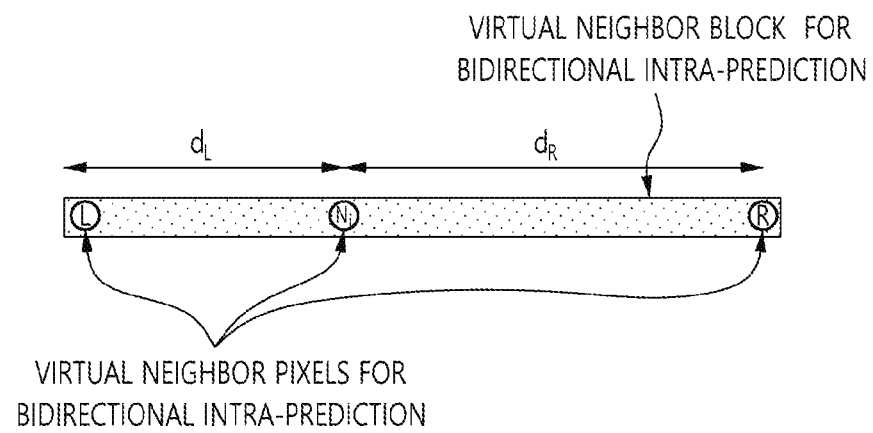
FIG. 24 illustrates the generation of an additional virtual neighbor pixel using virtual neighbor pixels according to an example.

FIG. 24 illustrates the generation of an additional virtual neighbor pixel using virtual neighbor pixels according to an example.

As illustrated in FIG. 24, virtual neighbor pixels for the target block may be arranged in a line depending on the distance from a virtual neighbor pixel L and the distance from a virtual neighbor pixel R.

The distance between a specific virtual neighbor pixel $N_i$ and the virtual neighbor pixel L may be represented by the following Equation 14:

(absolute value of difference between x coordinate of $N_i$ and x coordinate of L)+(absolute value of difference between y coordinate of $N_i$ and y coordinate of L) [Equation 14]

The distance between the specific virtual neighbor pixel $N_i$ and the virtual neighbor pixel R may be represented by the following Equation 15:

(absolute value of difference between x coordinate of $N_i$ and x coordinate of R)+(absolute value of difference between y coordinate of $N_i$ and y coordinate of R) [Equation 15]

In other words, the distance between the pixels may be the sum of the absolute value of the difference between the x coordinates of the pixels and the absolute value of the difference between the y coordinates of the pixels.

9) The processing unit may generate the virtual neighbor pixel L and the virtual neighbor pixel R based on neighbor pixels in a reconstructed neighbor block, and may generate the virtual neighbor pixel $N_i$ between the virtual neighbor pixel L and the virtual neighbor pixel R based on the virtual neighbor pixel L and the virtual neighbor pixel R.

When the virtual neighbor pixel $N_i$ is generated, weights for the distance may be used. The weights for the distance may include a weight depending on the distance between the virtual neighbor pixel $N_i$ and the virtual neighbor pixel L and a weight depending on the distance between the virtual neighbor pixel $N_i$ and the virtual neighbor pixel R.

For example, the relationship between the virtual neighbor pixel $N_i$, the virtual neighbor pixel L, and the virtual neighbor pixel R may be represented by the following Equation 16:

$$N_i = \frac{d_L}{d_L + d_R} * R + \frac{d_R}{d_L + d_R} * L \quad \text{[Equation 16]}$$

$d_R$ may be the distance between the virtual neighbor pixel $N_i$ and the virtual neighbor pixel R.

$d_L$ may be the distance between the virtual neighbor pixel $N_i$ and the virtual neighbor pixel L.

Figure 25:
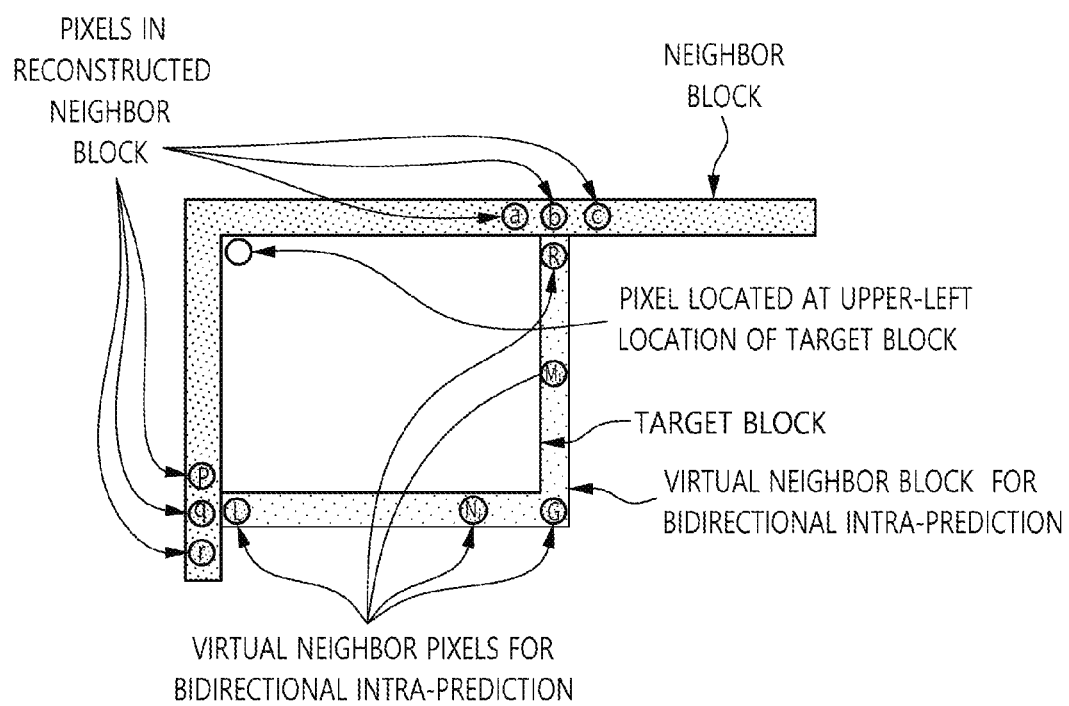
FIG. 25 illustrates the generation of a bottom-right virtual neighbor pixel and a middle virtual neighbor pixel according to an example.

FIG. 25 illustrates the generation of a bottom-right virtual neighbor pixel and a middle virtual neighbor pixel according to an example.

The upper-left coordinates of a target block may be (Cx, Cy). W may be the horizontal size of the target block. H may be the height or the vertical size of the target block.

10) The processing unit may generate a virtual neighbor pixel (Cx+W, Cy+H) based on one or more of reconstructed neighbor pixels adjacent to and above the target block and reconstructed neighbor pixels adjacent to and to the left of the target block.

For example, in FIG. 25, a virtual neighbor pixel G may be generated using one or more of the reconstructed neighbor pixels adjacent to and above the target block and reconstructed neighbor pixels adjacent to and to the left of the target block. The virtual neighbor pixel G may be a bottom-right virtual neighbor pixel. In other words, the virtual neighbor pixel G may be a pixel adjacent to and to the right of the bottom virtual neighbor pixels, and may be a pixel adjacent to and below the right virtual neighbor pixels.

11) The processing unit may generate the virtual neighbor pixel (Cx+W, Cy+H) based on a neighbor pixel (Cx+W, Cy−1) and a neighbor pixel (Cx−1, Cy+H).

For example, in FIG. 25, the virtual neighbor pixel G may be generated based on a neighbor pixel b and a neighbor pixel q. The virtual neighbor pixel G may be a bottom-right virtual neighbor pixel. The neighbor pixel b may be a pixel adjacent to an upper-right portion of the target block. The neighbor pixel q may be a pixel adjacent to a lower-left portion of the target block.

For example, the relationship between the virtual neighbor pixel G, the neighbor pixel b, and the neighbor pixel q may be represented by the following Equation 17:

$$G=1/2*(b+q)=(b+q)>>1 \qquad \text{[Equation 17]}$$

12) The processing unit may generate the virtual neighbor pixel (Cx+W, Cy+H) based on a virtual neighbor pixel (Cx+W, Cy) and a virtual neighbor pixel (Cx, Cy+H).

For example, in FIG. 25, the virtual neighbor pixel G may be generated using a virtual neighbor pixel R and a virtual neighbor pixel L. The virtual neighbor pixel G may be a bottom-right virtual neighbor pixel. The virtual neighbor pixel R may be the uppermost virtual neighbor pixel, among right virtual neighbor pixels. The virtual neighbor pixel L may be the leftmost virtual neighbor pixel, among bottom virtual neighbor pixels.

For example, the relationship between the virtual neighbor pixel G, the virtual neighbor pixel R, and the virtual neighbor pixel L may be represented by the following Equation 18:

$$G=1/2*(R+L)=(R+L)>>1 \qquad \text{[Equation 18]}$$

12) The processing unit may generate a third virtual neighbor pixel based on a first virtual neighbor pixel and a second virtual neighbor pixel, and may generate a fourth virtual neighbor pixel based on the first virtual neighbor pixel and the third virtual neighbor pixel.

The processing unit may generate a virtual neighbor pixel between the virtual neighbor pixel (Cx+W, Cy) and the virtual neighbor pixel (Cx+W, Cy+H) based on the virtual neighbor pixel (Cx+W, Cy), the virtual neighbor pixel (Cx, Cy+H), and the virtual neighbor pixel (Cx+W, Cy+H). Also, the processing unit may generate a virtual neighbor pixel between the virtual neighbor pixel (Cx, Cy+H) and the virtual neighbor pixel (Cx+W, Cy+H) based on the virtual neighbor pixel (Cx+W, Cy), the virtual neighbor pixel (Cx, Cy+H), and the virtual neighbor pixel (Cx+W, Cy+H).

For example, in FIG. 25, a virtual neighbor pixel M, may be generated based on the virtual neighbor pixel R, the virtual neighbor pixel L, and the virtual neighbor pixel G. The virtual neighbor pixel M, may be a pixel between the virtual neighbor pixel R and the virtual neighbor pixel G.

For example, in FIG. 25, a virtual neighbor pixel $N_i$ may be generated using the virtual neighbor pixel R, the virtual neighbor pixel L, and the virtual neighbor pixel G. The virtual neighbor pixel $N_i$ may be a pixel between the virtual neighbor pixel L and the virtual neighbor pixel G.

13) The processing unit may generate a third virtual neighbor pixel based on a first virtual neighbor pixel and a second virtual neighbor pixel, and may generate a fourth virtual neighbor pixel based on the first virtual neighbor pixel and the third virtual neighbor pixel. Here, the processing unit may use weights for additional virtual neighbor pixels when the fourth virtual neighbor pixel is generated. The additional virtual neighbor pixels may include the first virtual neighbor pixel and the third virtual neighbor pixel. The weights for the additional virtual neighbor pixels may be set based on the distances between the fourth virtual neighbor pixel and the additional virtual neighbor pixels.

For example, in FIG. 25, the virtual neighbor pixel M, may be generated based on the virtual neighbor pixel R, the virtual neighbor pixel L, and the virtual neighbor pixel G. The virtual neighbor pixel M, may be a pixel between the virtual neighbor pixel R and the virtual neighbor pixel G.

When the virtual neighbor pixel M, is generated, one or more of a weight for the virtual neighbor pixel R, a weight for the virtual neighbor pixel L, and a weight for the virtual neighbor pixel G may be used.

The weight for the virtual neighbor pixel R may be set based on the distance between the virtual neighbor pixel R and the virtual neighbor pixel $M_i$.

The weight for the virtual neighbor pixel L may be set based on the distance between the virtual neighbor pixel L and the virtual neighbor pixel $M_i$.

The weight for the virtual neighbor pixel G may be set based on the distance between the virtual neighbor pixel G and the virtual neighbor pixel $M_i$.

For example, in FIG. 25, the virtual neighbor pixel $N_i$ may be generated using the virtual neighbor pixel R, the virtual neighbor pixel L, and the virtual neighbor pixel G. The virtual neighbor pixel $N_i$ may be a pixel between the virtual neighbor pixel L and the virtual neighbor pixel G.

When the virtual neighbor pixel $N_i$ is generated, one or more of the weight for the virtual neighbor pixel R, the weight for the virtual neighbor pixel L, and the weight for the virtual neighbor pixel G may be used.

The weight for the virtual neighbor pixel R may be set based on the distance between the virtual neighbor pixel R and the virtual neighbor pixel $N_i$.

The weight for the virtual neighbor pixel L may be set based on the distance between the virtual neighbor pixel L and the virtual neighbor pixel $N_i$.

The weight for the virtual neighbor pixel G may be set based on the distance between the virtual neighbor pixel G and the virtual neighbor pixel $N_i$.

The weight for the virtual neighbor pixel L may be set based on the distance between the virtual neighbor pixel G and the virtual neighbor pixel $N_i$. The weight for the virtual neighbor pixel L may be in proportion to the distance between the virtual neighbor pixel G and the virtual neighbor pixel $N_i$. The weight for the virtual neighbor pixel L may be in inverse proportion to the sum of the distance from the virtual neighbor pixel $N_i$ to the virtual neighbor pixel L and the distance from the virtual neighbor pixel $N_i$ to the virtual neighbor pixel G.

The weight for the virtual neighbor pixel G may be set based on the distance between the virtual neighbor pixel L and the virtual neighbor pixel $N_i$. The weight for the virtual neighbor pixel G may be in proportion to the distance between the virtual neighbor pixel L and the virtual neighbor pixel $N_i$. The weight for the virtual neighbor pixel G may be in inverse proportion to the sum of the distance from the virtual neighbor pixel $N_i$ to the virtual neighbor pixel L and the distance from the virtual neighbor pixel $N_i$ to the virtual neighbor pixel G.

For example, the relationship between the virtual neighbor pixel $N_i$, the virtual neighbor pixel L, and the virtual neighbor pixel G may be represented by the following Equation 19:

$$N_i = \frac{d_L}{d_G + d_L} * G + \frac{d_G}{d_L + d_G} * L \qquad \text{[Equation 19]}$$

$d_G$ may be the distance between the virtual neighbor pixel $N_i$ and the virtual neighbor pixel G.

$d_L$ may be the distance between the virtual neighbor pixel $N_i$ and the virtual neighbor pixel L.

For example, the relationship between the virtual neighbor pixel $M_i$, the virtual neighbor pixel R, and the virtual neighbor pixel G may be represented by the following Equation 20.

$$M_i = \frac{d_G}{d_G + d_R} * R + \frac{d_R}{d_G + d_R} * G \qquad \text{[Equation 20]}$$

$d_G$ may be the distance between the virtual neighbor pixel $M_i$ and the virtual neighbor pixel G.

$d_R$ may be the distance between the virtual neighbor pixel $M_i$ and the virtual neighbor pixel R.

Figure 26:
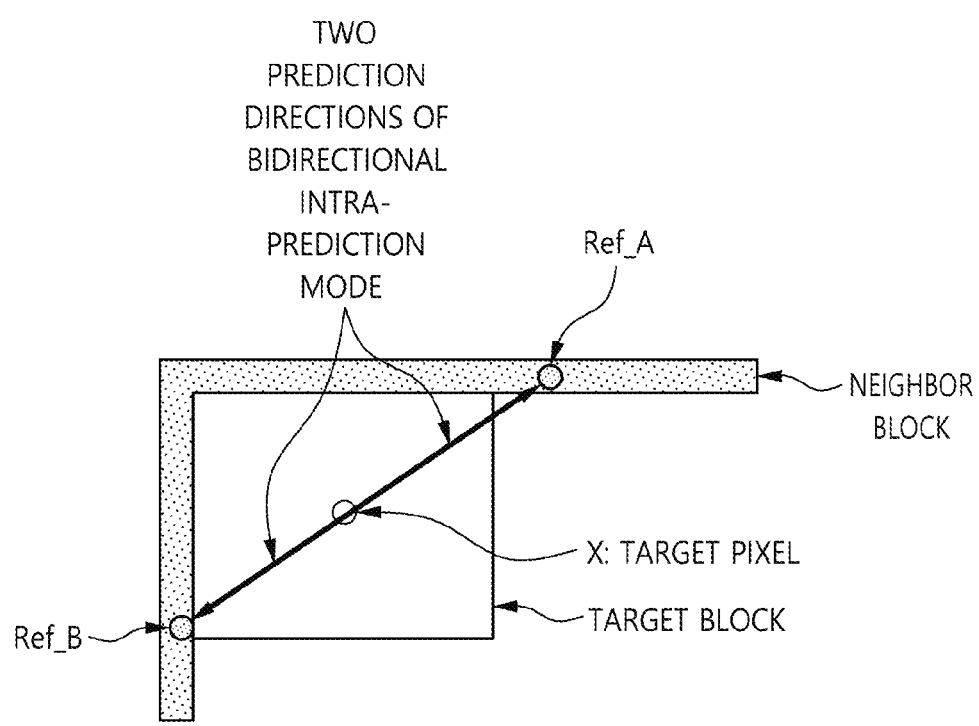
FIG. 26 illustrates bidirectional intra-prediction according to an example.

FIG. 26 illustrates bidirectional intra-prediction according to an example.

A processing unit may derive a prediction value for a target pixel using at least one of reconstructed neighbor pixels and virtual neighbor pixels located in two prediction directions of a bidirectional intra-prediction mode.

The processing unit may derive a prediction value for a target pixel X using one or more of two reference pixels located in two prediction directions of the bidirectional intra-prediction mode.

The two reference pixels may include a reference pixel Ref_A and a reference pixel Ref_B.

Ref_A and Ref_B may be pixels respectively located in two prediction directions that are derived and selected via bidirectional intra-prediction of the target pixel.

The two reference pixels may be reconstructed neighbor pixels. For example, as illustrated in FIG. 26, both Ref_A and Ref_B may be neighbor pixels.

Figure 27:
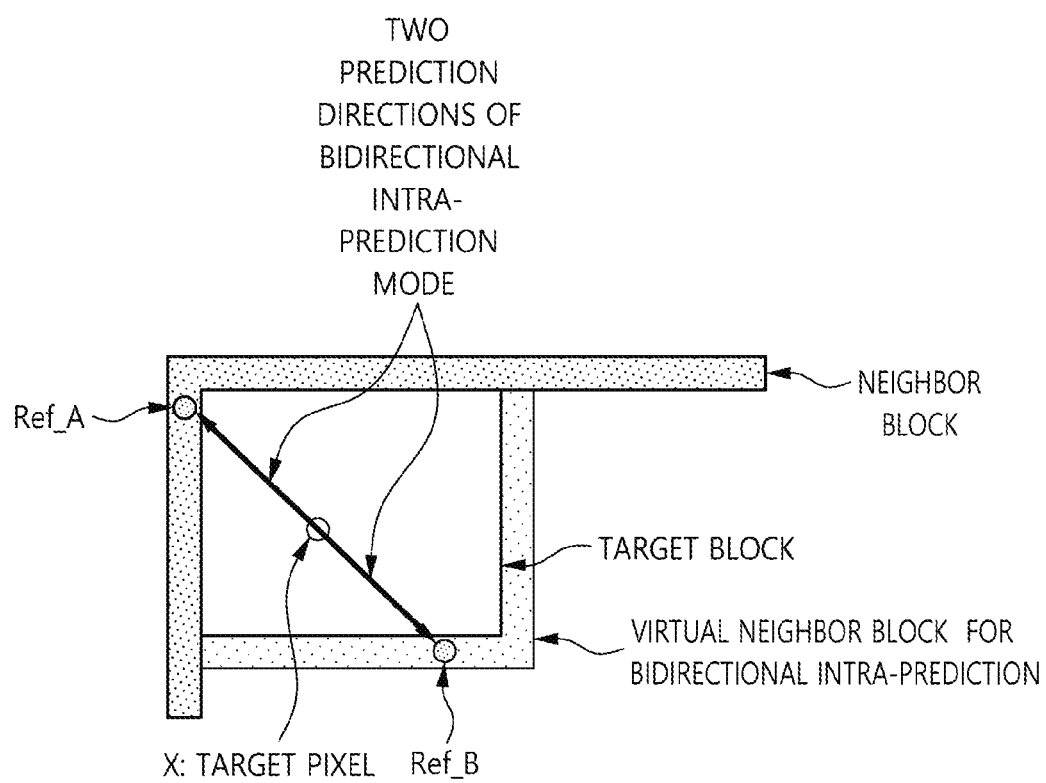
FIG. 27 illustrates bidirectional intra-prediction using virtual neighbor pixels according to an example.

FIG. 27 illustrates bidirectional intra-prediction using virtual neighbor pixels according to an example.

A processing unit may derive a prediction value for a target pixel X using one or more of two reference pixels located in two prediction directions of a bidirectional intra-prediction mode.

The two reference pixels may include a reference pixel Ref_A and a reference pixel Ref_B.

Ref_A and Ref_B may be pixels respectively located in two prediction directions that are derived and selected via bidirectional intra-prediction of the target pixel.

At least one of the two reference pixels may be a virtual neighbor pixel. For example, as illustrated in FIG. 27, Ref_A may be a neighbor pixel, and Ref_B may be a virtual neighbor pixel.

Such a reference pixel may be a pixel at a specific location in each of two prediction directions of bidirectional intra-prediction. The processing unit may acquire a reference pixel by performing filtering on one or more of neighbor pixels and/or virtual neighbor pixels that are near the specific location.

For example, when the specific location is not indicated by integer coordinates, the processing unit may acquire a reference pixel by performing filtering on one or more of neighbor pixels and/or virtual neighbor pixels that are near the specific location.

For example, when the pixel at the specific location is not available, the processing unit may acquire a reference pixel by performing filtering on one or more of neighbor pixels and/or virtual neighbor pixels near the specific location.

The neighbor pixels that are near the specific location may be neighbor pixels adjacent to the specific location. The virtual neighbor pixels that are near the specific location may be virtual neighbor pixels adjacent to the specific location.

A prediction value Pred_X derived for the target pixel may be a statistical value related to one or more of Ref_A and Ref_B, and may be derived based on the statistical value. Hereinafter, the statistical value in the embodiments may be at least one of an average value, a weighted average value, a maximum value, a minimum value, a mode, a median value, and an interpolated value.

As exemplified in the following Equation 21, the prediction value Pred_X for the target pixel may be derived using Ref_A and Ref_B.

$$\text{Pred}\_X = F(\text{Ref}\_A, \text{Ref}\_B) \qquad \text{[Equation 21]}$$

F( ) may be a specific function.

As described above, the processing unit may derive the prediction value for the target pixel X using one or more of two reference pixels located in two prediction directions of the bidirectional intra-prediction mode. Here, the processing unit may respectively apply weights to two reference pixels located in the two prediction directions when the prediction value for the target pixel X is derived.

For example, the sum of the weights may be 1.

The two reference pixels may include a reference pixel Ref_A and a reference pixel Ref_B.

Ref_A and Ref_B may be pixels respectively located in two prediction directions that are derived and selected via bidirectional intra-prediction of the target pixel.

For example, as illustrated in FIG. 26, both Ref_A and Ref_B may be reconstructed neighbor pixels.

Alternatively, in an example, as illustrated in FIG. 27, Ref_A may be a reconstructed neighbor pixel, and Ref_B may be a virtual neighbor pixel.

As exemplified in the following Equation 22, the prediction value Pred_X for the target pixel may be derived using a weight for Ref_A and a weight for Ref_B.

$$\text{Pred}\_X = \text{Dir}\_A * \text{Ref}\_A + \text{Dir}\_B * \text{Ref}\_B \qquad \text{[Equation 22]}$$

Dir_A may be the weight for Ref_A. Dir_B may be the weight for Ref_B.

The sum of Dir_A and Dir_B may be 1.

The processing unit may use the above-described filtering for acquiring reference pixels and weights for the reference pixels together when the derived prediction value Pred_X for the target block is generated.

Such a reference pixel may be a pixel at a specific location in each of two prediction directions of bidirectional intra-prediction. The processing unit may acquire a reference pixel by performing filtering on one or more of neighbor pixels and/or virtual neighbor pixels that are near the specific location. Further, the processing unit may apply the corresponding weight to the generated reference pixel.

Figure 28:
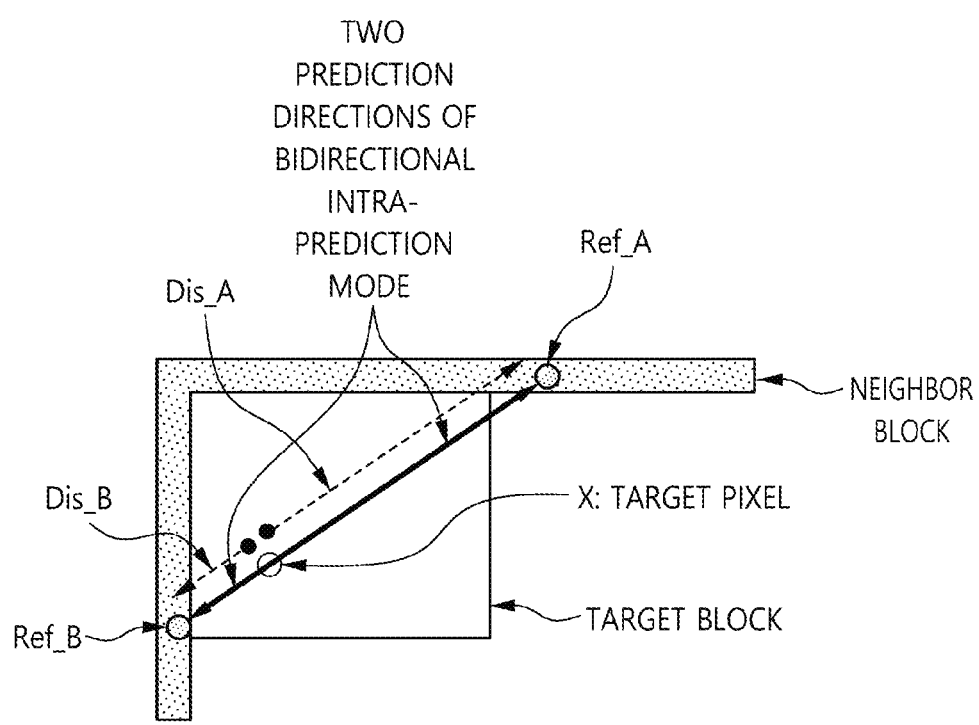
FIG. 28 illustrates bidirectional intra-prediction using the distance between a neighbor pixel and a target pixel according to an example.

FIG. 28 illustrates bidirectional intra-prediction using the distance between a neighbor pixel and a target pixel according to an example.

Figure 29:
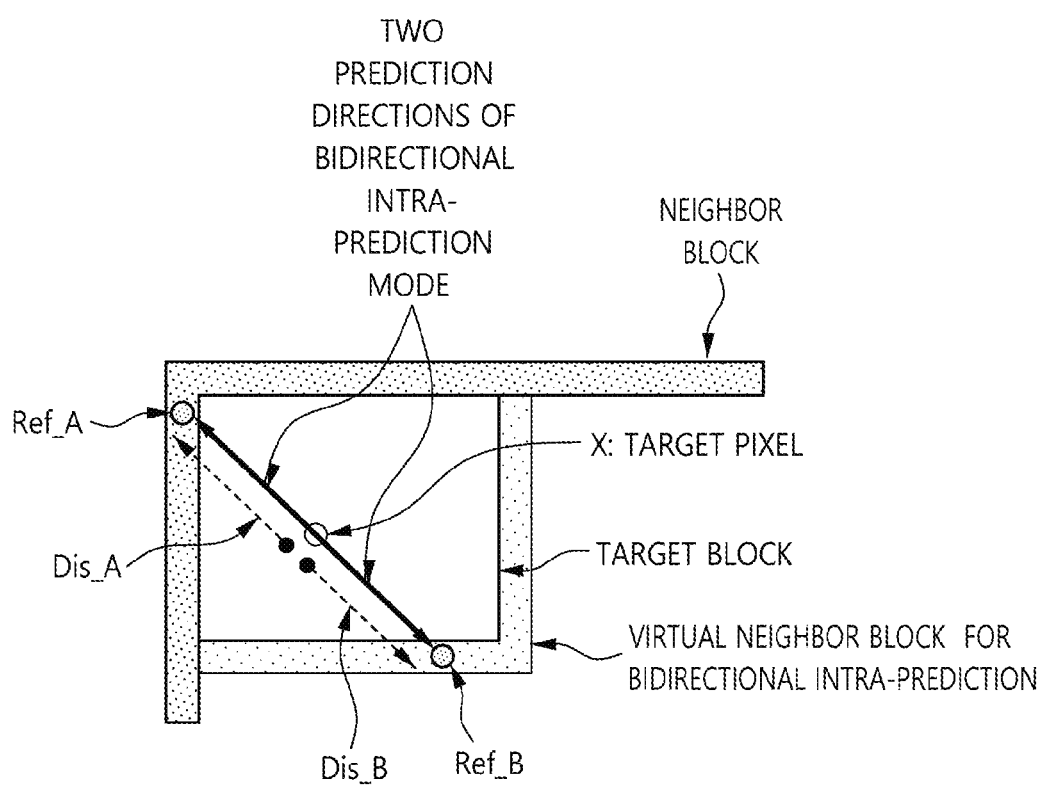
FIG. 29 illustrates bidirectional intra-prediction using the distance between a virtual neighbor pixel and a target pixel according to an example.

FIG. 29 illustrates bidirectional intra-prediction using the distance between a virtual neighbor pixel and a target pixel according to an example.

As described above, a processing unit may derive a prediction value for a target pixel X using one or more of two reference pixels located in two prediction directions of a bidirectional intra-prediction mode. Here, the processing unit may use, for each of the two reference pixels located in two prediction directions, a weight depending on the distance between the corresponding reference pixel and the target pixel.

The two reference pixels may include a reference pixel Ref_A and a reference pixel Ref_B.

Ref_A and Ref_B may be pixels respectively located in two prediction directions that are derived and selected via bidirectional intra-prediction of the target pixel.

For example, as illustrated in FIG. 28, both Ref_A and Ref_B may be reconstructed neighbor pixels.

Alternatively, in an example, as illustrated in FIG. 29, Ref_A may be a reconstructed neighbor pixel and Ref_B may be a virtual neighbor pixel.

The processing unit may use the above-described filtering for acquiring reference pixels and weights depending on the distances between the reference pixels and the target pixel together when the derived prediction value Pred_X for the target block is generated.

Such a reference pixel may be a pixel at a specific location in each of two prediction directions of bidirectional intra-prediction. The processing unit may acquire a reference pixel by performing filtering on one or more of neighbor pixels and/or virtual neighbor pixels that are near the specific location. Further, the processing unit may apply the corresponding weight to the generated reference pixel.

As exemplified in the following Equation 23, the prediction value Pred_X for the target pixel may be derived using one or more of Ref_A, Dis_A, Ref_B, and Dis_B.

$$\text{Pred\_X} = F(\text{Ref\_}A, \text{Dis\_}A, \text{Ref\_}B, \text{Dis\_}B) \qquad [\text{Equation 23}]$$

F( ) may be a specific function.

Dis_A may be the distance between the target pixel and Ref_A. Dis_B may be the distance between the target pixel and Ref_B.

The derived prediction value Pred_X for the target pixel may be a statistical value related to one or more of Ref_A, Dis_A, Ref_B, and Dis_B, and may be derived based on the statistical value.

As exemplified in the following Equation 24, the prediction value Pred_X for the target pixel may be derived based on the weight depending on the distance between the target pixel and the corresponding reference pixel.

$$\text{Pred\_X} = \frac{\text{Dis\_A}}{\text{Dis\_A} + \text{Dis\_B}} \text{Ref\_B} + \frac{\text{Dis\_B}}{\text{Dis\_A} + \text{Dis\_B}} \text{Ref\_A} \qquad [\text{Equation 24}]$$

A weight for one of the two reference pixels may be in proportion to the distance between the other of the two reference pixels and the target pixel.

The weight for one of the two reference pixels may be in inverse proportion to the sum of the distances from the target pixel to the two reference pixels.

For example, the weight for Ref_B may be given by the following Equation 25:

$$\frac{\text{Dis\_A}}{\text{Dis\_A} + \text{Dis\_B}} \qquad [\text{Equation 25}]$$

For example, the weight for Ref_A may be given by the following Equation 26.

$$\frac{\text{Dis\_B}}{\text{Dis\_A} + \text{Dis\_B}} \qquad [\text{Equation 26}]$$

As described above, the processing unit may derive the prediction value for the target pixel X using one or more of two reference pixels located in two prediction directions of the bidirectional intra-prediction mode. Here, the processing unit may use, for each of the two reference pixels in two prediction directions, one or more of a distance weight and a direction weight.

The distance weight may be a weight depending on the distance between the corresponding reference pixel and the target pixel. The direction weight may be a weight depending on the direction from the target pixel to the corresponding reference pixel.

The processing unit may use the above-described filtering for acquiring reference pixels, distance weights, and direction weights together when the derived prediction value Pred_X for the target block is generated.

Such a reference pixel may be a pixel at a specific location in each of two prediction directions of bidirectional intra-prediction. The processing unit may acquire a reference pixel by performing filtering on one or more of neighbor pixels and/or virtual neighbor pixels that are near the specific location. Further, the processing unit may apply one or more of a distance weight and a direction weight to the generated reference pixel.

As exemplified in the following Equation 27, the prediction value Pred_X for the target pixel may be derived using one or more of Ref_A, Dis_A, Dir_A, Ref_B, Dis_B, and Dir_B.

$$\text{Pred\_X} = F(\text{Ref\_}A, \text{Dis\_}A, \text{Dir\_}A, \text{Ref\_}B, \text{Dis\_}B, \text{Dir\_}B) \qquad [\text{Equation 27}]$$

F( ) may be a specific function.

Dis_A may be the distance between the target pixel and Ref_A. Dir_A may be the direction of Ref_A. Dir_A may be the direction from the target pixel to Ref_A. Dis_B may be the distance between the target pixel and Ref_B. Dir_B may be the direction of Ref_B. Dir_B may be the direction from the target pixel to Ref_B.

The derived prediction value Pred_X for the target pixel may be a statistical value related to one or more of Ref_A, Dis_A, Dir_A, Ref_B, Dis_B, and Dir_B, and may be derived based on the statistical value.

As exemplified in the following Equation 28, the prediction value Pred_X for the target pixel may be derived based on the distances from the target pixel to the reference pixels and direction weights for the reference pixels.

$$\text{Pred\_X} = \frac{\text{Dir\_B} \times \text{Dis\_A}}{\text{Dis\_B} + \text{Dis\_A}} \text{Ref\_B} + \frac{\text{Dir\_A} \times \text{Dis\_B}}{\text{Dis\_B} + \text{Dis\_A}} \text{Ref\_A} \qquad [\text{Equation 28}]$$

A weight for one of the two reference pixels may be in proportion to the distance between the other of the two reference pixels and the target pixel.

Also, the weight for one of the two reference pixels may be in proportion to the direction weight for the one reference pixel.

The weight for one of the two reference pixels may be in inverse proportion to the sum of the distances from the target pixel to the two reference pixels.

For example, the weight for Ref_B may be given by the following Equation 29:

$$\frac{Dir\_B \times Dis\_A}{Dis\_B + Dis\_A} \quad \text{[Equation 29]}$$

For example, the weight for Ref_A may be given by the following Equation 30:

$$\frac{Dir\_A \times Dis\_B}{Dis\_B + Dis\_A} \quad \text{[Equation 30]}$$

Derivation of Intra-Prediction Mode Using MPM

When the intra-prediction mode of a target block is determined, the likelihood that a specific intra-prediction mode will be used for intra-prediction of the target block may be high or low depending on the coding parameter related to the target block. In consideration of this likelihood, an MPM list may be used.

The remaining modes may be the remaining intra-prediction modes other than MPMs in the MPM list. In other words, the remaining modes may be the remaining intra-prediction modes after one or more MPMs in the MPM list are excluded from all intra-prediction modes.

The remaining modes may be classified into a first remaining mode set and a second remaining mode set depending on the probability that the remaining modes will be used for intra-prediction of the target block.

The remaining modes having a high probability of being used for intra-prediction of the target block may be defined as the first remaining mode set. The first remaining mode set may be referred to as a "probable remaining mode". In other words, the probable remaining modes may indicate intra-prediction modes having a high probability of being used as the intra-prediction mode of the target block, among the remaining intra-prediction modes, that is, among all intra-prediction modes except for MPMs.

The remaining modes, which are not included in the first remaining mode set, among all remaining modes, may be defined as the second remaining mode set. The second remaining mode set may be referred to as a "pure (authentic) remaining mode".

A remaining mode indicator may indicate the remaining mode to be used for intra-prediction of the target block, among the remaining modes. Alternatively, the remaining mode indicator may indicate the remaining mode to be used for intra-prediction of the target block, among the remaining modes, which are the probable remaining modes.

Figure 30:
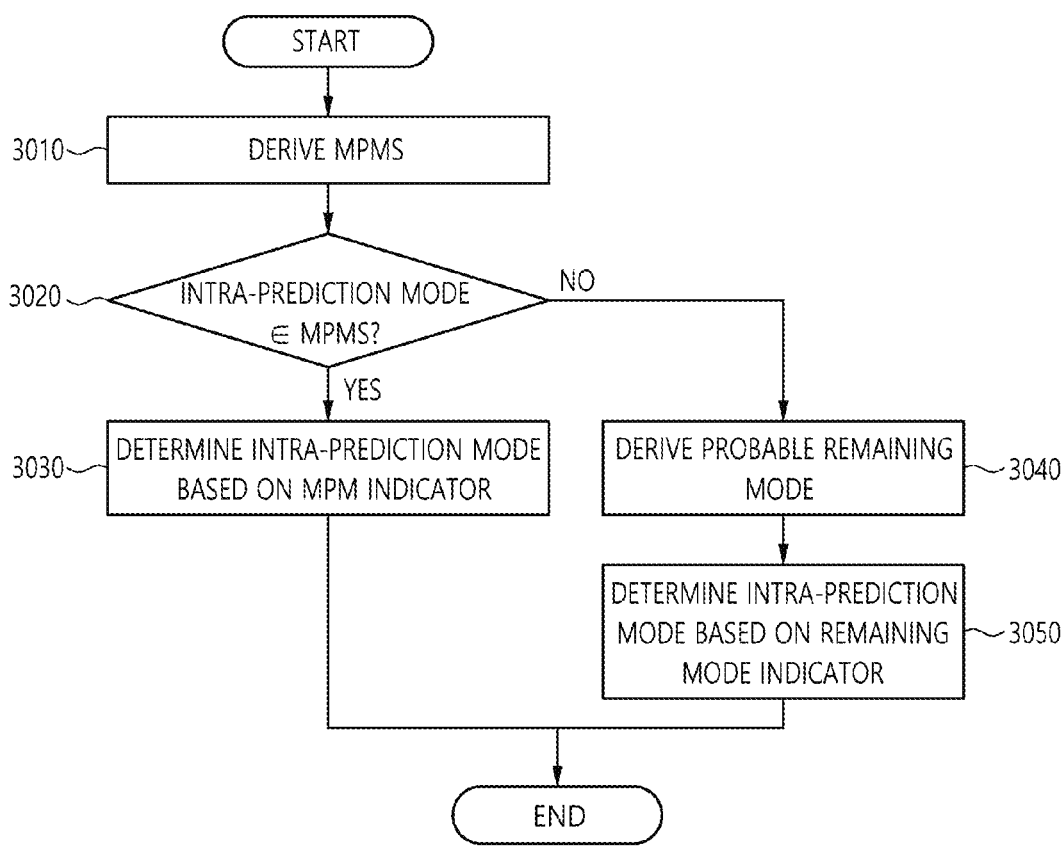
FIG. 30 illustrates the determination of an intra-prediction mode using a remaining mode according to an embodiment.

FIG. 30 illustrates the determination of an intra-prediction mode using a remaining mode according to an embodiment.

At step 3010, a processing unit may derive one or more MPMs for a target block.

The processing unit may derive one or more MPMs in an MPM list for the target block.

At step 3020, the processing unit may determine whether the intra-prediction mode of the target block is one of MPMs.

The processing unit may determine, using an MPM usage indicator, whether the intra-prediction mode of the target block is one of MPMs. The processing unit may acquire the MPM usage indicator from a bitstream.

For example, the MPM usage indicator may have a name such as "prev_intra_pred_mode flag".

When the value of the MPM usage indicator is a first value (e.g. "1"), the processing unit may determine that the intra-prediction mode of the target block is one of the MPMs.

When the value of the MPM usage indicator is a second value (e.g. "0"), the processing unit may determine that the intra-prediction mode of the target block is not one of the MPMs.

If it is determined that the intra-prediction mode of the target block is one of the MPMs, step 3030 may be performed.

If it is determined that the intra-prediction mode of the target block is not one of the MPMs, step 3040 may be performed.

At step 3030, the processing unit may determine the intra-prediction mode of the target block using an MPM indicator.

The processing unit may acquire the MPM indicator from a bitstream.

The processing unit may determine the MPM indicated by the MPM indicator, among the one or more MPMs in the MPM list, to be the intra-prediction mode of the target block.

For example, the MPM indicator may be an index for the MPM list.

At step 3040, the processing unit may derive one or more probable remaining modes for the target block.

The processing unit may derive one or more probable remaining modes in a probable remaining mode list for the target block.

At step 3050, the processing unit may determine the intra-prediction mode of the target block using a remaining mode indicator.

The processing unit may acquire a remaining mode indicator from a bitstream.

The processing unit may determine a probable remaining mode indicated by the remaining mode indicator, among one or more probable remaining modes in the probable remaining mode list, to be the intra-prediction mode of the target block.

For example, the remaining mode indicator may be the index of the probable remaining mode list.

As described above, the intra-prediction mode of the target block may be determined based on multiple different lists corresponding to the MPM list and the probable remaining mode list.

Figure 31:
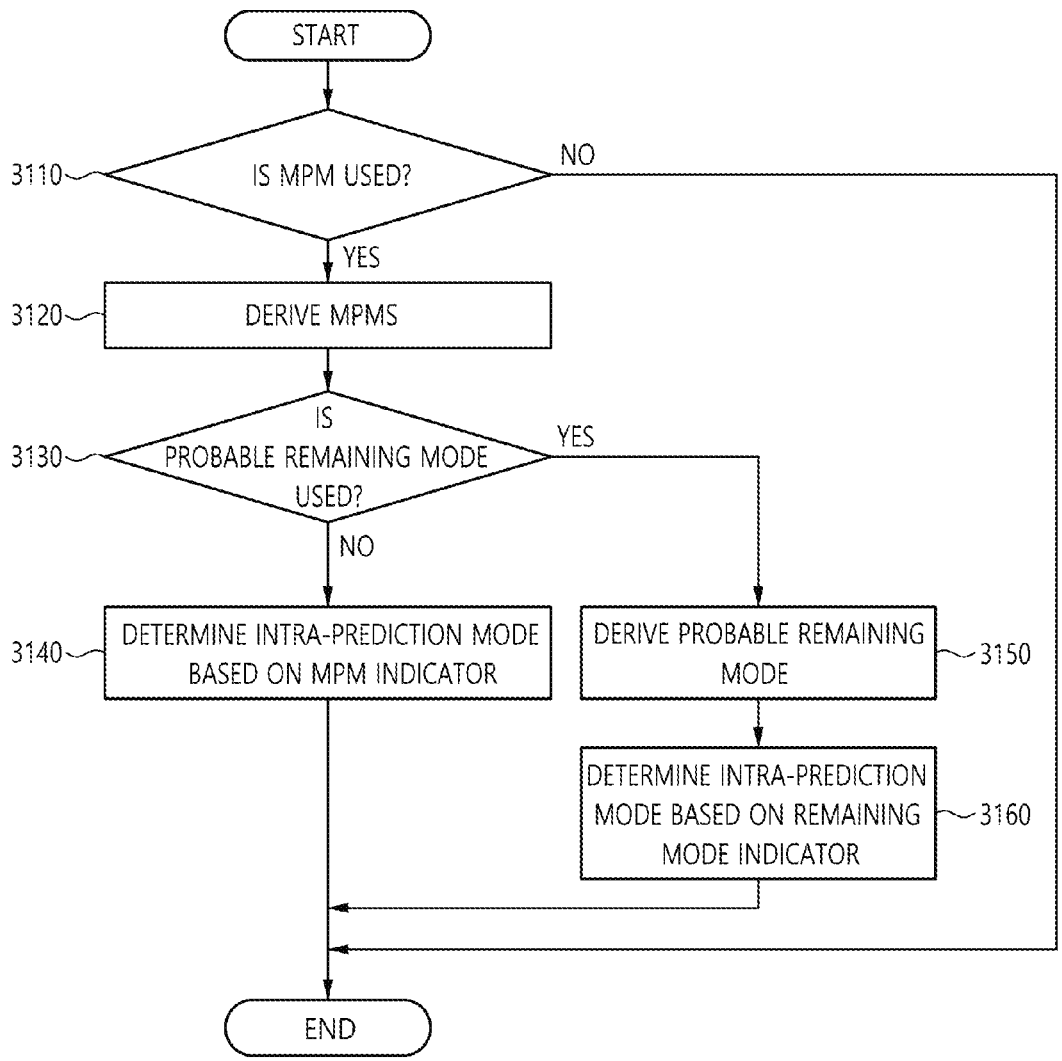
FIG. 31 illustrates the derivation of an MPM after determination of whether an MPM is used, and the determination of an intra-prediction mode using a remaining mode according to an embodiment.

FIG. 31 illustrates the derivation of an MPM after determination of whether an MPM is used, and the determination of an intra-prediction mode using a remaining mode according to an embodiment.

The sequences of step 3010 and 3020, described above with reference to FIG. 30, may be changed.

At step 3110, the processing unit may determine whether an MPM is used to perform intra-prediction for a target block.

Here, the fact that an MPM is used to perform intra-prediction for the target block may mean 1) the case where the intra-prediction mode of the target block is one of MPMs and 2) the case where the intra-prediction mode of the target block is one of the remaining modes and an MPM list is used for the remaining mode.

The processing unit may determine, using an MPM usage indicator, whether an MPM is used to perform intra-prediction for the target block. The processing unit may acquire the MPM usage indicator from a bitstream.

For example, the MPM usage indicator may have a name such as "prev_intra_pred_mode flag".

When the value of the MPM usage indicator is a first value (e.g. "1"), the processing unit may determine that an MPM is used to perform intra-prediction for the target block.

When the value of the MPM usage indicator is a second value (e.g. "0"), the processing unit may determine that an MPM is not used to perform intra-prediction for the target block.

The processing unit may determine, using an MPM indicator, whether an MPM is used to perform intra-prediction for the target block. If it is determined that the MPM indicator indicates one of MPMs and probable remaining modes, the processing unit may determine that an MPM is used to perform intra-prediction for the target block. If it is determined that the MPM indicator does not indicate one of MPMs and probable remaining modes, the processing unit may determine that an MPM is not used to perform intra-prediction for the target block.

If it is determined that an MPM is used to perform intra-prediction for the target block, step 3120 may be performed.

If it is determined that an MPM is not used to perform intra-prediction of the target block, the process may be terminated, and intra-prediction based on an additional scheme may be performed.

At step 3120, the processing unit may derive one or more MPMs for the target block.

The processing unit may derive one or more MPMs in the MPM list for the target block.

At step 3130, the processing unit may determine whether a probable remaining mode is used to perform intra-prediction for the target block.

Alternatively, the processing unit may determine which one of an MPM and a probable remaining mode is used to perform intra-prediction for the target block.

In an example, if it is determined that the MPM indicator indicates one of probable remaining modes, the processing unit may determine that a probable remaining mode is used to perform intra-prediction for the target block.

In an example, if it is determined that the MPM indicator does not indicate one of probable remaining modes, the processing unit may determine that a probable remaining mode is not used to perform intra-prediction for the target block.

In an example, if it is determined that the MPM indicator indicates one of MPMs, the processing unit may determine that an MPM is used to perform intra-prediction for the target block.

In an example, if it is determined that a probable remaining mode is used to perform intra-prediction for the target block, step 3150 may be performed.

In an example, if it is determined that the MPM is used to perform intra-prediction for the target block, step 3140 may be performed.

In an example, if it is determined that the intra-prediction mode of the target block is one of MPMs, step 3140 may be performed.

In an example, if it is determined that the intra-prediction mode of the target block is one of probable remaining modes, step 3150 may be performed.

Step 3140 may correspond to step 3030. Repetitive descriptions will be omitted here.

Step 3150 may correspond to step 3040. Repetitive descriptions will be omitted here.

The probable remaining modes may be derived based on the MPMs derived at step 3120. The relationships between MPMs and probable remaining modes and the derivation of probable remaining modes under the relationships will be described in detail below.

Step 3160 may correspond to step 3050. Repetitive descriptions will be omitted here.

Step 3040 and step 3150 may be selectively performed. In an example, the processing unit may determine, using a remaining mode usage indicator, whether the intra-prediction mode of the target block is one of probable remaining modes. The processing unit may acquire the remaining mode usage indicator from a bitstream. When the value of the remaining mode usage indicator is a first value (e.g. "1"), the processing unit may determine that the intra-prediction mode of the target block is one of probable remaining modes. When the value of the remaining mode usage indicator is a second value (e.g. "0"), the processing unit may determine that the intra-prediction mode of the target block is not one of probable remaining modes. If it is determined that the intra-prediction mode of the target block is one of probable remaining modes, step 3040 or 3150 may be performed. If it is determined that the intra-prediction mode of the target block is not one of the probable remaining modes, the process may be terminated, and additional intra-prediction that uses neither an MPM nor a probable remaining mode may be processed.

Derivation of Probable Remaining Mode

Figure 32:
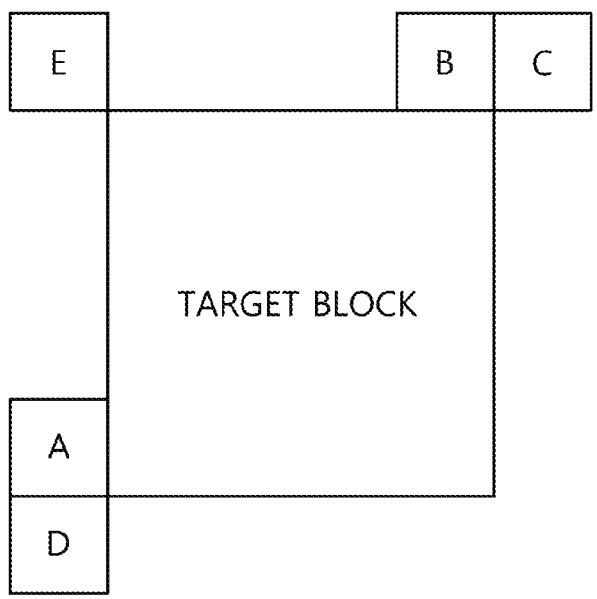
FIG. 32 illustrates blocks for deriving MPM candidates according to an example.

FIG. 32 illustrates blocks for deriving MPM candidates according to an example.

A processing unit may derive one or more of the remaining intra-prediction modes other than MPMs, among all intra-prediction modes, as probable remaining modes.

The number of probable remaining modes may be predefined. For example, the number of probable remaining modes may be 2 or 3.

For example, assuming that the total number of intra-prediction modes is 67 and the number of MPMs is 6, the number of probable remaining modes may be 2.

For example, assuming that the total number of intra-prediction modes is 67 and the number of MPMs is 6, the number of probable remaining modes may be 3.

The six MPM candidates (i.e. candModeList[0] to candModeList[5]) may be derived as will be described below.

1) When the intra-prediction mode candIntraPredModeA of a neighbor block A of a target block and the intra-prediction mode candIntraPredModeB of a neighbor block B of the target block are identical to each other, and the intra-prediction mode candIntraPredModeA of the neighbor block A is greater than INTRA_DC, six MPM candidates may be derived as shown in the following Code 1.

candModeList[0]=intra-prediction mode of neighbor block *A* (candIntraPredModeA)

candModeList[1]=INTRA_PLANAR candModeList[2]=INTRA_DC candModeList[3]=2+((candIntraPredModeA+61) %64)

candModeList[4]=2+((candIntraPredModeA−1)%64)

candModeList[5]=2+((candIntraPredModeA+60)
%64) [Code 1]

2) When the above-described conditions in 1) are not satisfied (i.e. when intra-prediction mode of neighbor block A candIntraPredModeA and the intra-prediction mode of neighbor block B candIntraPredModeB are not identical to each other and the intra-prediction mode of the neighbor block A candIntraPredModeA or the intra-prediction mode of the neighbor block B candIntraPredModeB is greater than INTRA_DC), the MPM candidates may be derived as shown in the following codes 2 to 7:

minAB=candModeList[(candModeList[0]>candMod-
eList[1])?1:0]

maxAB=candModeList[(candModeList[0]>candMod-
eList[1])?0:1] [Code 2]

2-1) When both the intra-prediction mode of the neighbor block A candIntraPredModeA and the intra-prediction mode of the neighbor block B candIntraPredModeB are greater than INTRA_DC, MPM candidates may be derived as shown in the following code 3:

candModeList[0]=candIntraPredModeA candModeList[1]=candIntraPredModeB candModeList[2]=INTRA_PLANAR candModeList[3]=INTRA_DC [Code 3]

When the difference between the derived MaxAB and MinAB falls within the range from 2 to 62, fifth and sixth MPM candidates may be derived as shown in the following Code 4:

candModeList[4]=2+((maxAB+61)%64)

candModeList[5]=2+((maxAB−1)% 64) [Code 4]

When the difference between the derived MaxAB and MinAB does not fall within the range from 2 to 62, the fifth and sixth MPM candidates may be derived as shown in the following Code 5:

candModeList[4]=2+((maxAB+60)%64)

candModeList[5]=2+((maxAB) %64) [Code 5]

2-2) When the conditions in 2-1) are not satisfied (i.e. when at least one of the intra-prediction mode of the neighbor block A candIntraPredModeA and the intra-prediction mode of the neighbor block B candIntraPredModeB is greater than INTRA_DC), six MPM candidates may be derived, as shown in the following code 6:

candModeList[0]=candIntraPredModeA candModeList[1]=candIntraPredModeB candModeList[2]=1−minAB candModeList[3]=2+((maxAB+61)%64)

candModeList[4]=2+((maxAB−1)%64)

candModeList[5]=2+((maxAB+60)% 64) [Code 6]

3) When the above-described conditions in 1) and 2) are not satisfied, six MPM candidates may be derived as shown in the following Code 7:

candModeList[0]=candIntraPredModeA candModeList[1]=(candModeList[0]==INTRA_PLA-
NAR)?INTRA_DC:INTRA_PLANAR candModeList[2]=INTRA_ANGULAR50 candModeList[3]=INTRA_ANGULAR18 candModeList[4]=INTRA_ANGULAR46 candModeList[5]=INTRA_ANGULAR54 [Code 7]

The processing unit may derive probable remaining modes based on spatial neighbor blocks and temporal neighbor blocks of the target block.

The processing unit may derive at least one intra-prediction mode that does not belong to MPMs, among the intra-prediction modes of the spatial neighbor blocks of the target block and the intra-prediction modes of the temporal neighbor blocks of the target block, as the probable remaining mode.

For example, when the number of the intra-prediction mode of one of the neighbor blocks of the target block is 30 and the number of another intra-prediction mode is 40, and when the intra-prediction mode No. 30 belongs to MPMs and the intra-prediction mode No. 40 does not belong to MPMs, the intra-prediction mode No. 40 may be derived as the probable remaining mode.

The processing unit may derive the probable remaining mode based on the MPMs selected from among all of the MPMs.

The selected MPMs may be a predefined number of MPMs preceding in sequence. Here, the MPMs preceding in sequence may denote intra-prediction modes defined by a smaller number of bins. Alternatively, the MPMs preceding in sequence may be MPMs having the lowest index in the MPM list.

In an embodiment, the predefined number of selected MPMs may be '1'.

The number of the derived probable remaining mode may be the sum of the number of a first MPM and an offset. For example, when the number of the first MPM is 30, the sum of the number "30" and the offset "1" is 31, and thus intra-prediction mode No. 31 may be derived as the probable remaining mode.

The number of the derived probable remaining mode may be the difference between the number of a first MPM and an offset. For example, when the number of the first MPM is 30, the difference between the number "30" and the offset "1" is 29, and thus intra-prediction mode No. 29 may be derived as the probable remaining mode.

The numbers of the derived probable remaining modes may be 1) the sum of the number of a first MPM and an offset and 2) the difference between the number of the first MPM and the offset. In an example, when the number of the first MPM is 30, intra-prediction mode No. 29 and intra-prediction mode No. 31 may be derived as probable remaining modes.

The numbers of the derived probable remaining modes may be 1) the sum of the number of a first MPM and a first offset and 2) the difference between the number of the first MPM and the first offset. For example, the first offset may be 1.

When 1) an intra-prediction mode having a number corresponding to the sum of the number of the first MPM and the first offset or 2) an intra-prediction mode having a number corresponding to the difference between the number of the first MPM and the first offset is one of existing MPMs, 1) an intra-prediction mode having a number corresponding to the sum of the number of the first MPM and a second offset or 2) an intra-prediction mode having a number corresponding to the difference between the number of the first MPM and the second offset may be derived as a probable remaining mode. For example, the second offset may be 2. Alternatively, the second offset may be different from the first offset. Alternatively, the second offset may be the value obtained by adding '1' to the first offset, or by adding a predefined number to the first offset.

For example, when the intra-prediction mode having a number corresponding to the sum of the number of the first MPM and the first offset is one of existing MPMs, an intra-prediction mode having a number corresponding to the sum of the number of the first MPM and the second offset may be derived as the probable remaining mode.

For example, when the intra-prediction mode having a number corresponding to the difference between the number of the first MPM and the first offset is one of existing MPMs, an intra-prediction mode having a number corresponding to the difference between the number of the first MPM and the second offset may be derived as the probable remaining mode.

In an embodiment, the predefined number of selected MPMs may be '3'.

For example, the processing unit may determine the numbers of probable remaining modes by adding an offset to the numbers of a first MPM, a second MPM and a third MPM, among one or more MPMs in the MPM list, or by subtracting the offset from the numbers of the first MPM, the second MPM and the third MPM.

For example, when the numbers of the first MPM, the second MPM, and the third MPM are 30, 40, and 50, respectively, the numbers of the derived probable remaining modes may be 31, 41, and 51, respectively.

When a specific mode is not included in the MPMs, the processing unit may derive the specific mode as a probable remaining mode. For example, the specific may be a nondirectional mode. The nondirectional mode may be a DC mode and/or a planar mode.

For example, when a DC mode is not included in MPMs, the DC mode may become a first probable remaining mode or a second probable remaining mode.

For example, when a planar mode is not included in MPMs, the planar mode may become a first probable remaining mode or a second probable remaining mode.

The processing unit may derive a probable remaining mode based on the directions of the MPMs.

For example, the processing unit may derive an intra-prediction mode for a specified direction as a probable remaining mode based on the directions of the MPMs.

For example, the processing unit may derive an intra-prediction mode having a direction not belonging to the directions of the MPMs in a specified direction as a probable remaining mode, based on the directions of the MPMs.

For example, when all of MPMs are intra-prediction modes having horizontal directionality, an intra-prediction mode having vertical directionality may be derived as a probable remaining mode. An intra-prediction mode having horizontal directionality may be an intra-prediction mode having a slope in which a change in a horizontal component is greater than a change in a vertical component. An intra-prediction mode having vertical directionality may be an intra-prediction mode having a slope in which a change in a vertical component is greater than a change in a horizontal component.

For example, when all of MPMs are intra-prediction modes having vertical directionality, an intra-prediction mode having horizontal directionality or a horizontal intra-prediction mode may be derived as a probable remaining mode.

For example, when all of MPMs are intra-prediction modes having horizontal directionality, an intra-prediction mode having vertical directionality or a vertical intra-prediction mode may be derived as a probable remaining mode.

The processing unit may derive a probable remaining mode based on the statistical value of the selected MPMs. The selected MPMs may be a predefined number of MPMs preceding in sequence.

In other words, an intra-prediction mode having a number corresponding to the statistical value may be derived as a probable remaining mode.

For example, an intra-prediction mode having a number that is the average of the number of a first MPM and the number of a second MPM may be derived as a probable remaining mode. When the number of the first MPM is 30 and the number of the second MPM is 40, intra-prediction mode No. 35 may be derived as a probable remaining mode.

The processing unit may exclude a DC mode and a planar mode, which are nondirectional modes, when deriving a probable remaining mode based on the statistical value of the selected MPMs. Alternatively, when selecting a predefined number of MPMs preceding in sequence from among all MPMs, if an MPM that is a nondirectional mode is present among the predefined number of MPMs preceding in sequence, the processing unit may not select the corresponding MPM that is the nondirectional mode, but may select a subsequent MPM that is a directional mode.

For example, the processing unit may calculate the average of two MPMs preceding in sequence, among a total of six MPMs, and may derive an intra-prediction mode having a number corresponding to the average as a probable remaining mode. When the six MPMs respectively indicate a DC mode, mode No. 30, a planar mode, mode No. 10, mode No. 50, and mode No. 52, the MPM that is the DC mode and the MPM that is the planar mode may be excluded from selection. The MPM No. 30 and the MPM No. 10, which are two MPMs preceding in sequence, may be selected due to such exclusion, and the average of 30 and 10 is 20, and thus intra-prediction mode No. 20 may be derived as a probable remaining mode.

The processing unit may derive a probable remaining mode based on the statistical value of all of the MPMs. The number of the intra-prediction mode derived as a probable remaining mode may be the statistical value. For example, the total number of MPMs may be 6, and the statistical value may be the average thereof.

The processing unit may exclude a DC mode and a planar mode, which are nondirectional modes, when deriving a probable remaining mode based on the statistical value of the selected MPMs.

For example, the processing unit may exclude the DC mode and the planar mode from all of the MPMs, and may derive a probable remaining mode based on the statistical value of the remaining MPMs. An intra-prediction mode having a number corresponding to the statistical value may be derived as a probable remaining mode.

The processing unit may derive the probable remaining mode using a probable remaining mode candidate list.

The probable remaining mode candidate list may include one or more probable remaining mode candidates. The probable remaining mode candidate list may be equally defined by an encoding apparatus 1600 and a decoding apparatus 1700.

The processing unit may sequentially search for probable remaining mode candidates present in the probable remaining mode candidate list, and may derive a probable remaining mode candidate that does not belong to MPMs as a probable remaining mode.

Sequentially searching for probable remaining mode candidates may mean that a probable remaining mode candidate having a smaller index in the probable remaining mode candidate list is searched for earlier than a probable remaining mode candidate having a larger index.

The number of probable remaining mode candidates derived as probable remaining modes, among probable remaining mode candidates in the probable remaining mode candidate list, may be predefined.

For example, when probable remaining mode candidates are defined in the sequence of intra-prediction mode No. 30, intra-prediction mode No. 40, intra-prediction mode No. 50, intra-prediction mode No. 20, and intra-prediction mode No. 10, and intra-prediction mode No. 30 and intra-prediction mode No. 40 belong to MPMs, if the number of probable remaining mode candidates derived as the probable remaining modes is 1, intra-prediction mode No. 50 may be derived as the probable remaining mode.

Alternatively, when the probable remaining mode candidates are defined, as described above, and the intra-prediction mode No. 30 and the intra-prediction mode No. 40 belong to the MPMs, if the number of probable remaining mode candidates derived as probable remaining modes is 3, the intra-prediction mode No. 50, the intra-prediction mode No. 20, and the intra-prediction mode No. 10 may be derived as a first probable remaining mode, a second probable remaining mode, and a third probable remaining mode, respectively.

The processing unit may derive at least one intra-prediction mode as a probable remaining mode based on the numbers of intra-prediction modes, among the remaining mode candidates.

In an example, the first probable remaining mode, the second probable remaining mode, and the third probable remaining mode may be individually derived in ascending order from the mode having the lowest intra-prediction mode number, among 61 remaining mode candidates obtained by excluding six MPM candidate modes from a total of 67 intra-prediction modes. In an example, in the case where the number of intra-prediction modes is 67 and the number of MPMs is 6 (i.e. 20, 30, 0, 1, 31, 32), first remaining modes may be defined as the three remaining modes having the lowest intra-prediction mode numbers, that is, remaining modes (2, 3, 4), among the remaining modes (2, 3, 4, . . . , 19, 21, 22 . . . , 29, 33, 34, . . . , 66).

In an example, the first probable remaining mode, the second probable remaining mode, and the third probable remaining mode may be individually derived in descending order from the mode having the largest intra-prediction mode number, among 61 remaining mode candidates obtained by excluding six MPM candidate modes from a total of 67 intra-prediction modes.

Determination of Intra-Prediction Mode Using Remaining Mode Indicator

FIG. 33 illustrates the binarization of a remaining mode indicator according to an example.

In FIG. 33, the symbols and truncated binary codes of the remaining mode indicator are depicted, and the remaining modes indicated by the symbols and truncated binary codes are depicted.

A processing unit may determine the intra-prediction mode of a target block using the remaining mode indicator.

The intra-prediction mode indicated by the remaining mode indicator may include both a probable remaining mode and a pure remaining mode. In other words, the remaining mode indicator may indicate one of probable remaining modes and pure remaining modes as the intra-prediction mode of a target block.

The remaining mode indicator may be a value binarized using a truncated binary coding method.

As illustrated in FIG. 33, the number of bins in probable remaining modes and the number of bins in pure remaining modes may be different from each other.

For example, the number of probable remaining modes may be 2.

For example, assuming that the total number of intra-prediction modes is 67 and the number of MPMs is 6, the number of probable remaining modes may be 2, and the number of pure remaining modes may be 59. In other words, intra-prediction modes that do not belong to MPMs, among all intra-prediction modes, may be classified into two probable remaining modes and 59 pure remaining modes.

The probable remaining modes may have five bins, and the pure remaining modes may have six bins.

In an embodiment, the bins for two probable remaining modes may be defined as "00000" and "00001". "00000" may indicate a first probable remaining mode. "00001" may indicate a second probable remaining mode.

Bins for 59 pure remaining modes may be defined as six bins except for "000000", "000001", "000010", and "000011". For example, the bins for the pure remaining modes may include "000100", "000101", etc.

As described above, the processing unit may encode and/or decode the remaining mode indicator using binarized values.

In another embodiment, the bins for two probable remaining modes may be defined as "11110" and "11111". "11110" may indicate a first probable remaining mode. "11111" may indicate a second probable remaining mode.

The bins for 59 pure remaining modes may be defined as six bins except for "111100", "111101", "111110" and "111111". For example, the bins for the pure remaining modes may include "111000", "111001", etc.

As described above, the processing unit may encode and/or decode the remaining mode indicator using binarized values.

When the total number of intra-prediction modes is 67 and the number of MPMs is 6, the number of probable remaining modes may be 3 and the number of pure remaining modes may be 58. In other words, the intra-prediction modes that do not belong to MPMs, among all intra-prediction modes, may be classified into three probable remaining modes and 58 pure remaining modes.

The probable remaining modes may have five bins, and the pure remaining modes may have six bins.

In an embodiment, the bins for the three probable remaining modes may be defined as "00000", "00001", and "00010". "00000" may indicate a first probable remaining mode. "00001" may indicate a second probable remaining mode. "00010" may indicate a third probable remaining mode.

The bins for the 58 pure remaining modes may be defined as the sum of a binary value and an offset of 3. For example, the bins for the pure remaining modes may include "000110" (="000011"+"000011"), "000111" (="000100"+"000011"), "001000", "001001", etc.

As described above, the processing unit may encode and/or decode the remaining mode indicator using binarized values.

Figure 34:
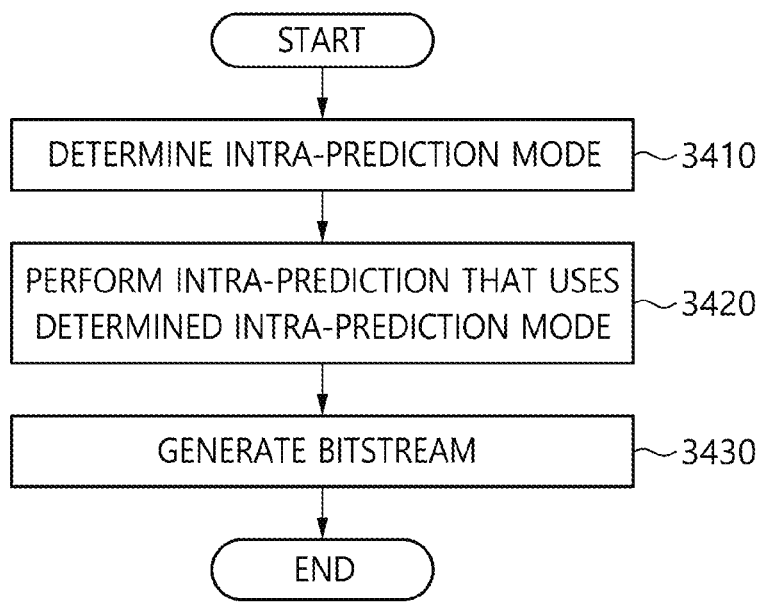
FIG. 34 is a flowchart of a target block prediction method and a bitstream generation method according to an embodiment.

FIG. 34 is a flowchart of a target block prediction method and a bitstream generation method according to an embodiment.

The target block prediction method and the bitstream generation method according to the present embodiment may be performed by an encoding apparatus 1600. The present embodiment may be a part of a target block encoding method or a video encoding method.

At step 3410, a processing unit 1610 may determine the intra-prediction mode to be applied to encoding of a target block.

Step 3410 may correspond to step 1810, described above with reference to FIG. 18. Also, step 3410 may correspond to steps 3010, 3020, 3030, 3040, and 3050, described above with reference to FIG. 30. Further, step 3410 may correspond to steps 3110, 3120, 3130, 3140, and 3150, described above with reference to FIG. 31.

The determined intra-prediction mode may be 1) a bidirectional intra-prediction mode and/or 2) an intra-prediction mode using a remaining mode.

Intra-prediction may be 1) bidirectional intra-prediction and/or 2) intra-prediction using a remaining mode.

The processing unit 1610 may determine an intra-prediction mode for a target block in consideration of rate-distortion costs of intra-prediction modes, among intra-prediction modes available for the target block.

At step 3420, the processing unit 1610 may perform intra-prediction for the target block that uses the determined intra-prediction mode.

Step 3420 may correspond to step 1820, which was described above with reference to FIG. 18.

Information about an encoded target block may be generated by performing intra-prediction for the target block that uses the intra-prediction mode.

A prediction block may be generated via intra-prediction of the target block that uses the intra-prediction mode, and a residual block, which is the difference between the target block and the prediction block, may be generated. The information about the encoded target block may be generated by applying a transform and quantization to the residual block.

The information about the encoded target block may include transformed and quantized coefficients of the target block. The information about the encoded target block may include coding parameters of the target block.

At step 3430, the processing unit 1610 may generate a bitstream.

The bitstream may include the information about the encoded target block.

The bitstream may include prediction information. The prediction information may be information for bidirectional intra-prediction and/or intra-prediction using a remaining mode. In other words, the prediction information may include coding parameters related to the target block, which are required for intra-prediction as described in the embodiments.

For example, the prediction information may include 1) a unidirectional/bidirectional classification indicator, 2) an intra-prediction mode indicator, 3) a weight for a reference pixel, 4) an MPM usage indicator, 5) an MPM indicator, 6) a predefined angle α, etc. for bidirectional intra-prediction.

For example, the prediction information may include 1) an MPM usage indicator, 2) an MPM indicator, 3) a remaining mode indicator, 4) a remaining mode usage indicator, etc. for intra-prediction using a remaining mode.

The prediction information may be generated at step 3430, or may be generated at least partially at steps 3410 and 3420.

The processing unit 1610 may store the generated bitstream in storage 1640. Alternatively, a communication unit 1620 may transmit the bitstream to the decoding apparatus 1700.

The processing unit 1610 may perform entropy encoding on the prediction information, and may generate a bitstream including entropy-encoded prediction information.

The embodiment may be combined with the operation of an encoding apparatus 100, which was described above with reference to FIG. 1. For example, the operations at steps 3410 and 3420 may be performed by an intra-prediction unit 120. The operations at step 3430 may be performed by an entropy-encoding unit 150. Also, before, after and while steps 3410, 3420, and 3430 are performed, operations conducted by other components of the encoding apparatus 100 may be performed.

Figure 35:
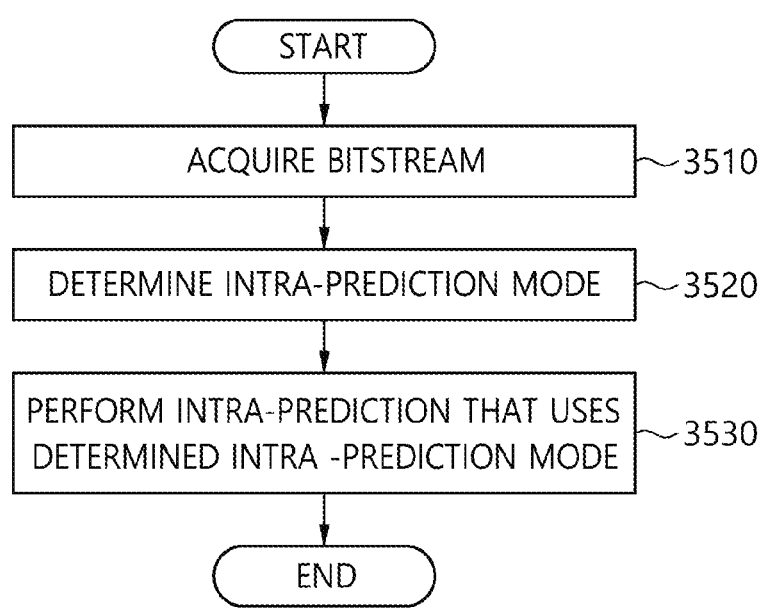
FIG. 35 is a flowchart of a target block prediction method using a bitstream according to an embodiment.

FIG. 35 is a flowchart of a target block prediction method using a bitstream according to an embodiment.

The target block prediction method using a bitstream according to the present embodiment may be performed by a decoding apparatus 1700. The embodiment may be a part of a target block decoding method or a video decoding method.

At step 3510, a communication unit 1720 may acquire a bitstream. The communication unit 1720 may receive the bitstream from an encoding apparatus 1600.

The bitstream may include information about an encoded target block.

The information about the encoded target block may include transformed and quantized coefficients of the target block. The information about the encoded target block may include coding parameters of the target block.

The bitstream may include prediction information. The prediction information may be information for bidirectional intra-prediction and/or intra-prediction using a remaining mode. In other words, the prediction information may include coding parameters related to the target block, which are required for intra-prediction as described in the embodiments.

For example, the prediction information may include 1) a unidirectional/bidirectional classification indicator, 2) an intra-prediction mode indicator, 3) a weight for a reference pixel, 4) an MPM usage indicator, 5) an MPM indicator, 6) a predefined angle α, etc. for bidirectional intra-prediction.

For example, the prediction information may include 1) an MPM usage indicator, 2) an MPM indicator, 3) a remaining mode indicator, 4) a remaining mode usage indicator, etc. for intra-prediction using a remaining mode.

The processing unit 1710 may store the acquired bitstream in storage 1740.

The processing unit 1710 may acquire prediction information from the bitstream. The processing unit 1710 may acquire prediction information by performing entropy decoding on the entropy-encoded prediction information of the bitstream.

At step 3520, the processing unit 1710 may determine an intra-prediction mode to be applied to decoding of the target block.

Step 3520 may correspond to step 1810, described above with reference to FIG. 18. Also, step 3520 may correspond to steps 3010, 3020, 3030, 3040, and 3050, described above with reference to FIG. 30. Further, step 3520 may correspond to steps 3110, 3120, 3130, 3140, and 3150, described above with reference to FIG. 31.

The determined intra-prediction mode may be 1) a bidirectional intra-prediction mode and/or 2) an intra-prediction mode using a remaining mode.

Intra-prediction may be 1) bidirectional intra-prediction and/or 2) intra-prediction using a remaining mode.

The processing unit 1710 may determine the intra-prediction mode of the target block based on prediction information.

At step 3530, the processing unit 1710 may perform intra-prediction for the target block that uses the information about the encoded target block and the determined intra-prediction mode.

Step 3530 may correspond to step 1820, which was described above with reference to FIG. 18. Further, at step 3530, a prediction block may be generated by performing intra-prediction for the target block that uses the intra-prediction mode, and a reconstructed block, which is the sum of the prediction block and a reconstructed residual block, may be generated.

The embodiment may be combined with the operation of a decoding apparatus 200, which was described above with reference to FIG. 2. For example, the operations at step 3510 may be performed by an entropy-decoding unit 210. The operations at steps 3520 and 3530 may be performed by an intra-prediction unit 240. Also, before, after and while steps 3510, 3520, and 3530 are performed, operations conducted by other components of the decoding apparatus 200 may be performed.

In the above-described embodiments, although the methods have been described based on flowcharts as a series of steps or units, the present disclosure is not limited to the sequence of the steps and some steps may be performed in a sequence different from that of the described steps or simultaneously with other steps. Further, those skilled in the art will understand that the steps shown in the flowchart are not exclusive and may further include other steps, or that one or more steps in the flowchart may be deleted without departing from the scope of the disclosure.

The above-described embodiments according to the present disclosure may be implemented as a program that can be executed by various computer means and may be recorded on a computer-readable storage medium. The computer-readable storage medium may include program instructions, data files, and data structures, either solely or in combination. Program instructions recorded on the storage medium may have been specially designed and configured for the present disclosure, or may be known to or available to those who have ordinary knowledge in the field of computer software.

A computer-readable storage medium may include information used in the embodiments of the present disclosure. For example, the computer-readable storage medium may include a bitstream, and the bitstream may contain the information described above in the embodiments of the present disclosure.

The computer-readable storage medium may include a non-transitory computer-readable medium.

Examples of the computer-readable storage medium include all types of hardware devices specially configured to record and execute program instructions, such as magnetic media, such as a hard disk, a floppy disk, and magnetic tape, optical media, such as compact disk (CD)-ROM and a digital versatile disk (DVD), magneto-optical media, such as a floptical disk, ROM, RAM, and flash memory. Examples of the program instructions include machine code, such as code created by a compiler, and high-level language code executable by a computer using an interpreter. The hardware devices may be configured to operate as one or more software modules in order to perform the operation of the present disclosure, and vice versa.

As described above, although the present disclosure has been described based on specific details such as detailed components and a limited number of embodiments and drawings, those are merely provided for easy understanding of the entire disclosure, the present disclosure is not limited to those embodiments, and those skilled in the art will practice various changes and modifications from the above description.

Accordingly, it should be noted that the spirit of the present embodiments is not limited to the above-described embodiments, and the accompanying claims and equivalents and modifications thereof fall within the scope of the present disclosure.

The invention claimed is:

1. A decoding method using a bitstream, comprising:
determining an intra prediction mode for a target block; and
performing an intra prediction for the target block, wherein the intra prediction for the target block is performed using at least one first intra prediction mode in a case that a first indicator decoded from the bitstream indicates that the at least one first intra prediction mode is used for the intra prediction for the target block,
an intra prediction mode in a list comprising one or more second intra prediction modes is used for the intra prediction for the target block in a case that the first indicator indicates that the at least one first intra prediction mode is not used for the intra prediction for the target block and a second indicator decoded from the bitstream indicates that the list is used for the intra prediction for the target block, the at least one first intra prediction mode is not comprised in the list,
an intra prediction mode of one or more third intra prediction modes is used for the intra prediction for the target block in a case that the first indicator indicates that the at least one first intra prediction mode is not used for the intra prediction for the target block and the second indicator indicates that the list is not used for the intra prediction for the target block, and
the one or more third intra prediction modes don't include any one of the at least one first intra prediction mode and the one or more second intra prediction modes.

2. The decoding method of claim 1, wherein the one or more second intra prediction modes in the list are derived based on a prediction mode of a neighbor block of the target block.

3. The decoding method of claim 2, wherein it is determined whether to perform the intra prediction using a list including one or more Most Probable Modes (MPMs),
the intra prediction is performed using a selected remaining mode which a remaining mode indicator indicates among remaining modes in a case that the intra prediction is not performed using the list,
the remaining modes don't include the MPMs, and
a value of the remaining mode indicator is binarized using a truncated binary coding method.

4. An encoding method generating a bitstream, comprising:
determining an intra prediction mode for a target block; and
performing an intra prediction for the target block, wherein the bitstream comprises a first indicator indicating that whether the intra prediction for the target block is performed using at least one first intra prediction mode or not, the intra prediction for the target block is performed using at least one first intra prediction mode in a case that the first indicator indicates that the at least one first intra prediction mode is used for the intra prediction for the target block, the bitstream comprises a second indicator indicating whether a list comprising one or more second intra prediction modes is used for the intra prediction for the target block or not, an intra prediction mode in the list comprising the one or more second intra prediction modes is used for the intra prediction for the target block in a case that the first indicator indicates that the at least one first intra prediction mode is not used for the intra prediction for the target block and the second indicator indicates that the list is used for the intra prediction for the target block, the at least one first intra prediction mode is not comprised in the list, an intra prediction mode of one or more third intra prediction modes is used for the intra prediction for the target block in a case that the first indicator indicates that the at least one first intra prediction mode is not used for the intra prediction for the target block and the second indicator indicates that the list is not used for the intra prediction for the target block, and the one or more third intra prediction modes don't include any one of the at least one first intra prediction mode and the one or more second intra prediction modes.

5. A non-transitory computer-readable medium storing a bitstream processed by a processor, the bitstream comprising:

a first indicator indicating that whether an intra prediction for a target block is performed using at least one first intra prediction mode or not; and a second indicator indicating that whether a list comprising one or more second intra prediction modes is used for the intra prediction for the target block or not, wherein an intra prediction mode for the target block is determined by the processor, the intra prediction for the target block is performed by the processor, the intra prediction for the target block is performed using at least one first intra prediction mode in a case that the first indicator indicates that the at least one first intra prediction mode is used for the intra prediction for the target block, an intra prediction mode in the list comprising the one or more second intra prediction modes is used for the intra prediction for the target block in a case that the first indicator indicates that the at least one first intra prediction mode is not used for the intra prediction for the target block and the second indicator indicates that the list is used for the intra prediction for the target block, the at least one first intra prediction mode is not comprised in the list, an intra prediction mode of one or more third intra prediction modes is used for the intra prediction for the target block in a case that the first indicator indicates that the at least one first intra prediction mode is not used for the intra prediction for the target block and the second indicator indicates that the list is not used for the intra prediction for the target block, and the one or more third intra prediction modes don't include any one of the at least one first intra prediction mode and the one or more second intra prediction modes.

\* \* \* \* \*